(12) United States Patent
Uesaka et al.

(10) Patent No.: US 7,551,843 B2
(45) Date of Patent: Jun. 23, 2009

(54) AUTHORING SYSTEM, PROGRAM, AND AUTHORING METHOD

(75) Inventors: Yasushi Uesaka, Sanda (JP); Yoshihiro Mori, Hirakata (JP)

(73) Assignee: Panasonic Corporation, Osaka (JP)

( * ) Notice: Subject to any disclaimer, the term of this patent is extended or adjusted under 35 U.S.C. 154(b) by 842 days.

(21) Appl. No.: 11/076,404

(22) Filed: Mar. 9, 2005

(65) Prior Publication Data

US 2005/0264437 A1 Dec. 1, 2005

(30) Foreign Application Priority Data

Mar. 10, 2004 (JP) .............................. 2004-067847

(51) Int. Cl.
*H04N 7/26* (2006.01)
*H04N 5/00* (2006.01)
*H04N 5/91* (2006.01)
*H04N 7/16* (2006.01)
*H04N 9/79* (2006.01)
*G06F 13/00* (2006.01)

(52) U.S. Cl. .......................... 386/124; 386/45; 386/82; 386/125; 386/126; 715/723; 719/328; 725/135; 725/138

(58) Field of Classification Search ................. 386/124, 386/45, 82, 125, 126, E5.001; 707/E17.009, 707/E17.119; 715/723; 719/328; 725/135, 725/138
See application file for complete search history.

(56) References Cited

U.S. PATENT DOCUMENTS

| 2002/0088011 | A1* | 7/2002 | Lamkin et al. | 725/142 |
| 2003/0193520 | A1* | 10/2003 | Oetzel | 345/723 |
| 2004/0223747 | A1* | 11/2004 | Otala et al. | 386/125 |

FOREIGN PATENT DOCUMENTS

WO    WO 2005/002232    6/2005

\* cited by examiner

*Primary Examiner*—Thai Tran
*Assistant Examiner*—Syed Y Hasan

(57) ABSTRACT

In an authoring system of the invention, generation of volume configuration information for a DVD-Video is performed in parallel with generation of volume configuration information for a BD-ROM. Each of the client apparatuses 21 through 23 generates a piece of volume configuration information for a DVD-Video based on a user operation. Each of the client apparatuses 25 through 27 generates a piece of volume configuration information for a BD-ROM by obtaining a copy of an unfinished piece (a version 0.x) of volume configuration information for the DVD-Video and performing an editing processing on the copy. The piece of volume configuration information for the DVD-Video and the piece of volume configuration information for the BD-ROM have a format in common and each include a confirmation flag indicating, for each configuration element of the volume configuration information, whether the configuration element has been confirmed by the user.

13 Claims, 42 Drawing Sheets

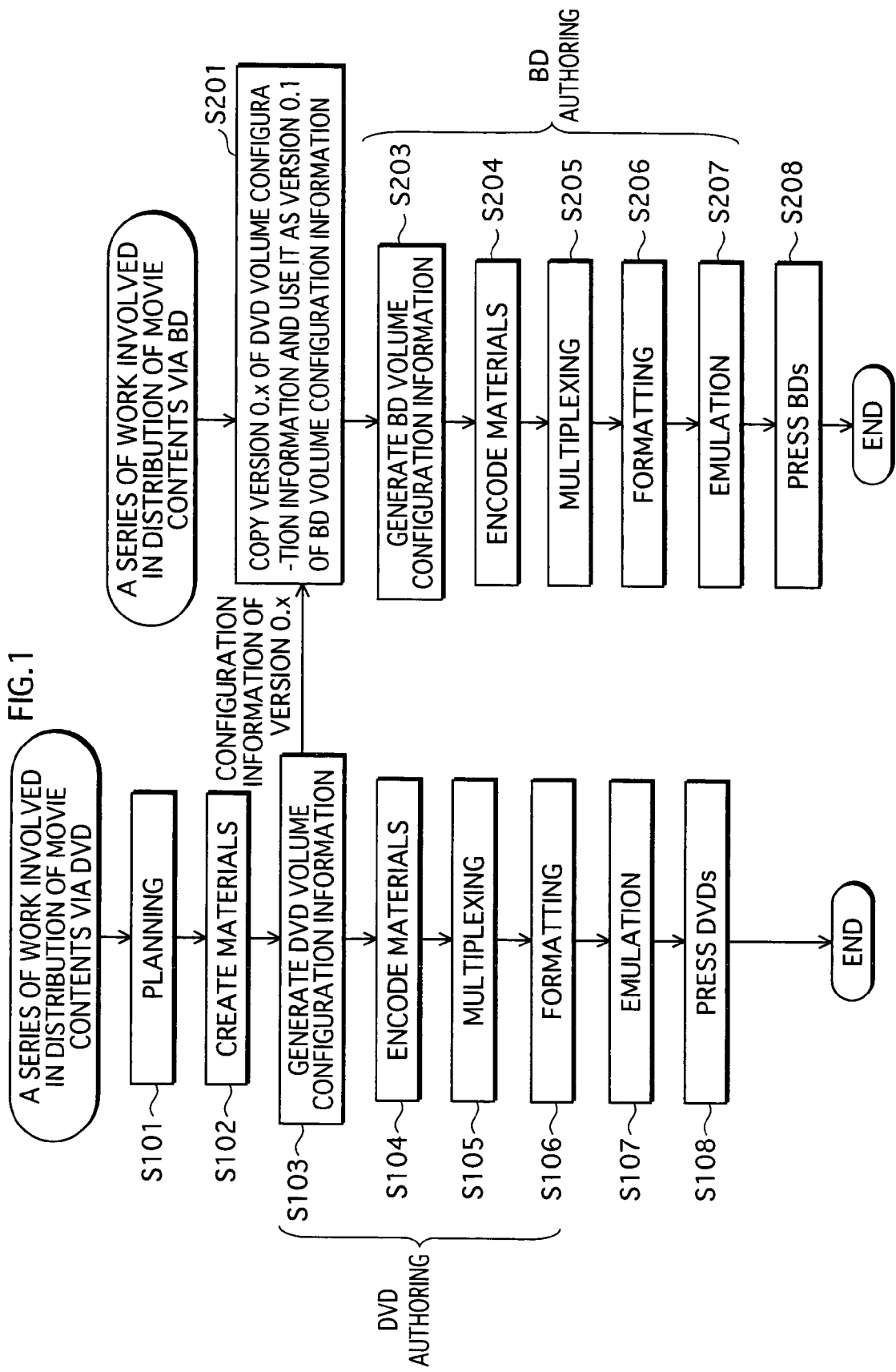

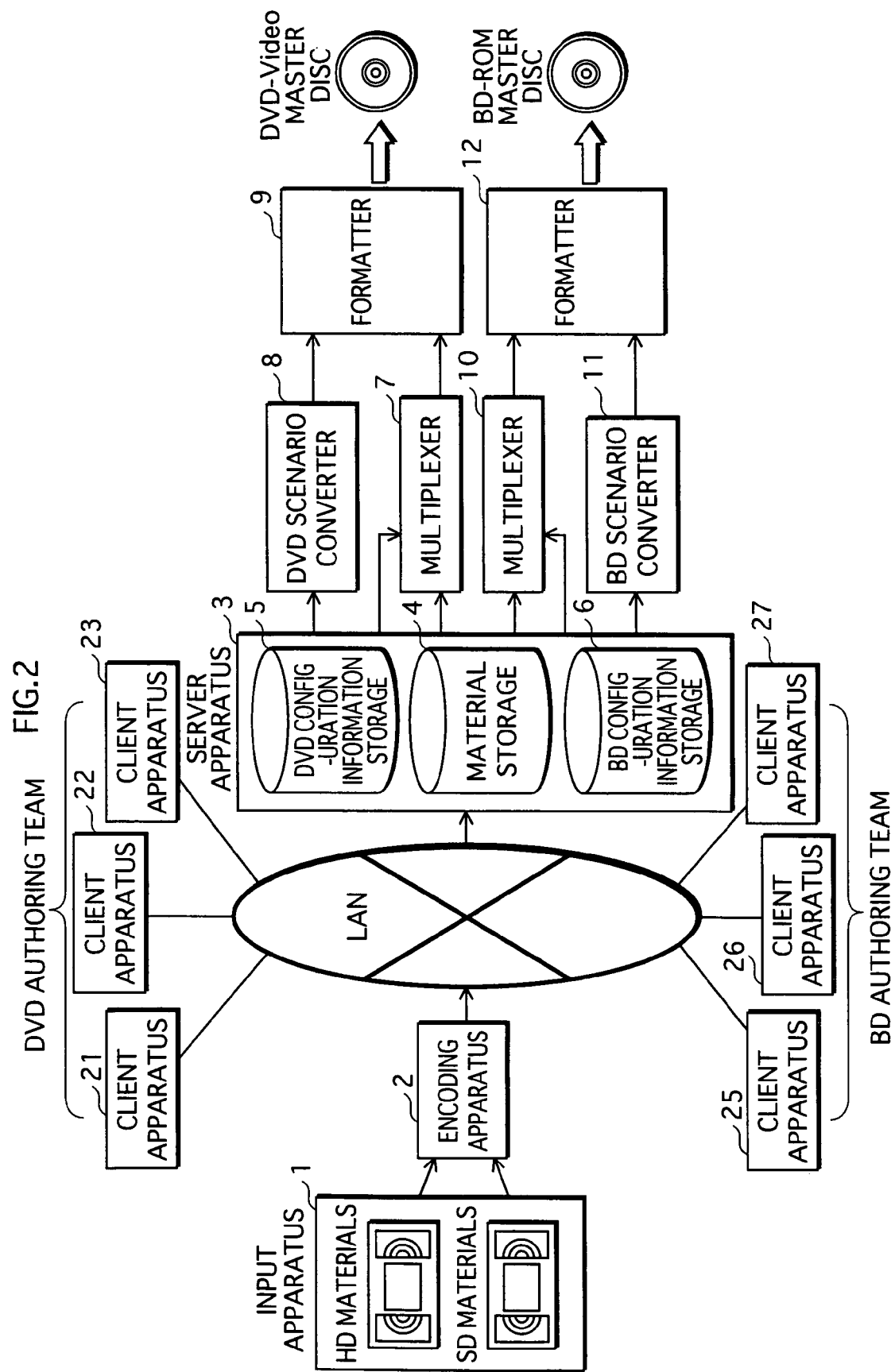

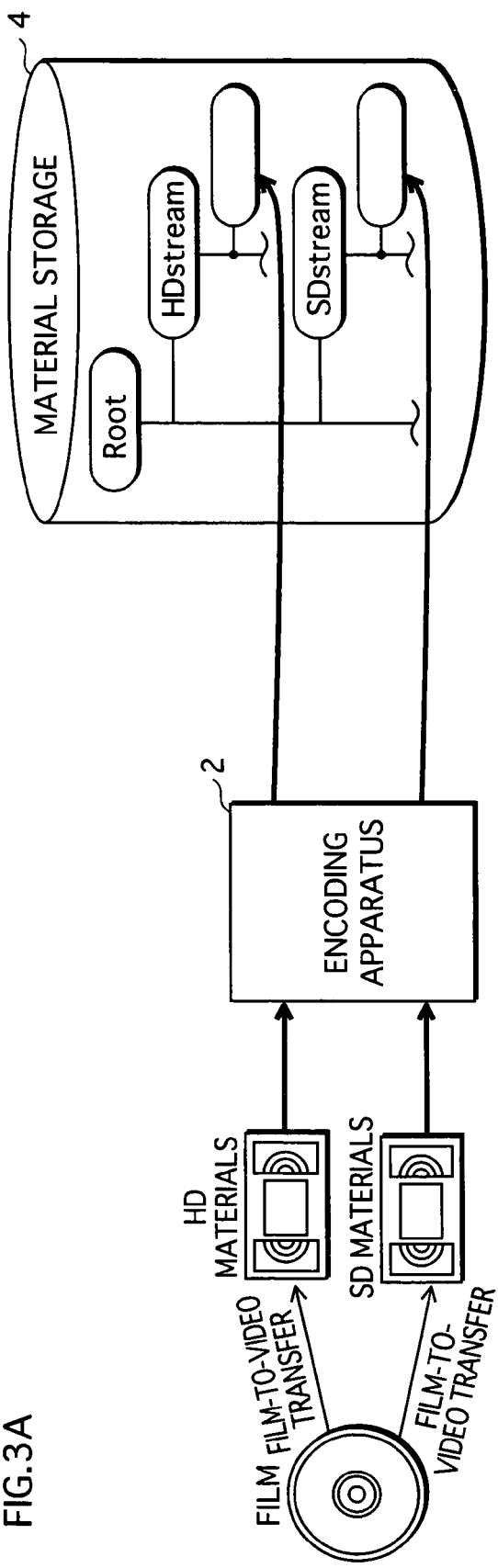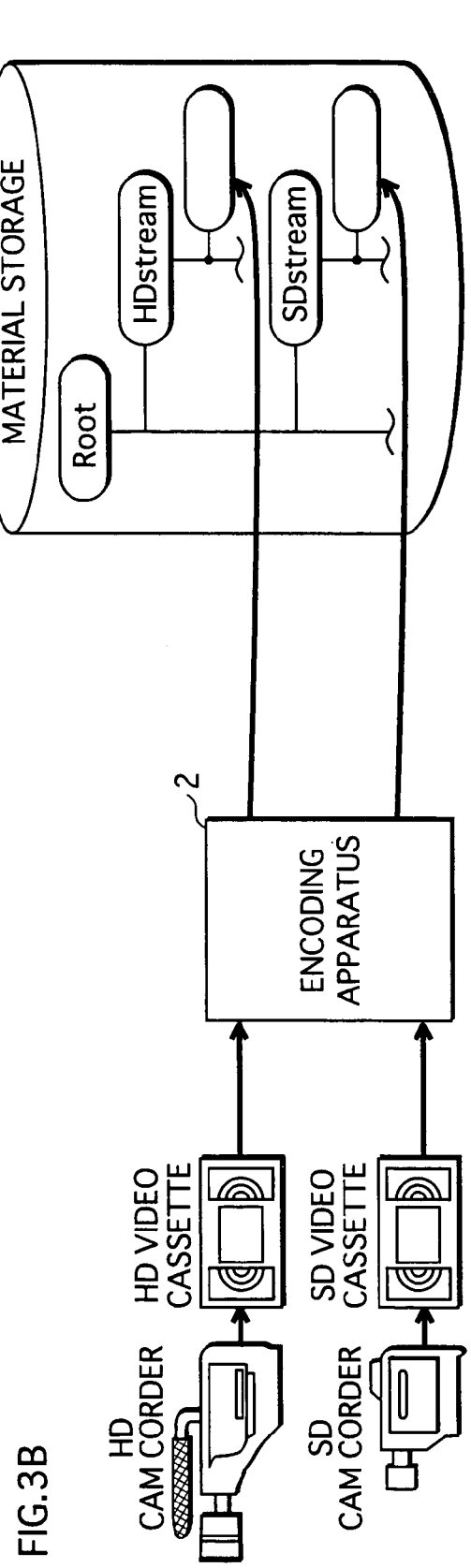

FIG.5

VOLUME CONFIGURATION INFORMATION

| FirstPlay Title CONFIGURATION TABLE |
|---|
| Title1 CONFIGURATION TABLE |
| Title2 CONFIGURATION TABLE |
| Title3 CONFIGURATION TABLE |
| PlayList1 CONFIGURATION TABLE |
| PlayList2 CONFIGURATION TABLE |
| PlayList3 CONFIGURATION TABLE |
| PlayList4 CONFIGURATION TABLE |
| PlayList5 CONFIGURATION TABLE |
| PlayList6 CONFIGURATION TABLE |
| Clip1 CONFIGURATION TABLE |
| Clip2 CONFIGURATION TABLE |
| Clip3 CONFIGURATION TABLE |
| Clip4 CONFIGURATION TABLE |

FIG.6A

Clip CONFIGURATION TABLE

| MATERIAL NAME | LINK INFORMATION | OFFSET | |
|---|---|---|---|
| VIDEO | ../../Clip1.v | | } VIDEO STREAM INFORMATION |
| AUDIO 1 | ../../Clip1-1.a | offset1 | } AUDIO STREAM INFORMATION 1 |
| AUDIO 2 | ../../Clip1-2.a | offset2 | } AUDIO STREAM INFORMATION 2 |
| CONFIRMATION FLAG | | | |

FIG.6B

PlayList1 CONFIGURATION TABLE

| Clip NAME | PLAYBACK STARTING POINT | PLAYBACK ENDING POINT |
|---|---|---|
| Clip1 | In1 | Out1 |
| Clip2 | In2 | Out2 |
| CONFIRMATION FLAG | | |

PlayList2 CONFIGURATION TABLE

| Clip NAME | PLAYBACK STARTING POINT | PLAYBACK ENDING POINT |
|---|---|---|
| Clip3 | In3 | Out3 |
| Clip4 | In4 | Out4 |
| CONFIRMATION FLAG | | |

FIG.6C

Title1 CONFIGURATION TABLE

| PlayList NAME |
|---|
| PlayList1 |
| PlayList2 |
| CONFIRMATION FLAG |

Title2 CONFIGURATION TABLE

| PlayList NAME |
|---|
| PlayList3 |
| PlayList4 |
| PlayList5 |
| CONFIRMATION FLAG |

Title3 CONFIGURATION TABLE

| PlayList NAME |
|---|
| PlayList6 |
| CONFIRMATION FLAG |

FIG.6D

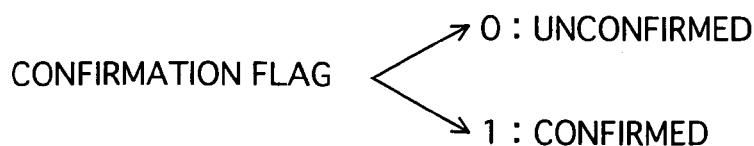

CONFIRMATION FLAG → 0 : UNCONFIRMED / 1 : CONFIRMED

FIG. 13A  ADD CONFIGURATION

| Clip CONFIGURATION TABLE ||
|---|---|
| Clip NAME | Clip1 |
| VIDEO | ../../Clip1.v |
| AUDIO 1 | ../../Clip1-1.a |
| AUDIO 2 | ../../Clip1-2.a |
| ⋮ ||
| VERIFICATION STATUS | UNCONFIRMED ▼ |
| SYNCHRONIZATION | ▷ ⊘ ◁◁ ▷▷ |

| Clip CONFIGURATION TABLE ||
|---|---|
| Clip NAME | Clip1 |
| VIDEO | ../../Clip1.v |
| AUDIO 1 | ../../Clip1-1.a |
| AUDIO 2 | ../../Clip1-2.a |
| | NEW ADDITION |
| VERIFICATION STATUS | UNCONFIRMED ▼ |
| SYNCHRONIZATION | ▷ ⊘ ◁◁ ▷▷ |

FIG. 13B  DELETE CONFIGURATION

| Clip CONFIGURATION TABLE ||
|---|---|
| Clip NAME | Clip1 |
| VIDEO | ../../Clip1.v |
| AUDIO 1 | ../../Clip1-1.a |
| AUDIO 2 | ../../Clip1-2.a |
| ⋮ ||
| VERIFICATION STATUS | UNCONFIRMED ▼ |
| SYNCHRONIZATION | ▷ ⊘ ◁◁ ▷▷ |

| Clip CONFIGURATION TABLE ||
|---|---|
| Clip NAME | Clip1 |
| VIDEO | ../../Clip1.v |
| AUDIO 1 | ../../Clip1-1.a |
|  | DELETED |
| VERIFICATION STATUS | UNCONFIRMED ▼ |
| SYNCHRONIZATION | ▷ ⊘ ◁◁ ▷▷ |

FIG. 13C  CHANGE CONFIGURATION

| Clip CONFIGURATION TABLE ||
|---|---|
| Clip NAME | Clip1 |
| VIDEO | ../../Clip1.v |
| AUDIO 1 | ../../Clip1-1.a |
| AUDIO 2 | ../../Clip1-2.a |
| ⋮ ||
| VERIFICATION STATUS | UNCONFIRMED ▼ |
| SYNCHRONIZATION | ▷ ⊘ ◁◁ ▷▷ |

| Clip CONFIGURATION TABLE ||
|---|---|
| Clip NAME | Clip1 |
| VIDEO | ../../Clip1.v |
| AUDIO 1 | ../../Clip1-1.a |
| AUDIO 2 | ../../Clip2-2a |
| ⋮ ||
| VERIFICATION STATUS | UNCONFIRMED ▼ |
| SYNCHRONIZATION | ▷ ⊘ ◁◁ ▷▷ |

CONFIRMATION FLAG OF Clip 1 CONFIGURATION INFORMATION 0→1

FIG. 21

VOLUME CONFIGURATION INFORMATION OF VERSION 0.x

| |
|---|
| FirstPlay Title CONFIGURATION TABLE (CONFIRMATION FLAG=1) |
| Title1 CONFIGURATION TABLE (CONFIRMATION FLAG=0) |
| Title2 CONFIGURATION TABLE (CONFIRMATION FLAG=0) |
| Title3 CONFIGURATION TABLE (CONFIRMATION FLAG=0) |
| PlayList1 CONFIGURATION TABLE (CONFIRMATION FLAG=1) |
| PlayList2 CONFIGURATION TABLE (CONFIRMATION FLAG=0) |
| PlayList3 CONFIGURATION TABLE (CONFIRMATION FLAG=0) |
| PlayList4 CONFIGURATION TABLE (CONFIRMATION FLAG=1) |
| PlayList5 CONFIGURATION TABLE (CONFIRMATION FLAG=0) |
| PlayList6 CONFIGURATION TABLE (CONFIRMATION FLAG=0) |
| Clip1 CONFIGURATION TABLE (CONFIRMATION FLAG=1) |
| Clip2 CONFIGURATION TABLE (CONFIRMATION FLAG=1) |
| Clip3 CONFIGURATION TABLE (CONFIRMATION FLAG=0) |
| Clip4 CONFIGURATION TABLE (CONFIRMATION FLAG=1) |

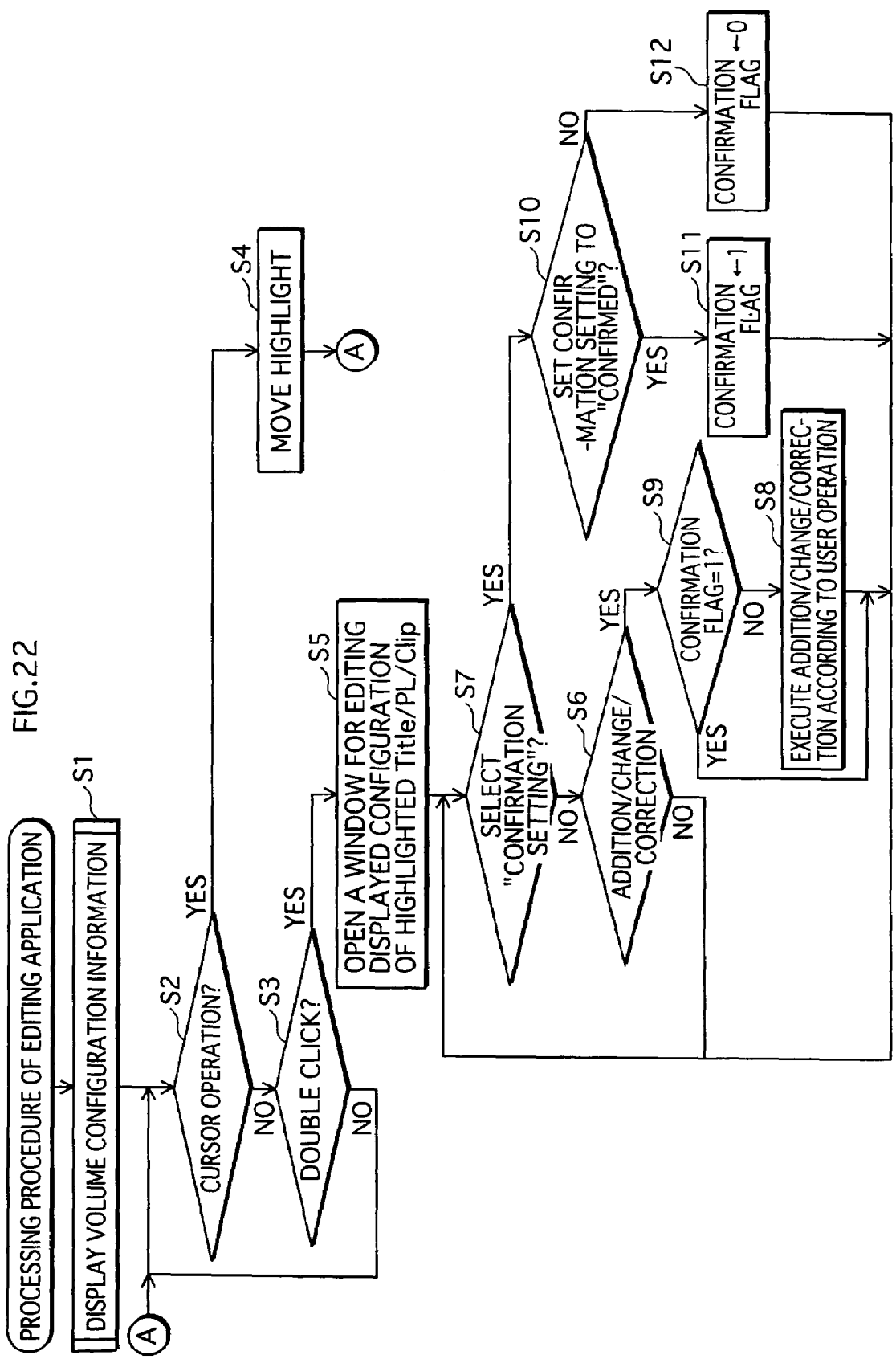

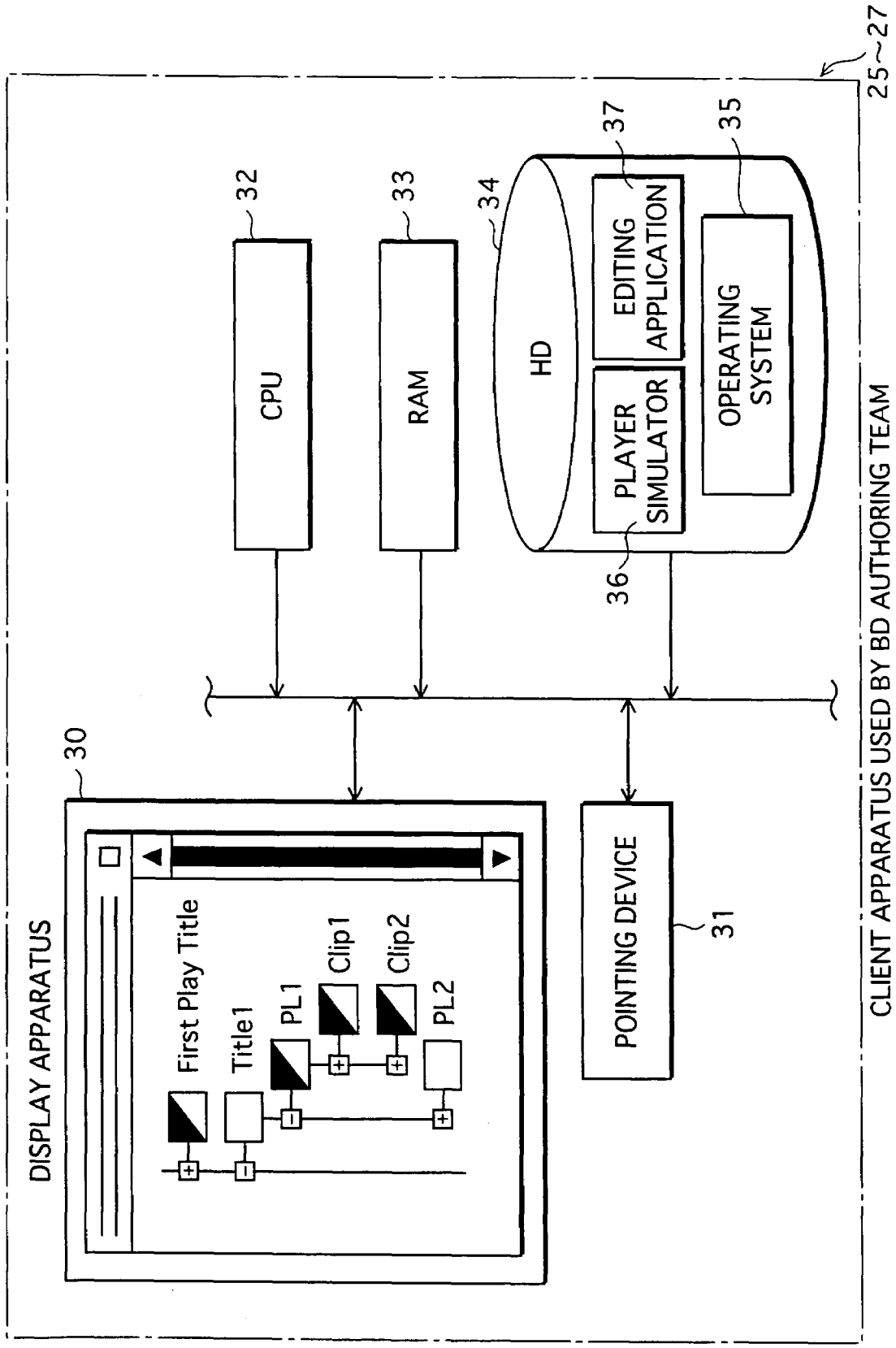

DISPLAY SCREEN WHEN VOLUME CONFIGURATION
OF VERSION 0.x IS DISPLAYED

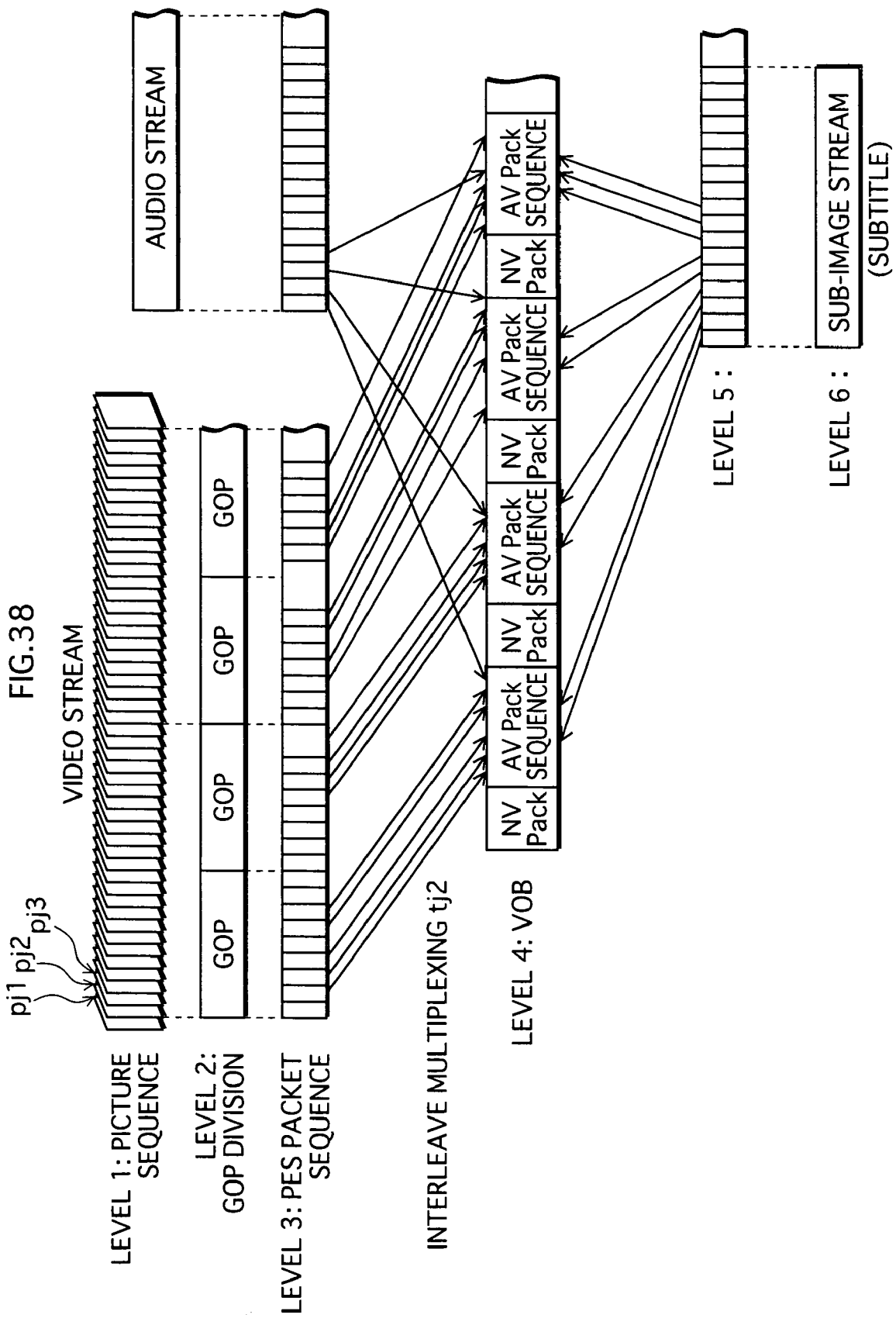

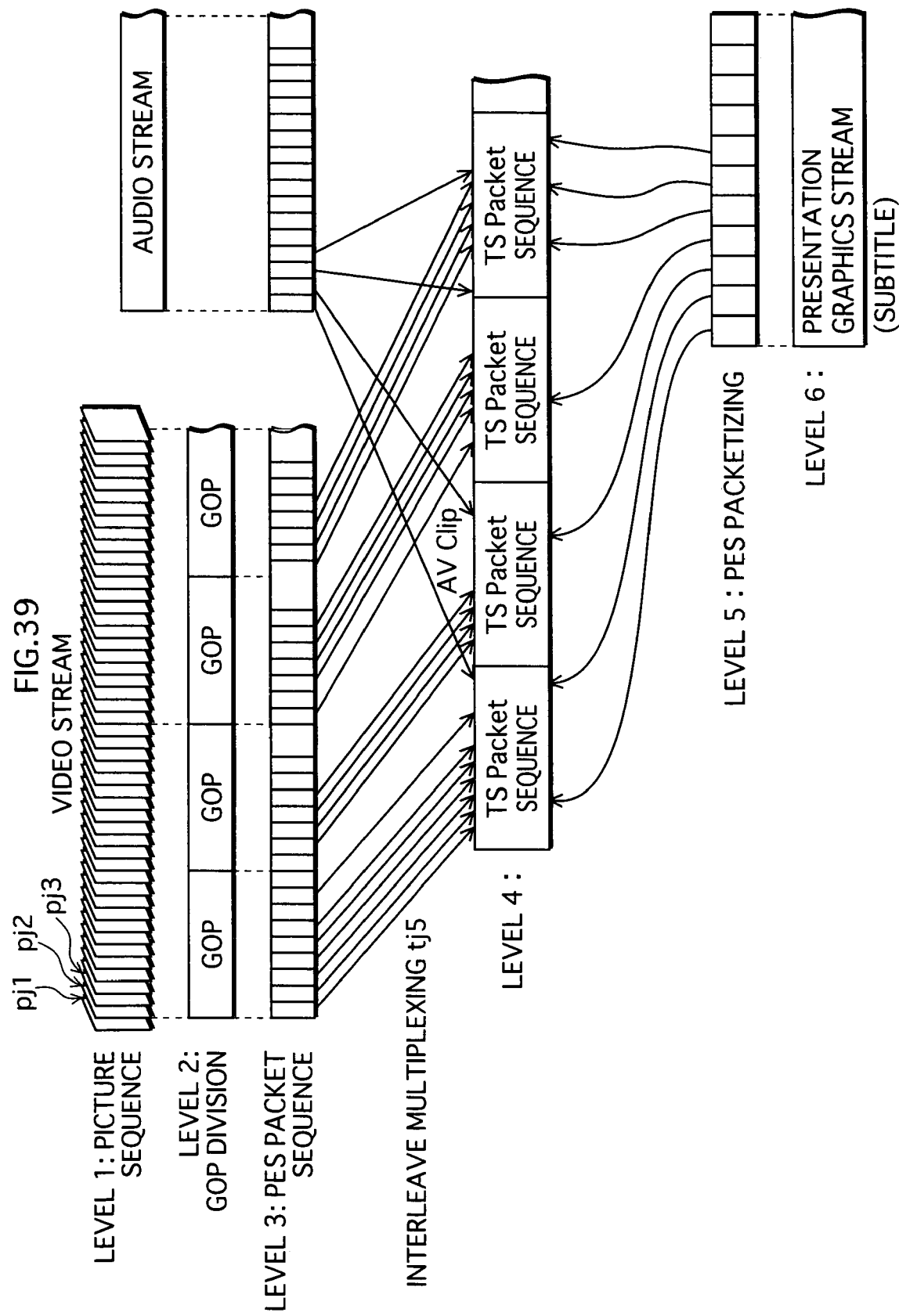

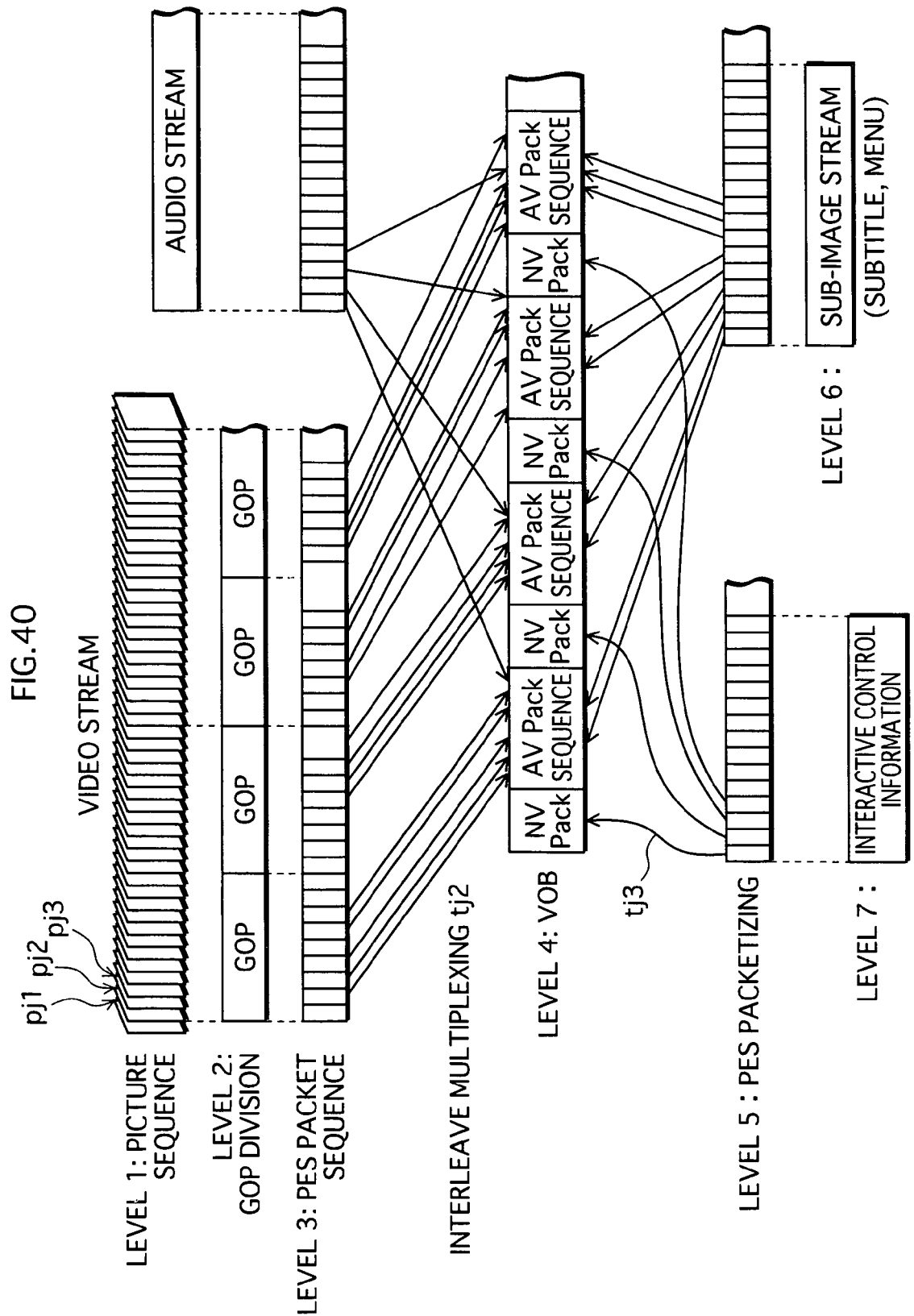

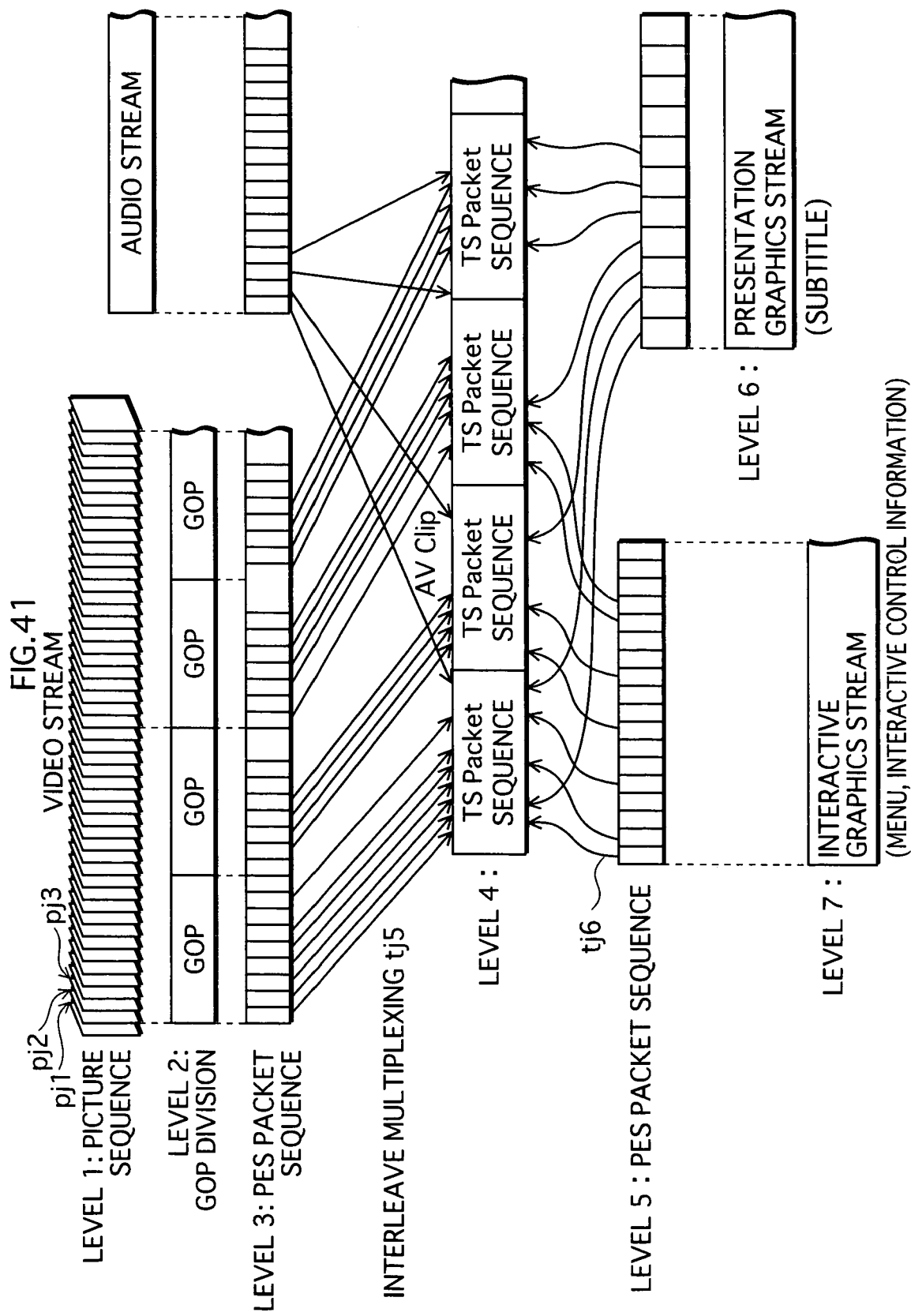

FIG.42

Title1 CONFIGURATION TABLE

| COMMAND SEQUENCE |
| --- |
| Play List 1 |
| COMMAND SEQUENCE |
| Play List 2 |
| COMMAND SEQUENCE |
| Play List 3 |
| COMMAND SEQUENCE |
| CONFIRMATION FLAG |

Title2 CONFIGURATION TABLE

| COMMAND SEQUENCE |
| --- |
| Play List 3 |
| COMMAND SEQUENCE |
| Play List 4 |
| COMMAND SEQUENCE |
| Play List 5 |
| COMMAND SEQUENCE |
| CONFIRMATION FLAG |

Title3 CONFIGURATION TABLE

| COMMAND SEQUENCE |
| --- |
| Play List 6 |
| COMMAND SEQUENCE |
| CONFIRMATION FLAG |

…

AUTHORING SYSTEM, PROGRAM, AND AUTHORING METHOD

BACKGROUND OF THE INVENTION

1. Field of the Invention

The present invention relates to the technical field of an authoring technique for optical discs.

2. Description of the Related Art

Authoring is to, during the manufacturing process of a master disc of optical discs, determine a format to be used in the application layers of the optical discs. Information having the format determined in the authoring process is called volume configuration information. The volume configuration information includes digital streams compressed and encoded according to the MPEG standard and a scenario with respect to the digital streams. The process of determining volume configuration information during the manufacturing process of a master disc of optical discs is called authoring. Conventionally, the authoring process has targeted read-only DVDs (generally called DVD-videos). However, one of the issues attracting attentions these days is how to perform authoring process with read-only Blu-ray discs (hereafter, they will be referred to as BD-ROMs) which will make appearance in the near future. Although distributing movie contents via BD-ROMs is more advantageous than distributing them via DVD-Videos, DVD-videos have overwhelming superiority over BD-ROMs in terms of being established and acknowledged in the society. Even after BD-ROMs have made appearance, it is unlikely that distribution of contents via DVD-Videos will keep on declining. On an assumption that current distribution via DVD-Videos will continue to be used in the future, production studios need to keep in mind distribution via BD-ROMs, in addition to the existing distribution via DVD-Videos. There is fear that burdens on production studios will be doubled because distributing each movie content will take twice as much labor.

SUMMARY OF THE INVENTION

One of ideas is to re-use DVD volume configuration information. Here, to re-use the information means to copy an unfinished piece of DVD volume configuration information which is not yet completed, and take the copy as an initial version of a piece of BD volume configuration information and obtain BD volume configuration information by editing the initial version. There is a problem, however, that since it is not clear in the DVD-Video authoring process how complete a piece of volume configuration information is, playback confirmation is repeatedly performed during a DVD-Video authoring process even on a configuration element that has already been confirmed to have a normal playback. It takes thirty minutes to over one hour to confirm if playback is performed properly, depending on the playback time of a movie production. If many production staff members repeatedly perform playback confirmation process, there is a large loss of labor hours due to the duplicated confirmation process. As a result, there is a possibility that the man-hours spent for a BD-ROM authoring process become as many as those spent for a DVD-Video authoring process, and the advantage of re-using the DVD volume configuration information will be lost.

An object of the present invention is to provide an authoring system by which a piece of volume configuration information generated for a type of optical disc can be efficiently re-used, in an environment where two pieces of volume configuration information for two types of optical discs are developed in parallel.

In order to achieve the object, the present invention presents an authoring system comprising: a first generating unit operable to generate a piece of first volume configuration information for a first optical disc; and a second generating unit operable to copy an unfinished piece of first volume configuration information and to perform an editing processing on the copy so as to obtain a piece of second volume configuration information for a second optical disc, wherein the copy of the unfinished piece of first volume configuration information includes status information indicating, for each of configuration elements, whether or not the configuration element has been confirmed by a user, and the second generating unit displays, when performing the editing processing, the configuration elements of the copy in respectively corresponding modes based on the status information.

With this arrangement, the piece of volume configuration information has a setting of, for each of the configuration elements, whether or not normal playback has been confirmed. Consequently, in a case where the piece of volume configuration information is copied and used as an initial version of the second optical disc, it is possible to find out, at a glance, which ones of the configuration elements have been confirmed to have a normal playback. As a result, it is possible to save work on some of the configuration elements that are in common between the first optical disc and the second optical disc and have been confirmed to have a normal playback. Due to the saving of the work, the intricacy level of the work is lowered; therefore, it is possible to improve the work efficiency with the aforementioned re-use of the information.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 1 is a flow chart that shows the production process of DVD-Videos and BD-ROMs;

FIG. 2 shows the internal configuration of an authoring system;

FIG. 3A shows obtaining SD images and HD images by film-to-video transfer and writing the images into the material storage 4;

FIG. 3B shows obtaining SD images with an SD cam corder and HD images with an HD cam corder and writing the images into the material storage 4;

FIG. 5 shows a configuration that is in common between a piece of DVD volume configuration information and a piece of BD volume configuration information;

FIG. 6A shows an example of the internal configuration of a Clip configuration table;

FIG. 6B shows examples of the internal configurations of PlayList configuration tables;

FIG. 6C shows examples of the internal configurations of Title configuration tables;

FIG. 6D shows what each confirmation flag means;

FIG. 13A shows editing to add a configuration element to a configuration table;

FIG. 13B shows editing to delete a configuration element from a configuration table;

FIG. 13C shows editing to change configuration elements in a configuration table;

FIG. 21 shows a piece of DVD volume configuration information of the version 0.x;

FIG. 22 is a flow chart that shows the processing procedure of an editing application 37;

FIG. 23 shows the configuration that the client apparatuses 25 through 27 have in common;

FIG. 38 shows the process in which a sub-image stream is multiplexed;

FIG. 39 shows the process in which a presentation graphics stream is multiplexed;

FIG. 40 shows the process in which a sub-image stream and a piece of interactive control information are multiplexed;

FIG. 41 shows the process in which a presentation graphics stream and a piece of interactive control information are multiplexed; and FIG. 42 shows examples of Title configuration tables in which commands are described.

DESCRIPTION OF THE PREFERRED EMBODIMENTS

The First Embodiment

Figure 4:
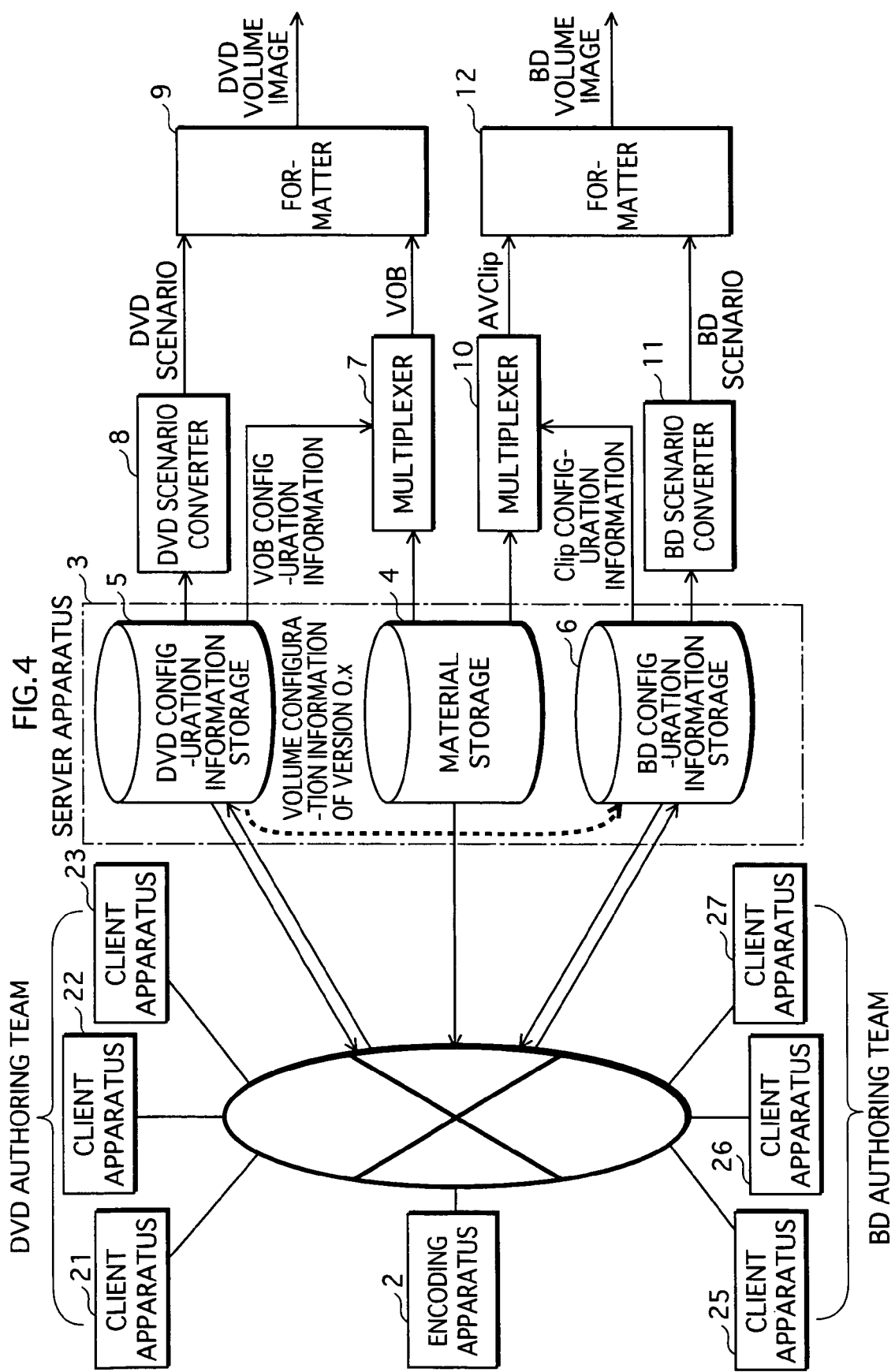
FIG. 4 is an enlarged view of the internal configuration of the server apparatus 3.

The following describes an embodiment of the authoring system of the present invention. Firstly, an embodiment related to a usage configuration of the authoring system of the present invention will be described. The authoring system of the present invention is used in the production process of DVD-Videos and BD-ROMs. FIG. 1 is a flowchart that shows the production process of DVD-Videos and BD-ROMs. A series of work steps for distributing a movie content via a DVD includes the following steps: a planning step of determining a plot with which a disc is to be played back (Step S101); a material creating step of creating materials by video recording and audio recording (Step S102); a scenario generating step of generating a piece of DVD volume configuration information based on the plot generated in the planning step (Step S103); a material encoding step of encoding each of video materials, audio materials, and sub-image materials so as to obtain elementary streams (Step S104); a multiplexing step of interleave-multiplexing a plurality of elementary streams and converting them into a digital stream (Step S105); a formatting step of generating various types of information based on the piece of DVD volume configuration information and having scenarios and the digital stream fit to the DVD format (Step S106); an emulation step of playing back a volume image and checking whether or not the result of the authoring process is correct (Step S107); and a press step of producing a master disc of the DVD-Video and pressing to complete the DVD-Video (Step S108).

A series of work steps for distributing a movie content via a BD-ROM includes the following steps: a scenario generating step of obtaining a piece of BD volume configuration information (Step S203); a material encoding step of encoding each of video materials, audio materials, and sub-image materials so as to obtain elementary streams (Step S204); a multiplexing step of interleave-multiplexing a plurality of elementary streams and converting them into a digital stream (Step S205); a formatting step of, based on the BD volume configuration information, having scenarios and the digital stream fit to the BD-ROM format (Step S206); an emulation step of playing back a volume image and checking whether or not the result of the authoring process is correct (Step S207); and a press step of producing a master disc of the BD-ROM and pressing to complete the BD-ROM (Step S208).

A characteristic step among these steps is Step S201 in which an unfinished piece of DVD volume configuration information (a piece of DVD volume configuration information of the version 0.x) is copied and used as a version 0.1 of BD volume configuration information. The gist of the present invention lies in that the time required for producing a piece of BD volume configuration information is shortened due to the re-use of DVD volume configuration information.

Among the aforementioned steps, the steps in S103 through S107 are called DVD-Video authoring process, and the steps in S203 through S207 are called BD-ROM authoring process. These DVD-Video authoring process and BD-ROM authoring process may be executed with a system shown in FIG. 2.

FIG. 2 shows the internal configuration of an authoring system. As shown in the drawing, the authoring system comprises: an input apparatus 1, an encoding apparatus 2, a server apparatus 3, a material storage 4, a DVD configuration information storage 5, a BD configuration information storage 6, a multiplexer 7, a scenario converter 8, a formatter 9, a multiplexer 8, a scenario converter 11, a formatter 12, client apparatuses 21 through 23, and client apparatuses 25 through 27.

A video cassette storing HD images or SD images is mounted onto the input apparatus 1, which plays back the video cassette and outputs playback signals to the encoding apparatus 2.

The encoding apparatus 2 encodes the playback signals outputted from the input apparatus 1 so as to obtain elementary streams such as a video stream and an audio stream. The obtained elementary streams are outputted to the server apparatus 3 via a LAN and written into the material storage 4 within the server apparatus 3.

The server apparatus 3 is made up of three driving apparatuses such as the material storage 4, the DVD configuration information storage 5, and the BD configuration information storage 6. FIG. 4 is an enlarged view of the internal configuration of the server apparatus 3.

The material storage 4 is a built-in disc apparatus within the server apparatus 3 and sequentially stores therein the elementary streams obtained by the encoding of the encoding apparatus 2. The material storage 4 has two directories such as an HD stream directory and an SD stream directory. Elementary streams obtained by encoding HD images are written to the HD stream directory. Elementary streams obtained by encoding SD images are written to the SD stream directory. FIG. 3A shows obtaining SD images and HD images by film-to-video transfer and writing the images into the material storage 4. SD images and HD images obtained through film-to-video transfer are encoded by the encoding apparatus 2 and become elementary streams. Of the elementary streams obtained in this manner, elementary streams corresponding to HD images are written to the HD stream directory, and elementary streams corresponding to the SD images are written to the SD stream directory.

FIG. 3B shows obtaining SD images with an SD cam corder and HD images with an HD cam corder and writing the images into the material storage 4. An HD video cassette is a recording medium on which HD images are recorded. HD images shot by an HD cam corder are recorded on the HD video cassette. Reports and interviews with movie actors are supplied to the system in the form of such an HD video cassette. SD images shot by an SD cam corder is recorded on an SD video cassette. So-called "making of" images are supplied to the system in the form of an SD video cassette. These SD images and HD images are encoded by the encoding apparatus 2 so as to become elementary streams and written to the HD stream directory and the SD stream directory. Since outtakes are HD images, and interview images are also HD images while "making-of" images are SD images, the types of the materials are not uniform. For this reason, in order to perform a BD-ROM authoring process, some of the materials in a DVD-Video authoring process may be used as they are, and some of the materials may need to be replaced with other materials.

The DVD configuration information storage 5 is a driving apparatus operable to store therein DVD volume configuration information. The DVD configuration information storage 5 is a so-called "full-access" driving apparatus to and from which data may be written and read freely. The results of the processing performed by the client apparatuses 21 through 23 are put into the DVD configuration information storage 5.

The BD configuration information storage 6 is a driving apparatus operable to store therein BD volume configuration information. The BD configuration information storage 6 is a so-called "full-access" driving apparatus to and from which data may be written and read freely. The results of the processing performed by the client apparatuses 25 through 27 are put into the BD configuration information storage 6.

Out of the elementary streams stored in the HD stream directory and the SD stream directory within the material storage 4, the multiplexer 7 reads elementary streams that are specified by a piece of DVD volume configuration information and multiplexes the read elementary streams according to the piece of DVD volume configuration information so as to obtain a Clip, which is a multiplexed stream.

The DVD scenario converter 8 converts the DVD volume configuration information stored in the DVD configuration information storage 5 so that it has a DVD-Video application format and obtains a DVD-Video scenario.

The formatter 9 has the Clip obtained by the multiplexer 7 and the DVD-Video scenario obtained by the scenario converter 8 fit to a DVD-Video application layer format.

Out of the elementary streams stored in the HD stream directory and the SD stream directory within the material storage 4, the multiplexer 10 reads elementary streams that are specified by a piece of BD volume configuration information and multiplexes the read elementary streams according to the piece of BD volume configuration information so as to obtain a Clip, which is a multiplexed stream.

The scenario converter 11 converts the BD volume configuration information stored in the BD configuration information storage 6 so that it has a BD-ROM application format and obtains a BD scenario.

The formatter 12 has the Clip obtained by the multiplexer 10 and the BD scenario obtained by the scenario converter 11 fit to a BD-ROM application layer format.

The client apparatuses 21 through 23 are operated by production staff who is in charge of the DVD-Video authoring process and generate DVD volume configuration information according to user operations.

The client apparatuses 25 through 27 are operated by production staff who is in charge of the BD-ROM authoring process and generate BD volume configuration information according to user operations.

So far, description of the configuration of the system has been provided. The following describes DVD volume configuration information and BD volume configuration information. The internal configurations of a piece of DVD volume configuration information and a piece of BD volume configuration information are shown in FIG. 5. FIG. 5 shows the configuration that is in common between the piece of DVD volume configuration information and the piece of BD volume configuration information. As shown in the drawing, the piece of volume configuration information is made up of a plurality of Title configuration tables (Title 1, 2, 3 configuration tables), a plurality of PlayList configuration tables (PlayList 1, 2, 3, 4, 5, 6 configuration tables), and a plurality of Clip configuration tables (Clip 1, 2, 3, 4 configuration tables).

These configuration elements such as Titles, PlayLists, and Clips are abstract representations of configuration elements of a DVD-Video volume image and a BD-ROM volume image. With regards to a DVD-Video, Clips correspond to VOBs in the DVD-Video, PlayLists correspond to PGCs in the DVD-Video, and Titles correspond to VTS-TT in the DVD-Video.

With regards to a BD-ROM, Clips correspond to AV Clips in the BD-ROM, PlayLists correspond to PlayLists in the BD-ROM, and Titles correspond to Titles in the BD-ROM.

FIG. 6A shows an example of the internal configuration of a Clip configuration table. In the drawing, the Clip configuration table includes a piece of video stream information, pieces of audio stream information (audio stream information 1 and 2), and a confirmation flag. The piece of video stream information is made up of a material name "Video" and a piece of link information "./../clip.v". The piece of link information in this example is a file path that specifies a file in one of the directories within the material storage 4.

The piece of audio stream information is made up of material names "audio1" and "audio2", a piece of link information (./../Clip1-1.a, ./,,/Clip1-2.a) in a database, and offsets "offset1" and "offset2". Each of the pieces of link information is a file path that specifies the location of an audio stream in the material storage 4. Each of the offsets shows a playback starting time of an audio stream using the playback starting time of the video stream as a reference point.

FIG. 6B shows examples of the internal configurations of PlayList configuration tables. A PlayList is a unit of playback defined by determining the order in which a plurality of Clips are to be played back. A PlayList configuration table (PlayList Configuration Table 1) includes a plurality of Clip names (Clip 1, Clip 2) being arranged, the playback starting points of the Clips (In 1, In 2), the playback ending points of the Clips (Out 1, Out 2), and a confirmation flag. Another PlayList configuration table (PlayList Configuration Table 2) includes a plurality of Clip names (Clip 3, Clip 4) being arranged, the playback starting points of the Clips (In 3, In 4), the playback ending points of the Clips (Out 3, Out 4), and a confirmation flag.

FIG. 6C shows examples of the internal configurations of Title configuration tables. Each Title configuration table includes a plurality of PlayList names and a confirmation flag. A Title is a unit of playback that contains one or more PlayLists. There are two types of Titles. One is a FirstPlay Title and the other is a general Title such as Titles 1, 2, and 3. The Title configuration tables in FIG. 6C show the internal configurations of the latter, general Titles. As shown in FIG. 6C, the Title 1 configuration table includes a plurality of PlayList names (PlayLists 1 and 2) being arranged and a confirmation flag. The Title 2 configuration table includes a plurality of PlayList names (PlayLists 3, 4, and 5) being arranged and a confirmation flag. The Title 3 configuration table includes a PlayList name (PlayList 6) and a confirmation flag. The former example, a FirstPlay Title, is a Title for displaying a menu (it will be referred to as a volume menu in the case of a DVD-Video and as a top menu in the case of a BD-ROM) for a whole optical disc when the optical disc is mounted. In a Title configuration table corresponding to a FirstPlay Title, one or more PlayLists are written, and in each of the PlayList configuration tables corresponding to the PlayLists, a Clip name of a Clip for displaying a menu for the whole optical disc is written.

FIG. 6D shows what each confirmation flag means. When a confirmation flag is set to "=0", it means that a Clip configuration table, a PlayList configuration table, or a Title configuration table that includes the confirmation flag has not been confirmed to be proper. On the other hand, when a confirmation flag is set to "1", it means that a Clip configuration table, a PlayList configuration table, or a Title configuration table that includes the confirmation flag has been confirmed to be proper. The larger the number of Title configuration tables, PlayList configuration tables, and Clip configuration tables included in a piece of volume configuration information having confirmation flags being set to "1" is, the closer the piece of volume configuration information is to its completion. Conversely, the smaller the number of Title configuration tables, PlayList configuration tables, and Clip configuration tables included in a piece of volume configuration information having confirmation flags being set to "=0" is, the farther the piece of volume configuration information is from its completion. The levels of completion of a piece of volume configuration information are expressed by version numbers.

Figure 7:
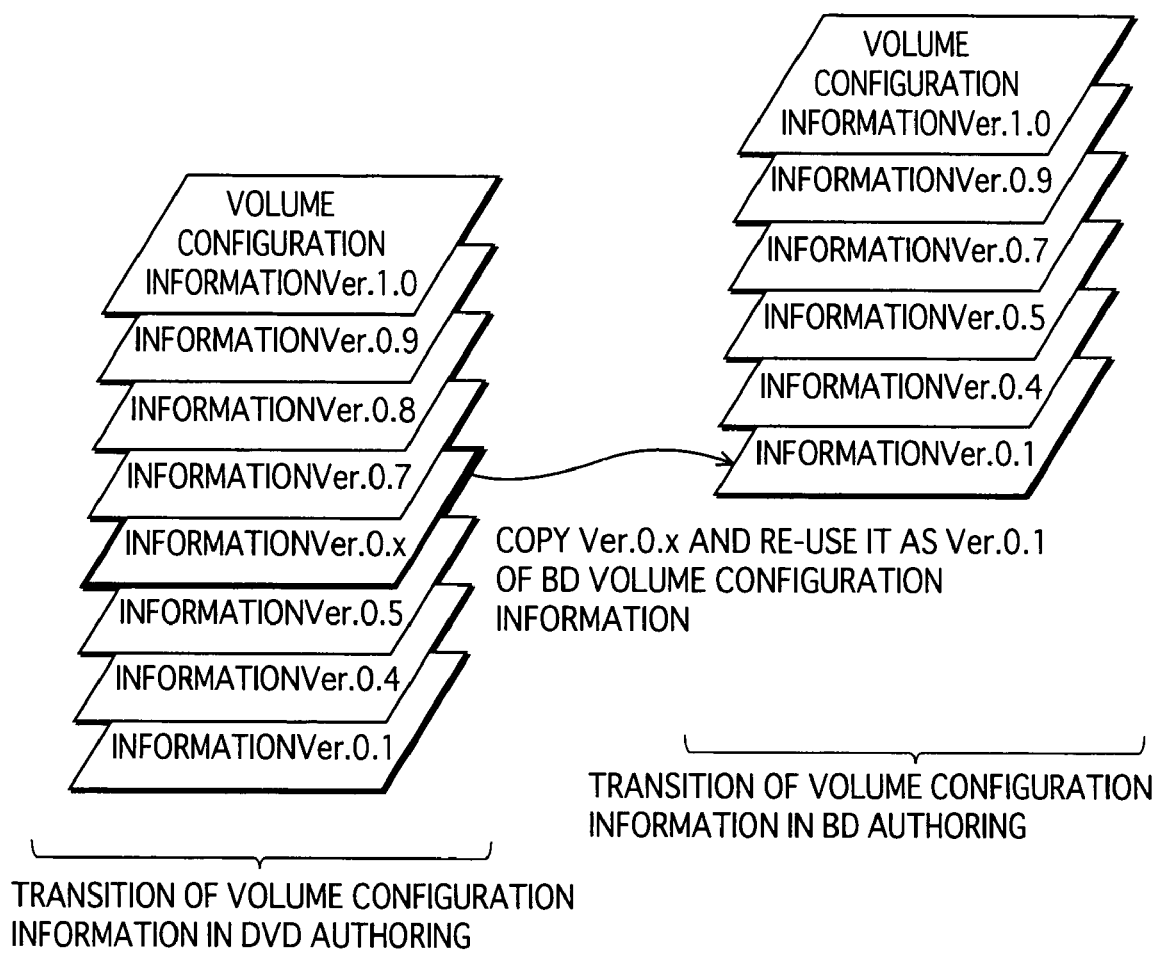
FIG. 7 shows the levels of completion of a piece of DVD volume configuration information and a piece of BD volume configuration information that are indicated with version numbers.

The left side of FIG. 7 shows the levels of completion of a piece of DVD volume configuration information that are expressed with version numbers. In the drawing, the version number gets larger in increments of 0.1 such as "0.1", "0.2", "0.3", ... "0.7". When the version number becomes "1.0", the piece of volume configuration information is considered to be completed. The increases in the version numbers are defined by the aforementioned confirmation flags. To be more specific, the larger the number of configuration tables is that have a confirmation flag being set to "1", the closer the version number of the piece of volume configuration information is to 1. The right side of FIG. 7 shows version updates of a piece of BD-ROM volume configuration information. The version number of a piece of BD-ROM volume configuration information also starts with 0.1 and gets larger in increments of 0.1 such as "0.1", "0.2", "0.3", ... "0.7". A version number "0.1" for a piece of BD volume configuration information is the smallest possible version number. A user does not make from scratch a version 0.1 of a piece of BD volume configuration information. The user copies an unfinished version 0.x of a piece of DVD volume configuration information and uses it as the version 0.1 of a piece of BD volume configuration information. Since the piece of BD volume configuration information is generated using the version 0.x of the piece of DVD-Video as a base, the man-hours spent for generating the piece of BD volume configuration information is relatively shorter than the man-hours spent for generation of the piece of DVD volume configuration information.

Here, the reason why a version 1.0 of a piece of DVD volume configuration information is not used as a version 0.1 of a piece of BD volume configuration information is because waiting for completion of the piece of DVD volume configuration information will delay the completion of the piece of BD volume configuration information. For this reason, a version 0.x of a piece of DVD volume configuration information is re-used as a version 0.1 of a piece of BD volume configuration information.

Figure 8:
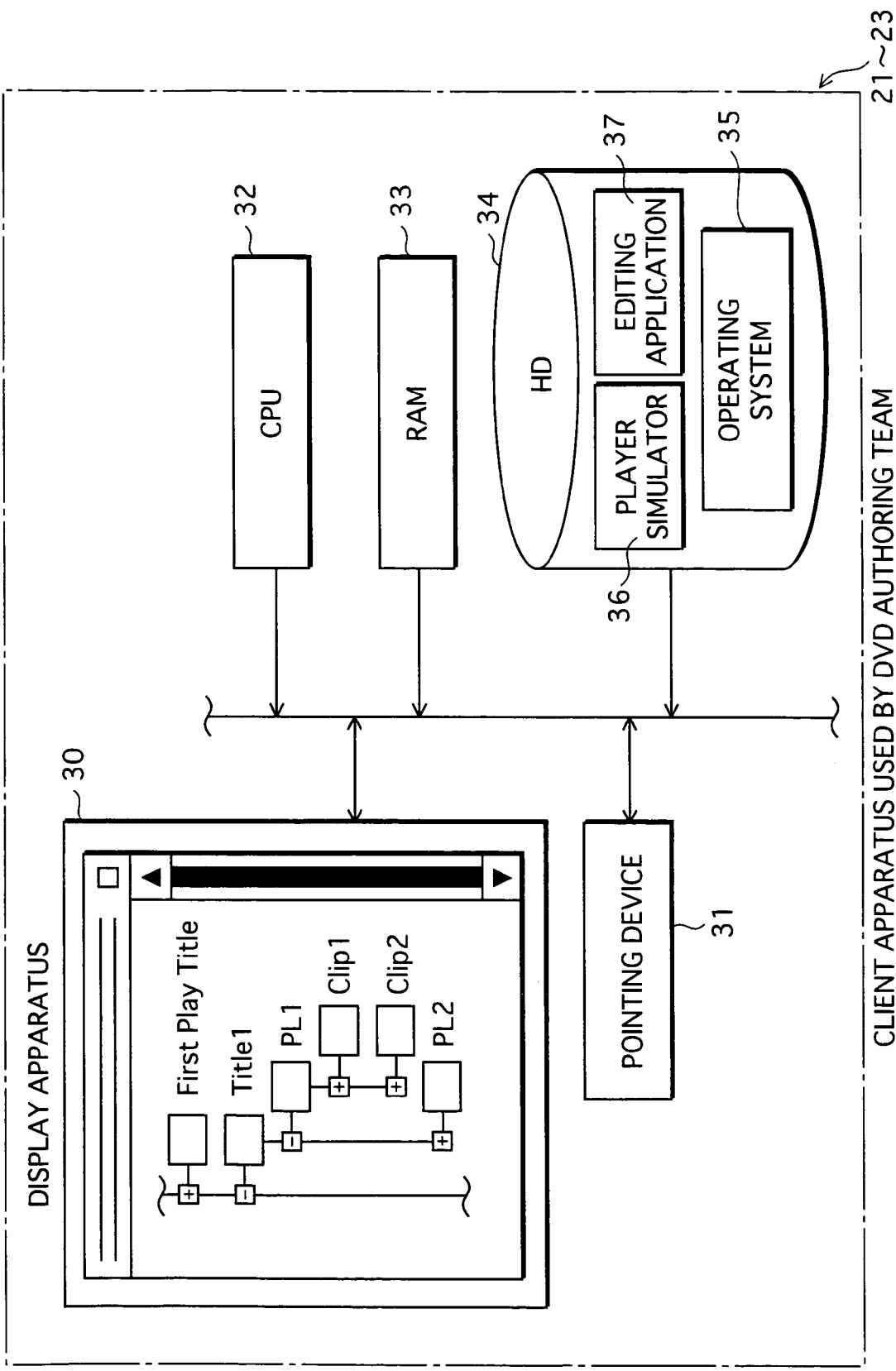
FIG. 8 shows the internal configuration that the client apparatuses 21 through 23 have in common.

So far, the configurations in common between the BD volume configuration information and the DVD volume configuration information have been explained. The following describes the internal configurations of the Client apparatuses 21 through 23. The client apparatuses 21 through 23 have the internal configuration shown in FIG. 8 in common.

As shown in the drawing, each of the client apparatuses 21 through 23 is a typical computer that comprises a display apparatus 30, a pointing device 31, a CPU 32, a RAM 33, and a hard disk 34. In the drawing, one of the characteristics lies in the pieces of software (an operating system 35, a player simulator 36, and an editing application 37) stored in the hard disk 34.

The Operating System 35

Figure 9:
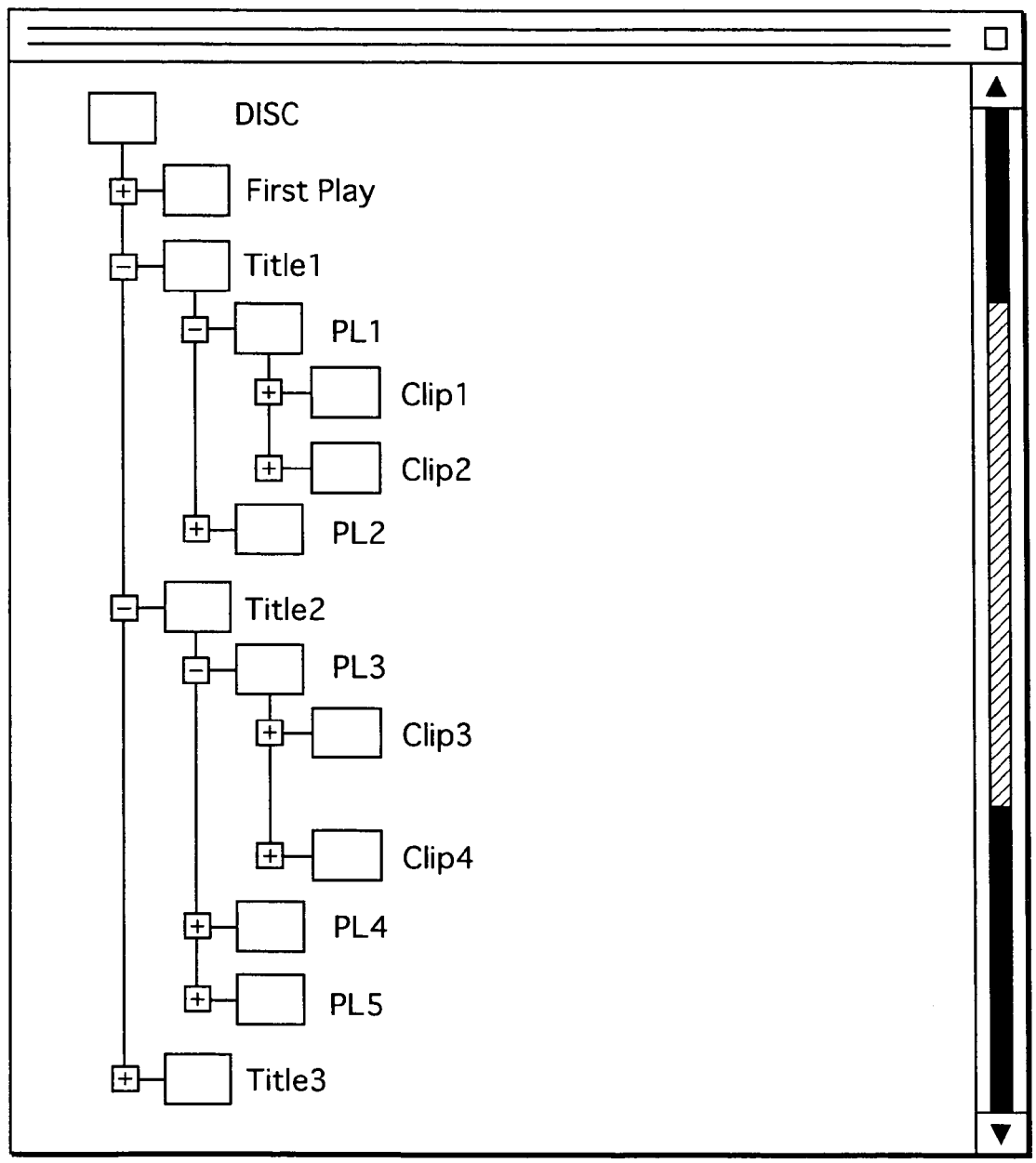
FIG. 9 shows a GUI screen displayed on the display apparatus 30.
Figure 10:
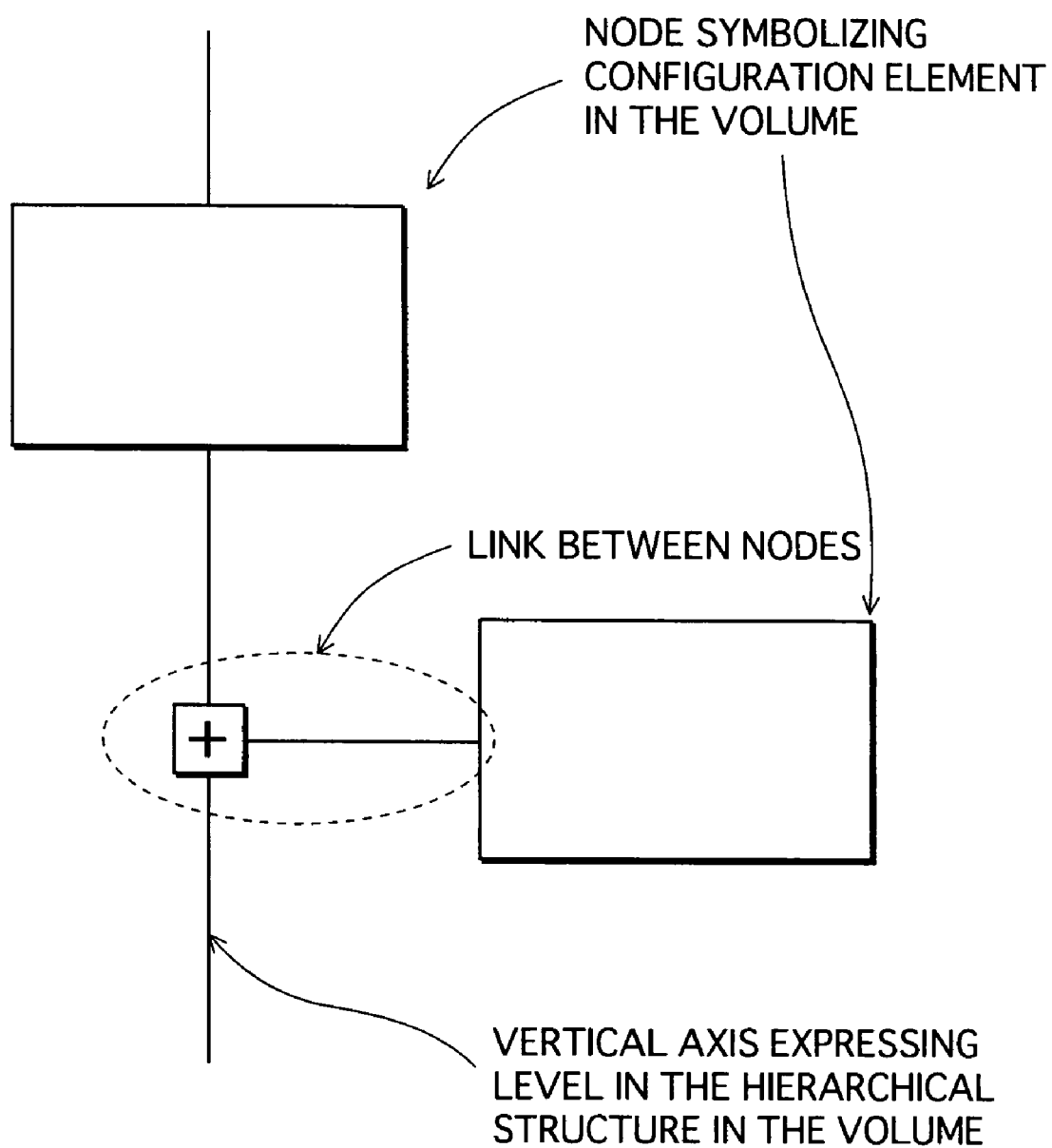
FIG. 10 shows GUI parts that constitute the display example in FIG. 9.

The operating system 35 has a browser function for accessing the material storage 4 the DVD configuration information storage 5 via a LAN and displaying the logical structure of a piece of DVD volume configuration information stored in the material storage 4 and the DVD configuration information storage 5. FIG. 9 shows a GUI screen displayed on the display apparatus 30 and indicates the logical structure of a piece of DVD volume configuration information. FIG. 10 shows GUI parts that constitute the display example in FIG. 9. Three types of GUI parts are used in FIG. 9. One is "nodes" for representing configuration elements of the piece of volume configuration information, such as Clips, PlayLists, and Titles. Another one is "vertical axes" for representing hierarchical layers in the piece of volume configuration information. The other one is "links" representing belonging relationship indicating which node belongs to which node.

Figure 11:
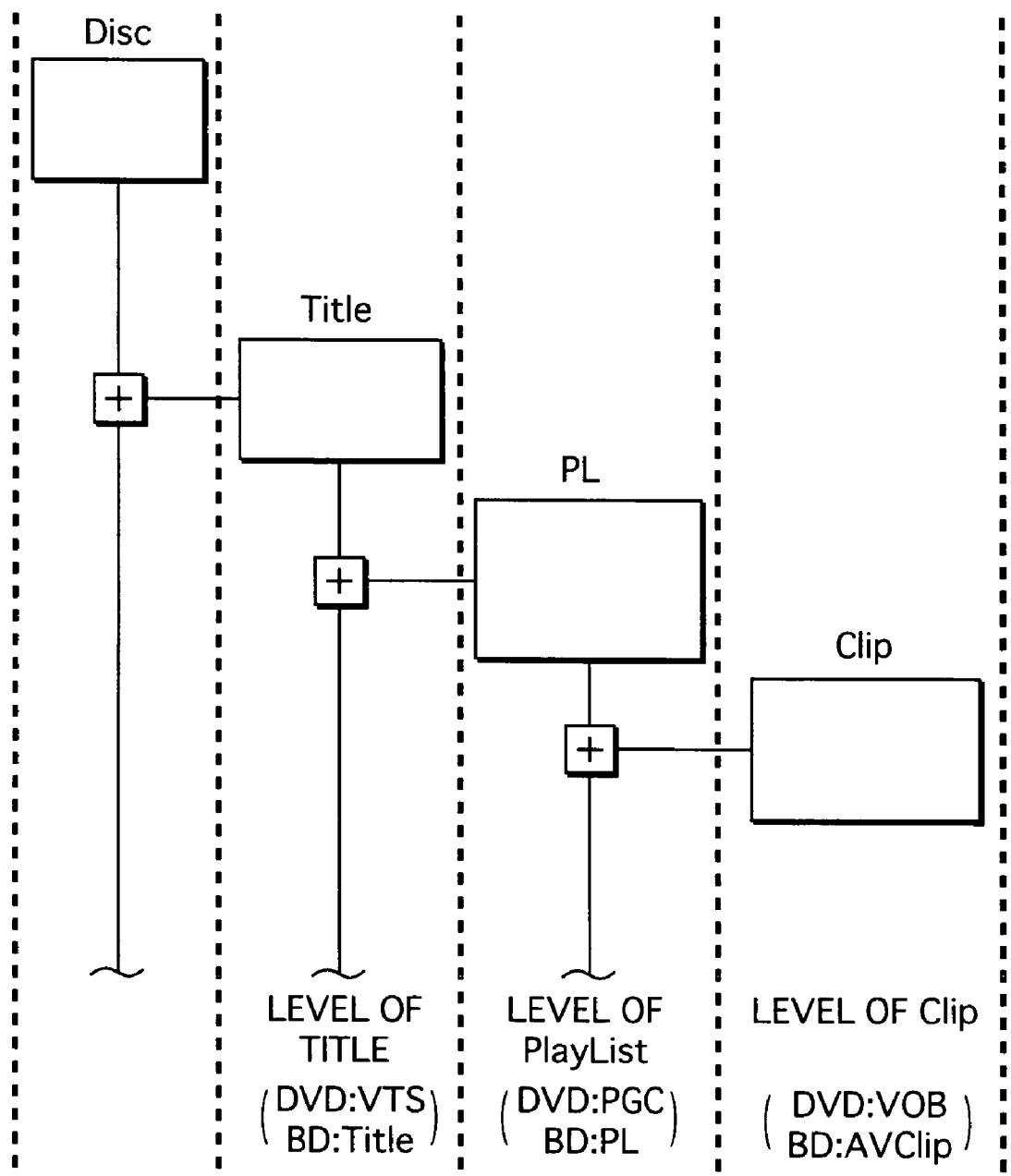
FIG. 11 shows hierarchical layers in a logical structure of a piece of volume configuration information.

The logical structure of a piece of DVD volume configuration information is expressed by connecting nodes with links. FIG. 11 shows hierarchical layers in the logical structure of a piece of volume configuration information. The vertical axes in the drawing symbolically represent hierarchical layers in the logical structure of the piece of volume configuration information. The four vertical axes represent a disc level, a Title level, a PlayList level, and a Clip level, respectively. The logical structure of the piece of volume configuration information is expressed by connecting nodes to these vertical axes. The logical structure shown in the drawing symbolizes the logical structure of a DVD-Video and the logical structure of a BD-ROM.

The Player Simulator 36

The player simulator 36 performs playback simulation of a DVD playback apparatus on the client apparatuses 21 through 23. The playback simulation includes Clip configuration table playback, PlayList configuration playback, and Title configuration table playback. The Clip configuration table playback is to perform simulation of Clip playback by reading an elementary stream from the material storage 4 according to the link information written in a Clip configuration table and to play back the elementary stream on the client apparatuses 21 through 23.

The PlayList configuration table playback is to perform simulation of PlayList playback by executing the Clip configuration table playback for each of the Clip configuration tables written in a PlayList configuration table. The targeted Clip configuration tables are from a playback starting point to a playback ending point that are in correspondence with each of the Clips in the PlayList configuration table.

The Title configuration table playback is to perform simulation of Title playback by executing the PlayList configuration table playback for each of the PlayLists written in a Title configuration table. By executing the aforementioned simulations on the client apparatuses 21 through 23, it is possible to confirm each of the configuration elements such as Clips, PlayLists, and Titles, of a piece of volume configuration information.

The Editing Application 37

The editing application 37 edits Clip configuration tables, PlayList configuration tables, and Title configuration tables stored in the material storage 4, according to user operations. When a double click is made on a node corresponding to a Clip/PlayList/Title in a GUI image, the editing application 37 opens a window for editing a Clip configuration table/PlayList Configuration table/Title configuration table that is in correspondence with the node. Then, according to user operations onto the window, the editing application 37 executes editing processing for the Clip configuration table/PlayList configuration table/Title configuration table.

Editing of Clip Configuration Tables

Firstly, the following describes editing of a Clip configuration table.

Figure 12:
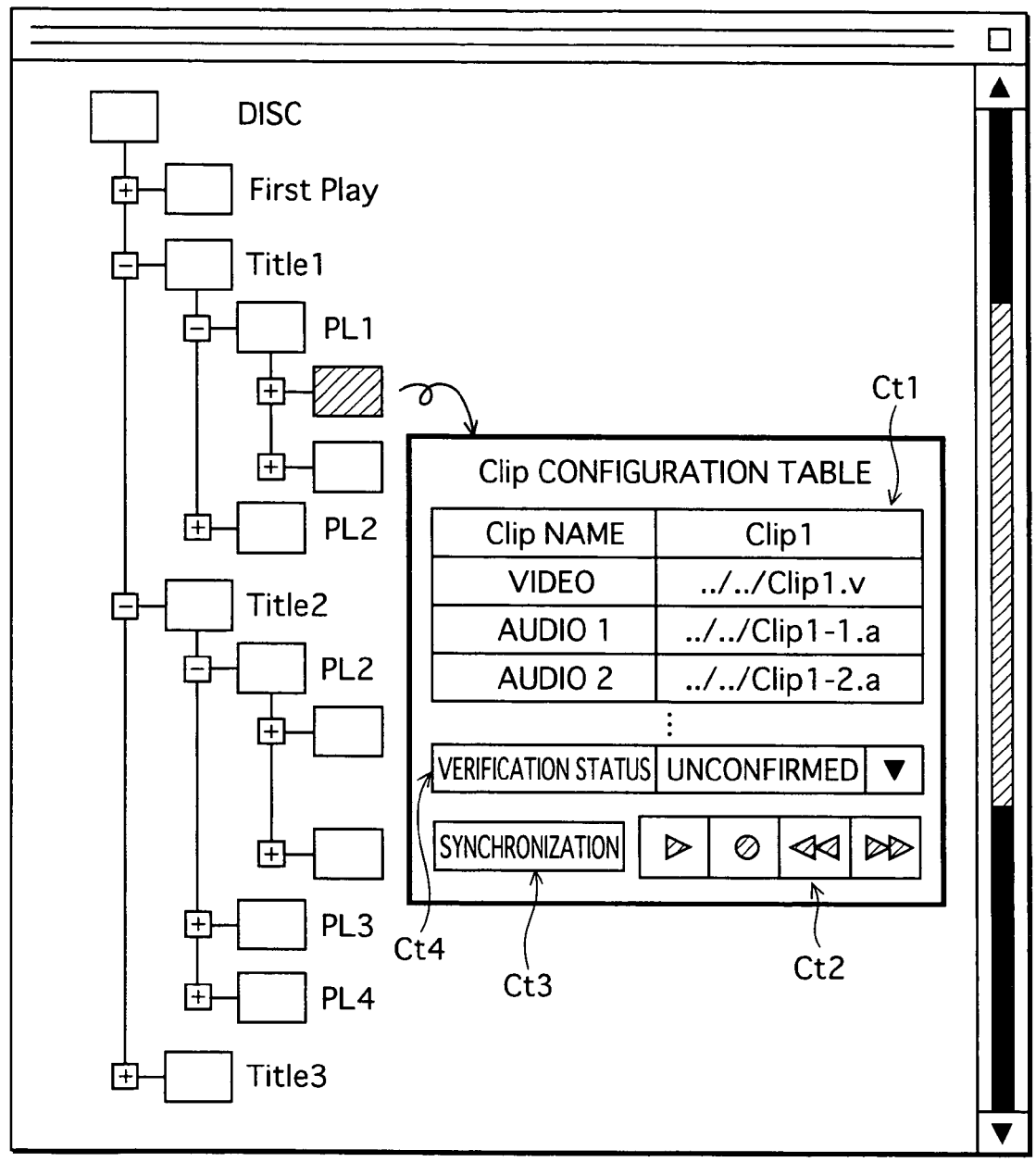
FIG. 12 shows a window for editing a Clip configuration table.

FIG. 12 shows a window for editing a Clip configuration table. In the window shown in the drawing, a Clip configuration table GUI ct1, a playback control panel ct 2, a synchronization panel ct3, and a verification status menu ct4 are provided.

The "Clip configuration table GUI ct1" receives an editing operation onto a Clip configuration table from a user.

FIGS. 13A, 13B, and 13C show examples of editing operations onto a Clip configuration table GUI. FIG. 13A shows editing to add a configuration element to a configuration table. In a configuration table, when one of pieces of link information for an elementary stream is highlighted and the user selects the item indicated as "NEW ADDITION", a new line is added to the Clip configuration table. A new configuration element of the Clip is added when a piece of link information for the elementary stream is written into the new line.

FIG. 13B shows editing to delete a configuration element. When one of the lines in a Clip configuration table is highlighted and the user opens the pull-down menu and selects "DELETE", one of the configuration elements of the Clip configuration table gets deleted.

FIG. 13C shows editing to change configuration elements in the window. When one of the lines is highlighted and the user operates on a keyboard, a key cursor will appear in the line. When the user moves the cursor and rewrites the piece of link information in the line, the user is able to alter the configuration of the Clip. Thus completes the description of the editing processing onto the Clip configuration table GUI. The following description again refers to FIG. 12.

Figure 14:
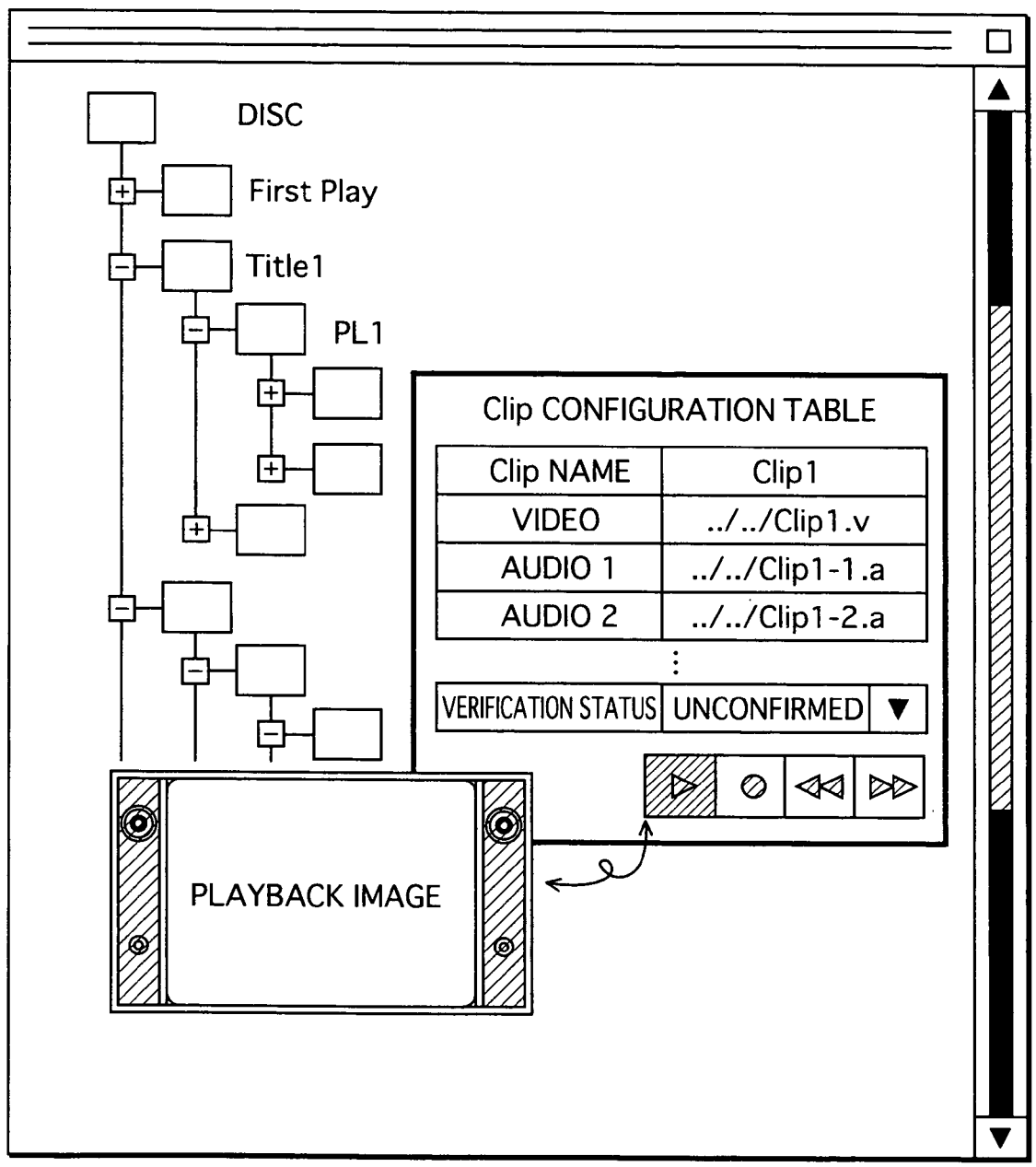
FIG. 14 shows a playback image to be displayed when an operation is performed on the playback panel.

The "playback control panel ct2" receives an operation to instruct the player simulator 36 to execute the Clip configuration table playback. FIG. 14 shows a playback image to be displayed when an operation is conducted on the playback panel. When the playback button in the playback panel shown in the drawing is double-clicked, a Clip configuration table playback is to be performed. Then, a playback image appears in the window. Through such a Clip configuration table playback, it is possible to confirm whether synchronization of video and audio is correct or not on the client apparatuses.

Figure 15:
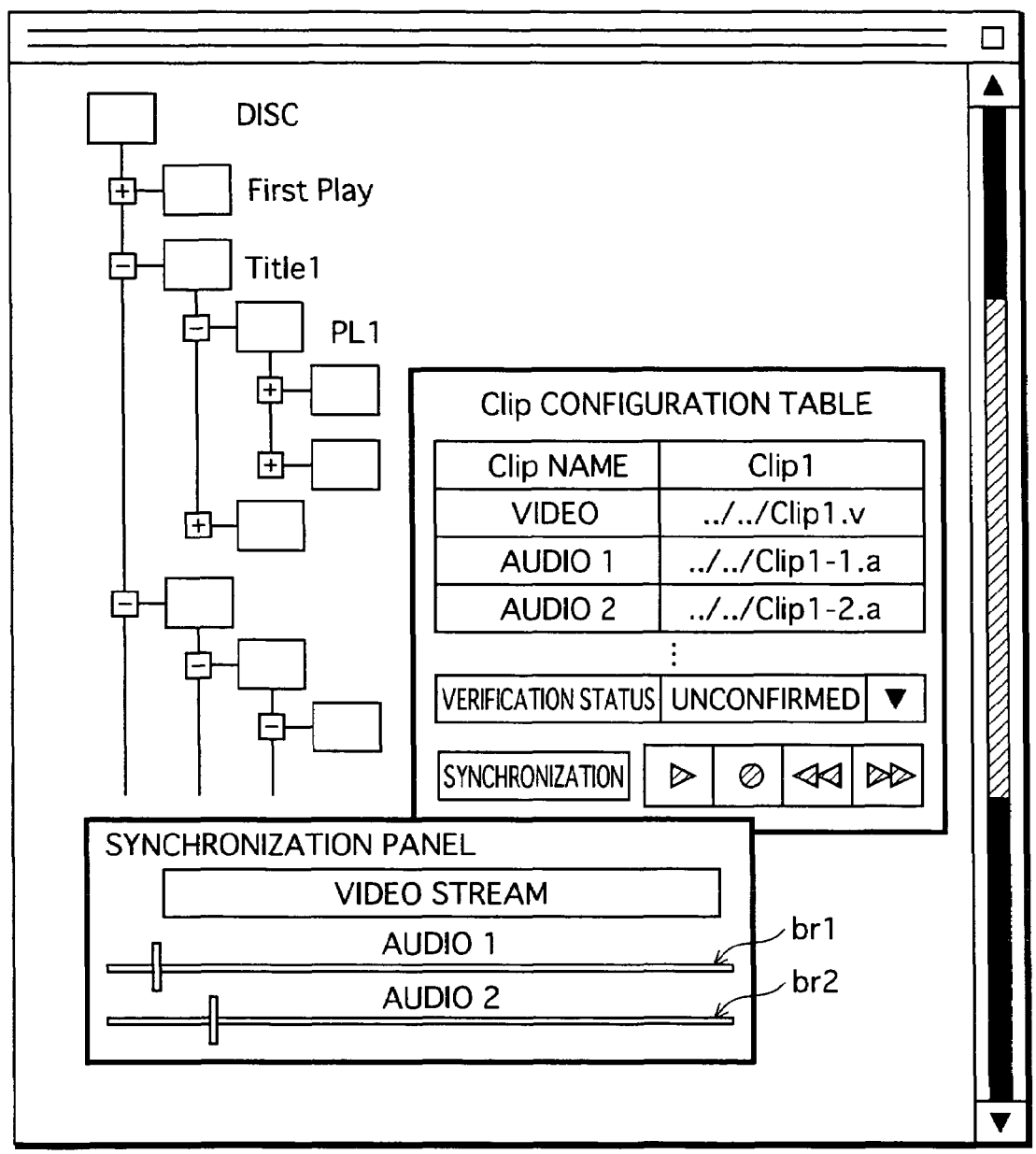
FIG. 15 shows a window to be displayed when a double click is applied on a synchronization panel.

The "synchronization panel ct3" receives an operation from the user to increase or decrease an offset in a piece of audio information in a Clip configuration table. FIG. 15 shows a window to be displayed when a double click is applied on the synchronization panel. The window shown in the drawing has slide bars br1 and br2 that are in correspondence with the audio streams in the Clip configuration table respectively. When each slide bar is moved to the right, the offset in a piece of audio configuration information is increased. When each slide bar is moved to the left, the offset in a piece of audio configuration information is decreased. By increasing or decreasing the offsets in the audio streams using such a synchronization panel, it is possible to remove unsynchronization between the video and the audio.

Figure 16:
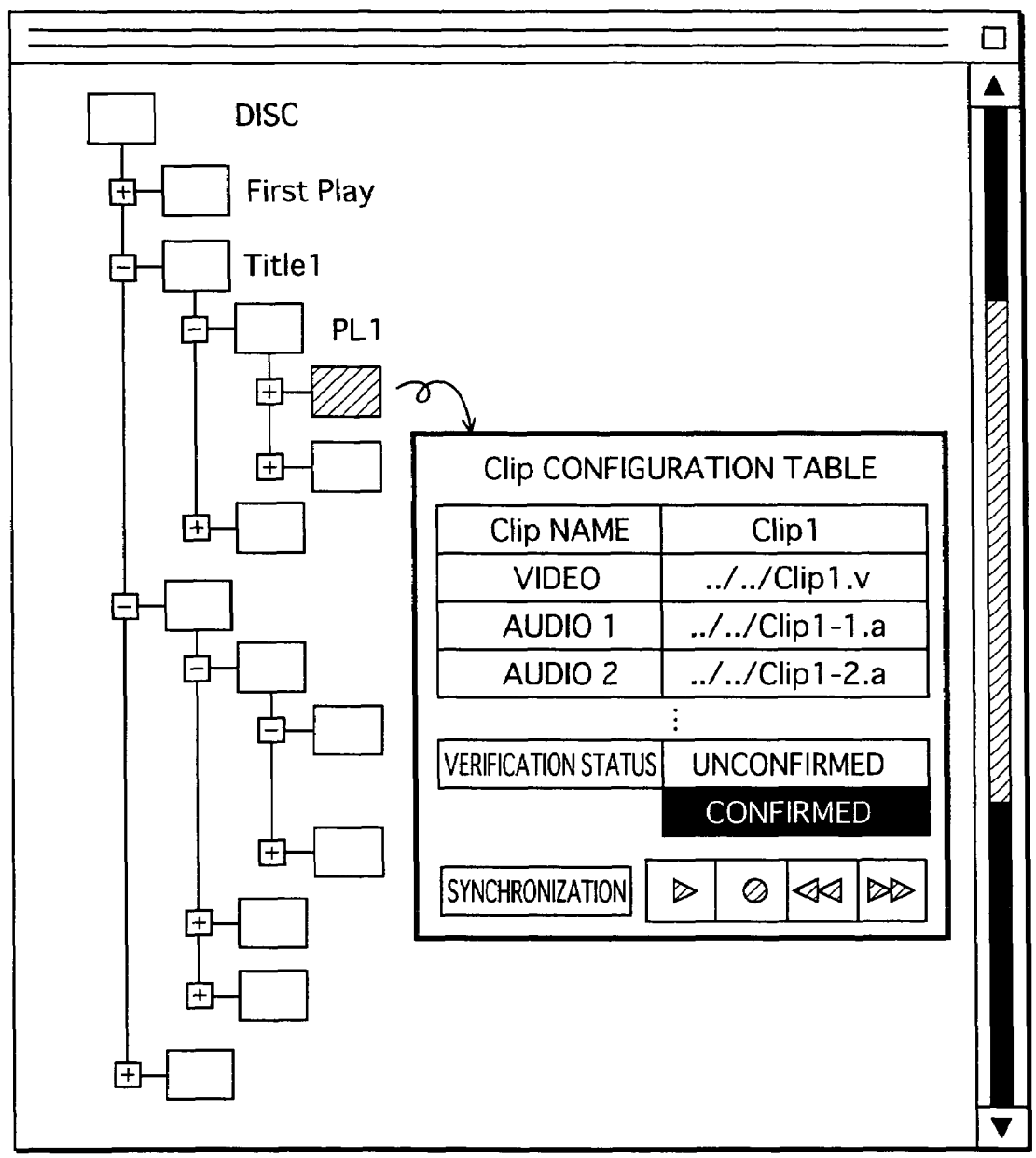
FIG. 16 shows an operation onto a verification status menu.
Figures 17A, 17B:
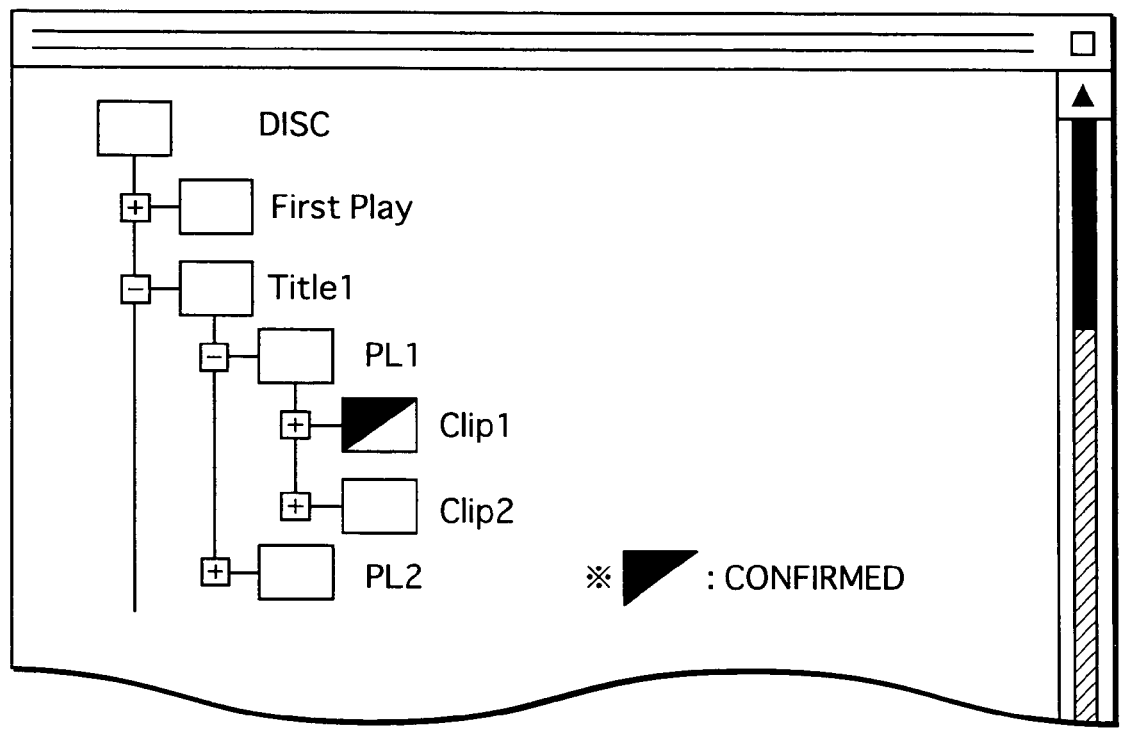
FIG. 17A shows an update of a confirmation flag.
FIG. 17B shows a display mode in which it is displayed that Clip 1 has been confirmed.

The "verification status menu ct4" is a pull-down menu that receives an operation for changing the status of a configuration table from an unconfirmed status into a confirmed status and an operation for changing from a confirmed status into an unconfirmed status. FIG. 16 shows an operation onto the verification status menu. Having confirmed that a Clip configuration table has no problem after adjustments are made on the synchronization panel, the user changes the verification status menu from "unconfirmed" to "confirmed". As a result of this operation, the confirmation flag in the Clip configuration table changes from "=0" indicating an unconfirmed status to "=1" indicating a confirmed status, as shown in FIG. 17A. In the case where the confirmation flag of Clip 1 in the piece of DVD volume configuration information in the storage material 4 is updated to "=1", Clip 1 is displayed in the GUI screen in a mode that indicates a confirmed status, as shown in FIG. 17B. The mode that indicates a confirmed status has a triangle mark.

Figure 18A:
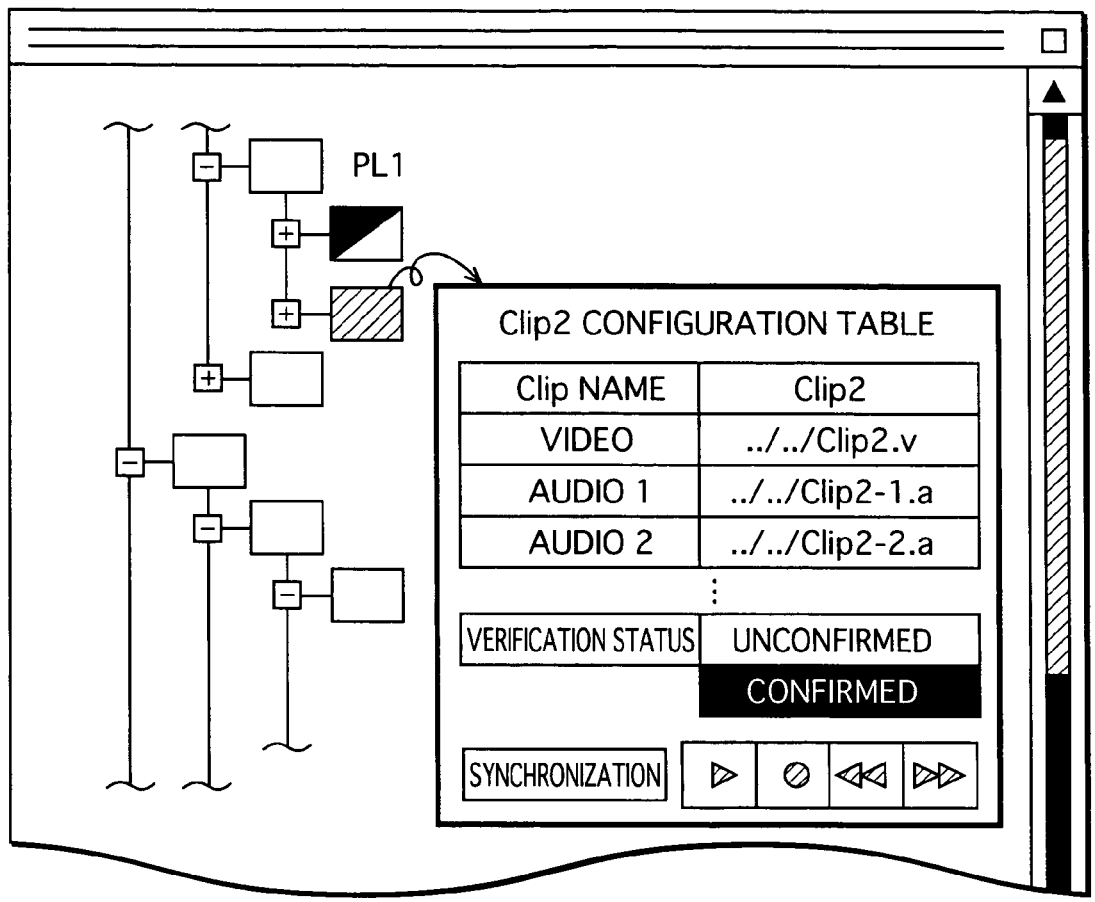
FIG. 18A shows an operation onto a verification status menu of a Clip 2 configuration table.
Figure 18B:
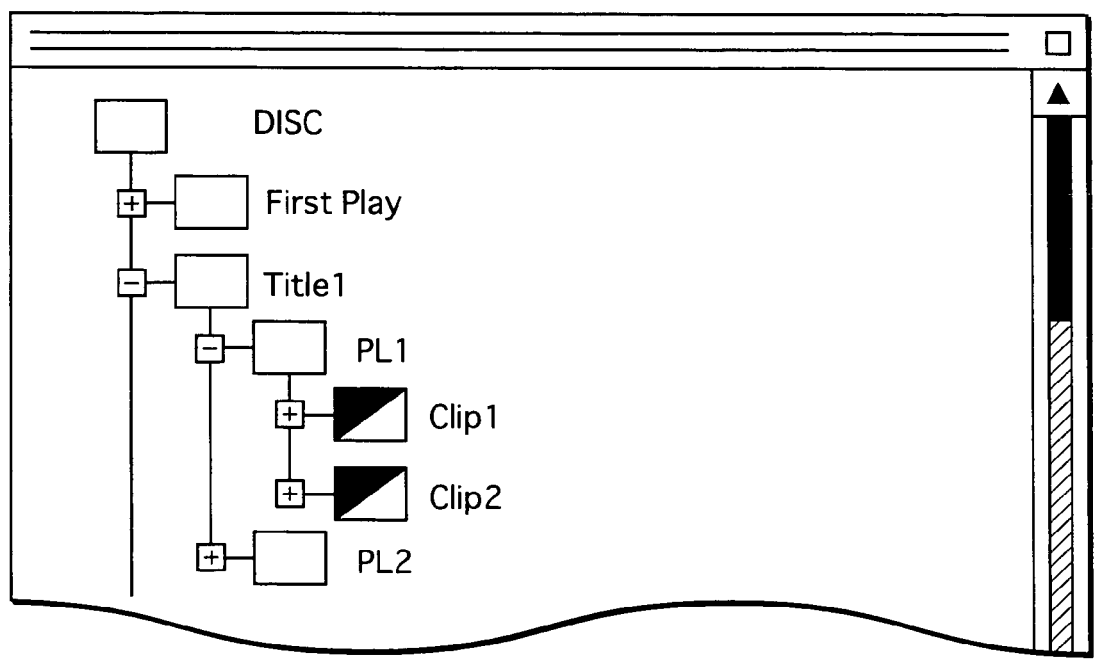
FIG. 18B shows a display mode in which it is displayed that Clip 2 has been confirmed.

When such a setting of confirmation has been conducted for Clip 2, Clip 2 will also be displayed in a mode that indicates a confirmed status, like Clip 1, as shown in FIGS. 18A and 18B.

Thus completes the description of the operations onto a configuration table. The following describes an operation onto a PlayList configuration table.

Playlist Editing

Figure 19A:
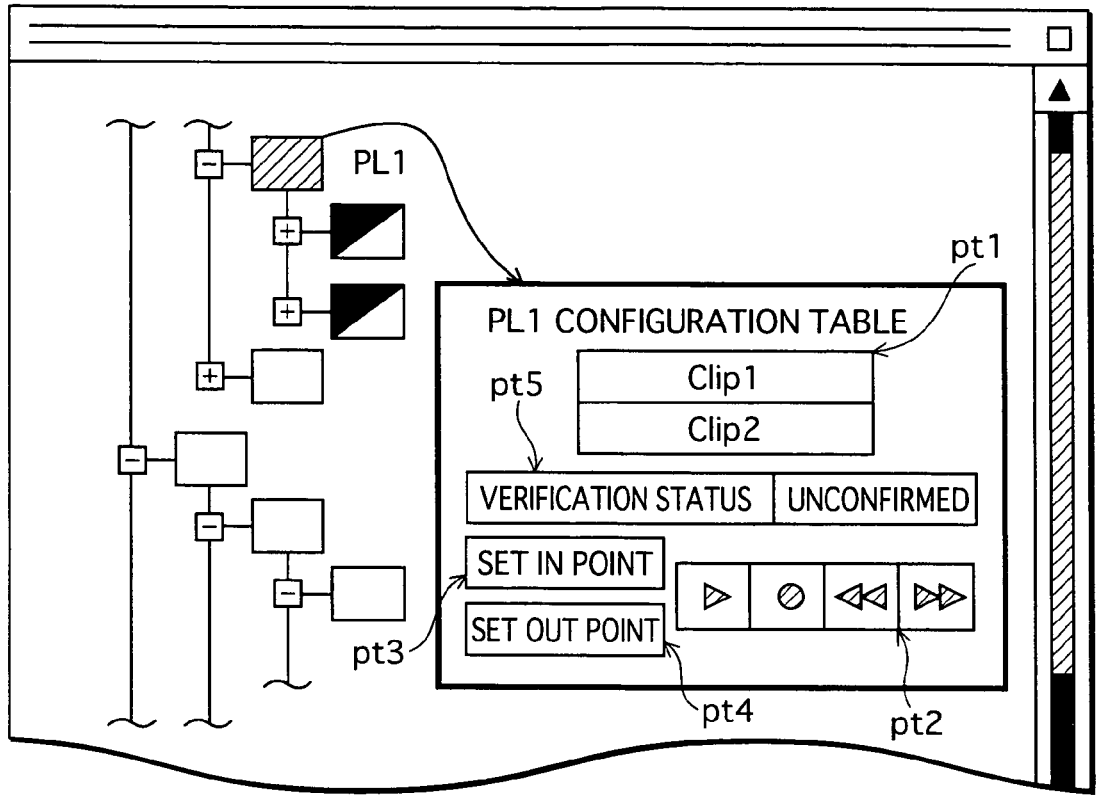
FIG. 19A shows an operation onto a verification status menu of a PL 1 configuration table.

The following describes PlayList editing. FIG. 19A shows a window for editing a PL configuration table. In the window shown in the drawing, a PL configuration table GUI pt1, a playback control panel pt2, an In point setting button pt3, an Out point setting button pt4, and a verification status menu pt5 are provided.

The "PL configuration table GUI pt 1" executes an editing operation onto a PL configuration table, according to a user operation with the pointing device 31. Such an editing operation may be for one of (i) addition of a configuration element, (ii) deletion editing, and (iii) changing configuration elements, as indicated in FIGS. 13A, 13B, and 13C.

The "playback control panel pt2" receives an operation from the user to instruct the player simulator 36 to perform a PlayList configuration table playback.

The "In point setting button pt 3" receives a setting for an In point, i.e. a playback starting point, of a Clip. To be more specific, it is sometimes desired that a PlayList configuration table is edited so that one portion of a Clip, rather than a whole Clip, be played back in a PlayList. In such a case, the editing application 37 instructs the player simulator 36 to play back the Clip according to the PlayList configuration table and receives a specification of a playback starting point of the portion to be played back, through the In point setting button. When the playback starting point is specified in this manner, the playback starting point is written into the PlayList configuration table.

The "Out point setting button pt4" receives a setting for an Out point, i.e. a playback ending point, of a Clip. To be more specific, a specification is received of the playback ending point of a portion to be played back when the Clip is played back according to the PlayList configuration table, through the Out point setting button. When the playback ending point is specified in this manner, the playback ending point is written into the PlayList configuration table.

Figure 19B:
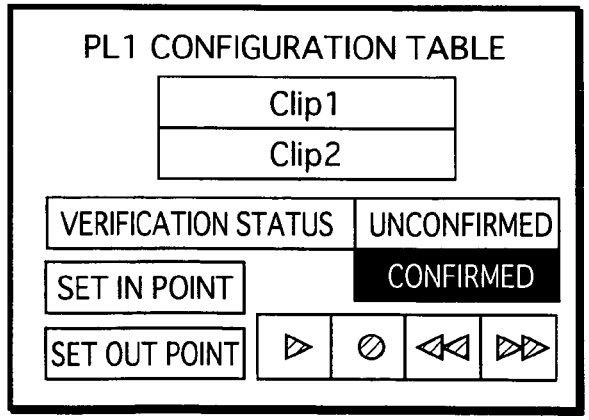
FIG. 19B shows a display mode in which it is displayed that PL 1 has been confirmed.
Figure 19C:
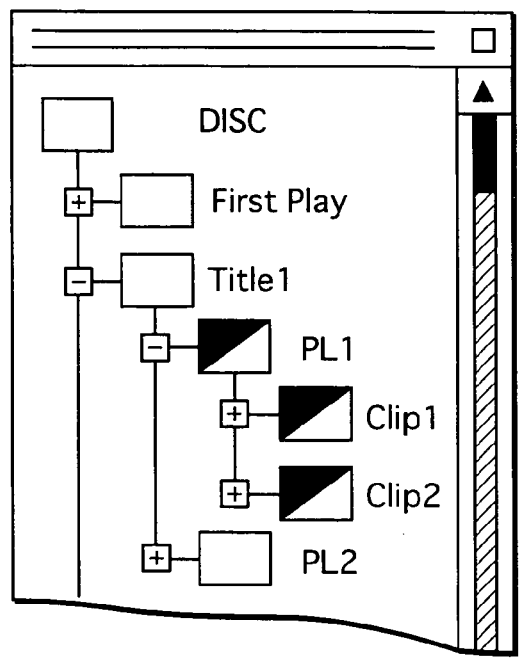
FIG. 19c shows a GUI screen with a confirmed PL 1.

The "verification status menu pt5" is a pull down menu that receives an operation for changing the status of a PlayList configuration table from an unconfirmed status into a confirmed status and an operation for changing from a confirmed status into an unconfirmed status. Having confirmed that a PL configuration table has no problem after playback is performed with the use of the playback control panel, the user is able to change the verification status menu from "unconfirmed" to "confirmed". When the user has selected the verification status menu, the editing application 37 judges whether or not the confirmation flags of all the Clips included in the PlayList configuration table are set to indicate "=1". In the case where the confirmation flags of all the Clips are set to be "=1", an operation is received to set the verification status menu to indicate a confirmed status, cf. FIG. 19B. On the other hand, when any of the confirmation flags of the Clips is set to be "=0", no operation to set the verification status menu to indicate a confirmed status is received. As a result of the operation to set the verification status menu to indicate "confirmed", the confirmation flag in the PL1 configuration table changes from "=0" indicating an unconfirmed status to "=1" indicating a confirmed status. In the case where the confirmation flag of PlayList 1 in the piece of DVD volume configuration information is updated to "=1", PlayList 1 is displayed in the GUI screen in a mode that indicates a confirmed status, as shown in FIG. 19C. The mode that indicates a confirmed status has a triangle mark. Thus completes the description of editing onto a PlayList configuration table.

Title Editing

Figure 20:
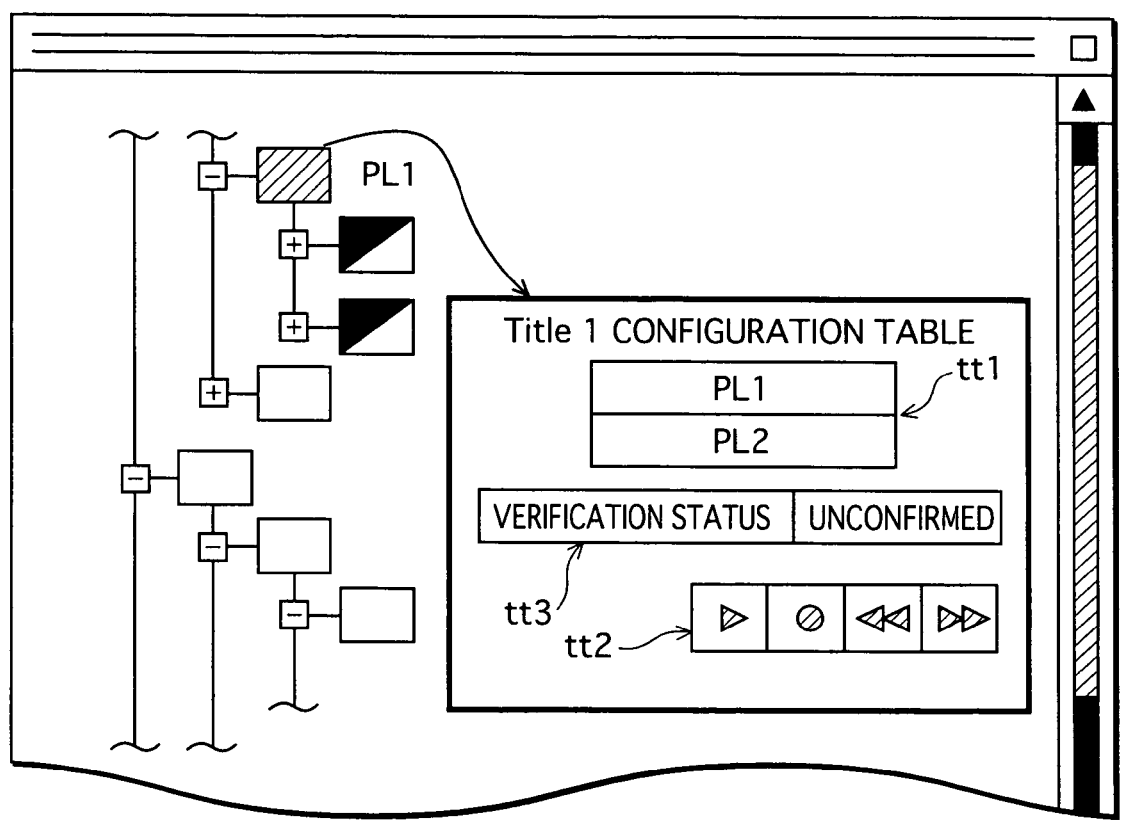
FIG. 20 shows a GUI for editing a Title configuration table.

The following describes editing of Title configuration tables. Like PL configuration tables, it is possible to edit Title configuration tables with the use of windows. FIG. 20 shows a GUI for editing a Title configuration table. In the window, a Title Configuration table GUI tt1, a playback control panel tt2, and a verification status menu tt3 are provided.

The "Title configuration table GUI tt1" executes an editing operation onto a Title configuration table, according to a user operation with the pointing device 31. Such an editing operation may be for one of (i) addition of a configuration element, (ii) deletion editing, and (iii) changing configuration elements, as indicated in FIGS. 13A, 13B, and 13C.

The "playback control panel tt2" receives an operation to instruct the player simulator 36 to perform playback in correspondence with a Title configuration table.

The "verification status menu tt3" is a pull down menu that receives an operation for changing the status of a Title configuration table from an unconfirmed status into a confirmed status and an operation for changing from a confirmed status into an unconfirmed status. Having confirmed that a Title configuration table has no problem after playback is performed with the use of the playback control panel, the user is able to change the verification status menu from "unconfirmed" to "confirmed". When the user has selected the verification status menu, the editing application 37 judges whether or not the confirmation flags of all the PlayLists included in the Title configuration table are set to indicate "=1". In the case where the confirmation flags of all the PlayLists are set to be "=1", an operation is received to set the verification status menu to indicate a confirmed status. On the other hand, when any of the confirmation flags of the PlayLists is set to be "=0", no operation to set the verification status menu to indicate a confirmed status is received. As a result of the operation to set the verification status menu to indicate "confirmed", the confirmation flag in the Title configuration table changes from "=0" indicating an unconfirmed status to "=1" indicating a confirmed status.

When the confirmation flag is set to be "1", the configuration table and the synchronization panel are locked against operations. As a result of the locking, it is possible to avoid the situation in which a confirmed configuration table is easily altered. Further, since the settings of the confirmations flags are not fixed, it is possible to change the settings with user operations later. Thus completes the description of the editing processing performed with the editing application 37.

FIG. 21 shows a piece of DVD volume configuration information of the version 0.x.

As a result of the aforementioned confirmation operations performed on Clips, PlayLists, and Titles, the piece of DVD volume configuration information of the version 0.x includes the following: a Clip configuration table having a confirmation flag set to be "=1"; a Clip configuration table having a confirmation flag set to be "=0"; a PL configuration table having a confirmation flag set to be "=1"; a PL configuration table having a confirmation flag set to be "=0"; a Title configuration table having a confirmation flag set to be "=1"; and a Title configuration table having a confirmation flag set to be "=0".

FIG. 22 is a flow chart that shows the processing procedure of the editing application 37. The following describes the details of the processing procedure of the editing application 37, with reference to this flow chart. After having a piece of DVD volume configuration information displayed, the editing application 37 advances to a loop processing made up of the Steps S2 and S3. This loop processing is to judge whether an operation to move a cursor and/or a double click have been performed. When the judgment result of Step S1 is YES, processing is performed to move a highlight to another node. As a result of this processing, the highlight moves between different nodes. When a double click is made while one of the nodes is highlighted (Step S3: YES), the processing in Steps S5 through S13 is executed. In the processing in the steps S5 through S13, a window is opened for editing a configuration element (Title/PlayList/Clip) in correspondence with the highlighted node (Step S5), and the procedure advances to a loop processing made up of the steps S6 and S7. In Step S6, it is judged whether or not an operation for addition/editing/correction etc. is performed on a Clip configuration table GUI or a synchronization panel. If the judgment result is that an operation has been performed, the processing of addition/editing/correction etc. will be executed according to the user operation (Step S8). Step S9 is for defining a condition under which the processing of addition/editing/correction etc. is to be executed and it is judged whether or not the confirmation flag is set to be "=1". In the case where the confirmation flag is set to be "=1", Step S8 will be skipped. On the other hand, in the case where the confirmation flag is set to be "=0", Step S8 will be executed.

When the user has selected a verification status menu, (Step S7: YES), it is judged whether the user has set the verification status menu to be in a "confirmed" status or an "unconfirmed" status (Step S10). In the case where the menu has been set to a confirmed status, the confirmation flag is set to be "=1" (Step S11). On the other hand, in the case where the menu has been set to an unconfirmed status, the confirmation flag is set to be "=0" (Step S12). Thus completes the detailed description of the processing procedure performed by the editing application 37.

Thus completes the description of the configurations of the client apparatuses 21 through 23.

The following describes the client apparatuses 25 through 27. Editing operations on the client apparatuses 25 through 27 include the following: For example, in a piece of DVD volume configuration information, since all the elementary streams are made up of SD images, these SD images need to be replaced with HD images. For this reason, file paths in a Clip configuration table are rewritten so that they specify HD images instead of SD images. As a result of this operation, the Clip configuration table now specifies the HD images and serves as a Clip configuration table for a BD-ROM. It is important to note here that not all configuration elements in a BD volume configuration information become HD images. Contents such as "making of" images are SD images even in a piece of BD volume configuration information. Configuration elements that are only in SD images are configuration elements that are in common between the DVD-Video and the BD-ROM.

Which ones of the configuration elements are in common between a BD-ROM and a DVD-Video and which ones are not in common will depend on what is recorded on the optical discs to be distributed. Accordingly, it is impossible to automate such operations because the users need to make judgments by checking data with their own eyes. For this reason, generation of a piece of BD volume configuration information based on a piece of DVD volume configuration information is realized through, in principle, an interactive editing with a user.

FIG. 23 shows the configuration that the client apparatuses 25 through 27 have in common. As apparent from the drawing, the configuration in common among the client apparatuses 25 through 27 is the same as the one shown in FIG. 8. The difference between the client apparatuses 25 through 27 and the client apparatuses 21 through 23 is how the version 0.1 of each piece of volume configuration information is treated. In a BD-ROM authoring process, a version 0.x of a piece of DVD volume configuration information is treated as the version 0.1 of a BD-ROM. As shown in FIG. 21, in the version 0.x, there are both configuration tables having confirmation flags set to be "=0" and configuration table having confirmation flags set to be "=1". When the version 0.x is displayed as a version 0.1, the configuration elements having confirmation flags set to be "=1" will be displayed with the marking symbols indicating a confirmed status. With this arrangement, during the BD-ROM authoring process, it is possible to observe how much progress the DVD-Video authoring process has made. For the configuration elements that are in common between a DVD-Video and a BD-ROM and that have already been confirmed in the DVD-Video authoring process, it is possible to save all the types of work such as editing on configuration tables and checking for normal playback; therefore, the BD-ROM authoring process progresses quickly.

Figure 24:
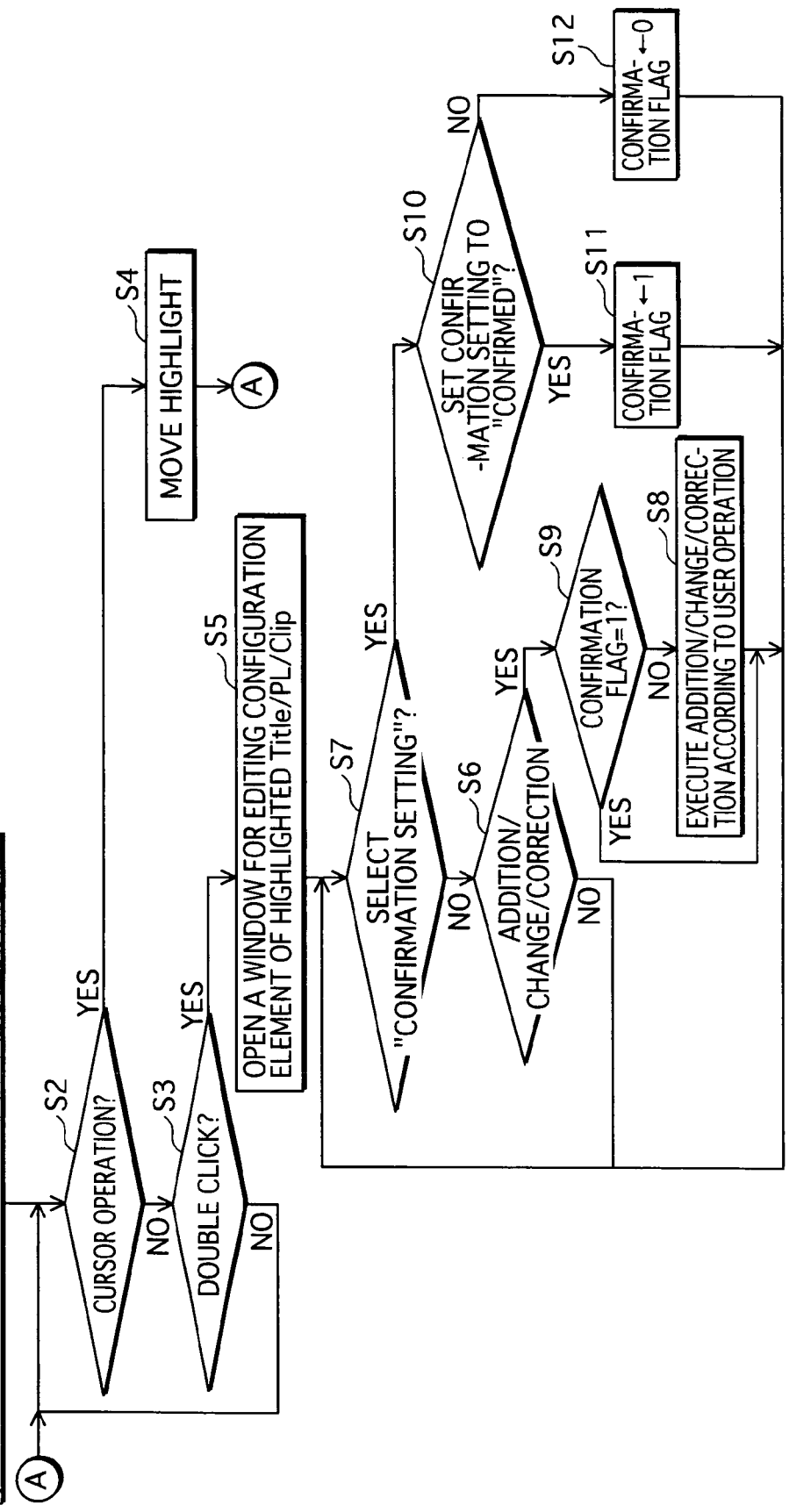
FIG. 24 is a flow chart that shows the processing procedure of the editing application 37 on the client apparatuses 25 through 27.
Figure 25:
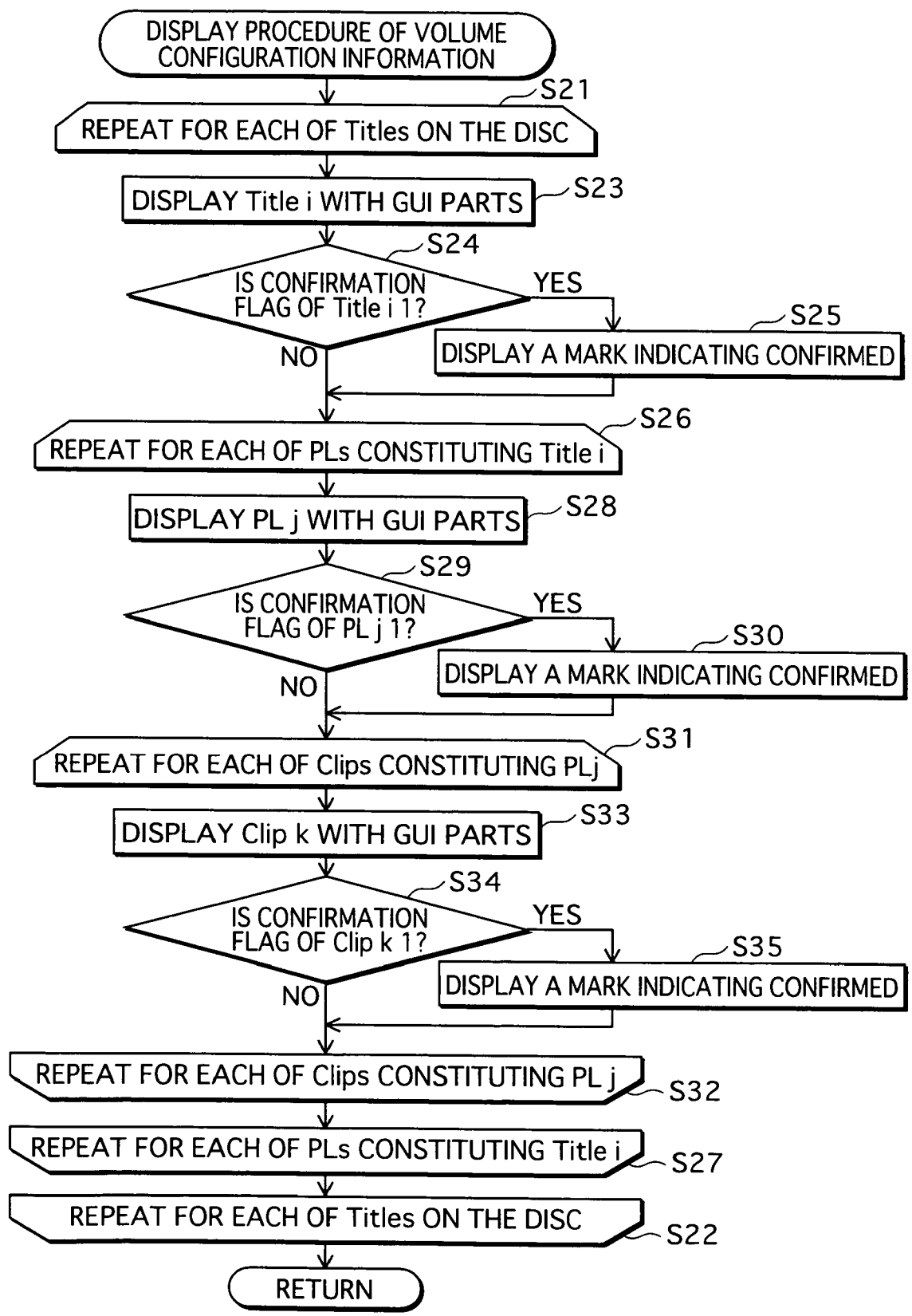
FIG. 25 shows the display procedure for displaying a piece of BD volume configuration information.

FIG. 24 is a flow chart that shows the processing procedure for the editing application 37 performed by the client apparatuses 25 through 27. This drawing is the same as the flow chart shown in FIG. 22 except that Step S15 is added before Step S1. In Step S15, the editing application 37 obtains a copy by copying the version 0.x of the piece of DVD volume configuration information from the DVD configuration information storage 5 into the BD configuration information storage 6 and uses the version 0.x as the version 0.1 of a piece of BD volume configuration information by changing the file names in the copy. When the version 0.1 of the piece of BD volume configuration information has been obtained in this manner, the processing in Steps S1 through S12 is performed. FIG. 25 shows the display procedure for the editing application 37 to display the piece of BD volume configuration information.

The flow chart in this drawing is made up of a triple loop processing.

The first-round loop processing is to repeat the processing in Steps S23 through S35 for all the Titles on a disc (Step S21 and Step S22).

The second-round loop processing is to repeat the processing in Steps S28 through S35 for all the PlayLists in an arbitrarily selected Title (Step S26 and Step S27).

The third-round loop processing is to repeat the processing in Steps S33 through S35 for all the Clips in an arbitrarily selected PlayList (Step S31 and Step S32).

Among a plurality of Titles that may exist on a disc, a title that is a processing target will be referred to as Title i.

In the first-round loop processing, a Title i is displayed using a GUI part for a "node" (Step S23). It is judged whether or not the confirmation flag of the Title i is "=1" (Step S24). In the case where the confirmation flag is "=1", a processing is performed to display a mark indicating a confirmed status on the node (Step S25). As a result of such an operation repeatedly performed on each of all the Titles, the Titles will be displayed.

In the second-round loop processing, a PlayList that is a processing target will be referred to as a PL j.

In the second-round loop processing, the PL j is displayed using a GUI part for a "node" (Step S28). It is judged whether or not the confirmation flag of the PL j is "=1" (Step S29). In the case where the confirmation flag is "=1", a processing is performed to display a mark indicating a confirmed status on the node (Step S30). As a result of such an operation repeatedly performed on each of all the PlayLists, the PlayLists will be displayed.

In the third-round loop processing, a Clip that is a processing target will be referred to as a Clip k. In the third-round loop processing, the Clip k is displayed using a GUI part for a "node" (Step S33). It is judged whether or not the confirmation flag of the Clip k is "=1" (Step S34). In the case where the confirmation flag is "=1", a processing is performed to display a mark indicating a confirmed status on the node (Step S35). As a result of such an operation repeatedly performed on each of all the Clips, the Clips will be displayed.

Figure 26:
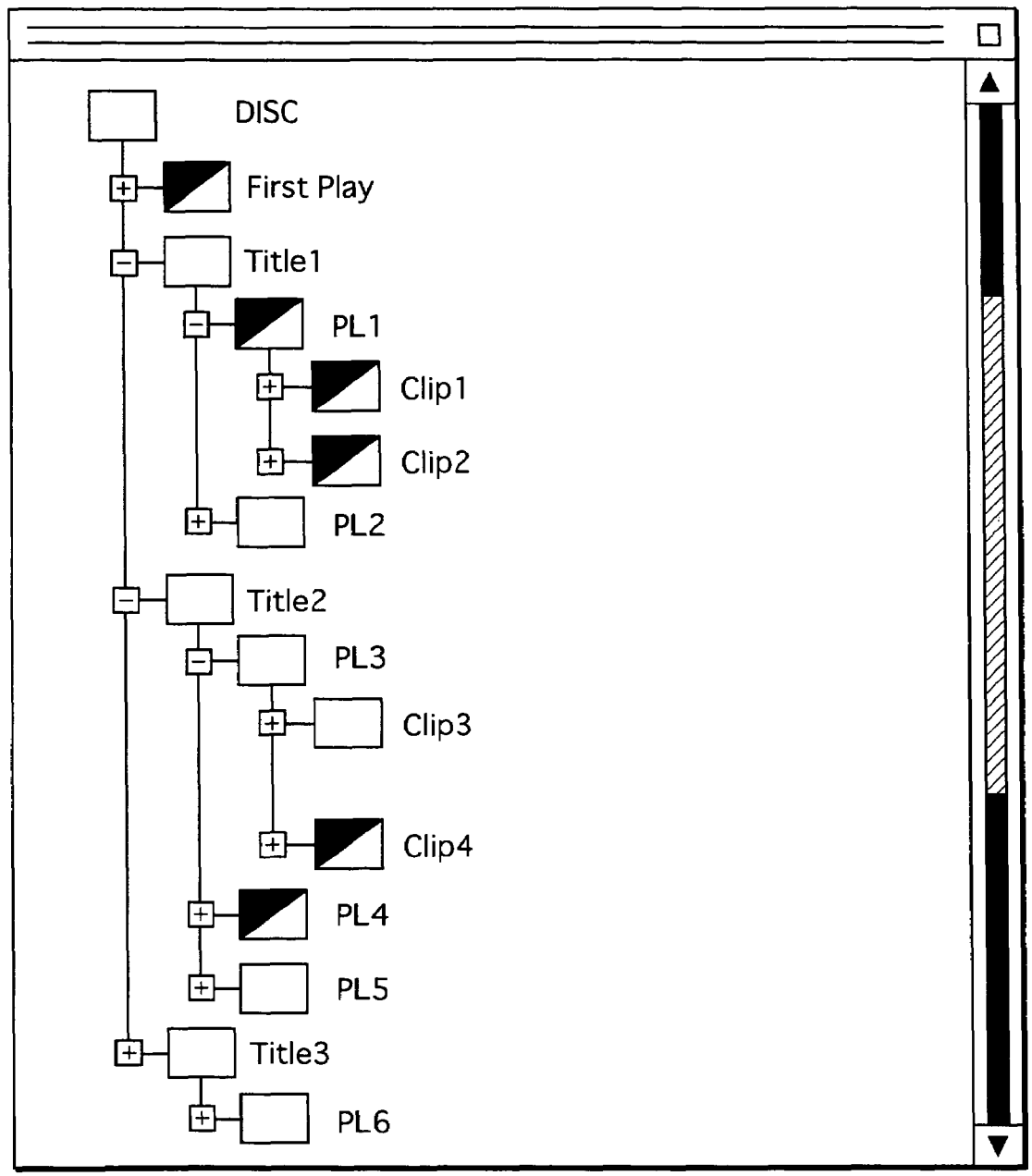
FIG. 26 shows a GUI screen to be displayed when the processing procedure shown in FIG. 25 is executed on the version 0.1 of a piece of BD volume configuration information shown in FIG. 21.

As a result of the processing procedure described above, among the Titles, PlayLists, and Clips included in the piece of BD volume configuration information, the ones having a confirmation flag set to be "1" are displayed with marks each indicating a confirmed status. FIG. 26 shows a GUI screen to be displayed when the processing procedure shown in FIG. 25 is executed on the version 0.1 of a piece of BD volume configuration information shown in FIG. 21. With the use of such a GUI screen, a user is able to intuitively observe which ones of Titles, PlayLists, and Clips have been confirmed to have a normal playback. In the case where configuration elements that are in common between a DVD-Video and a BD-ROM are confirmed to have a normal playback, it is possible to save the normal playback confirmation process for such configuration elements; therefore, it is possible to efficiently re-use the data.

The DVD-Video Volume Image

The following describes the generation process of a DVD-Video volume image.

Figure 27:
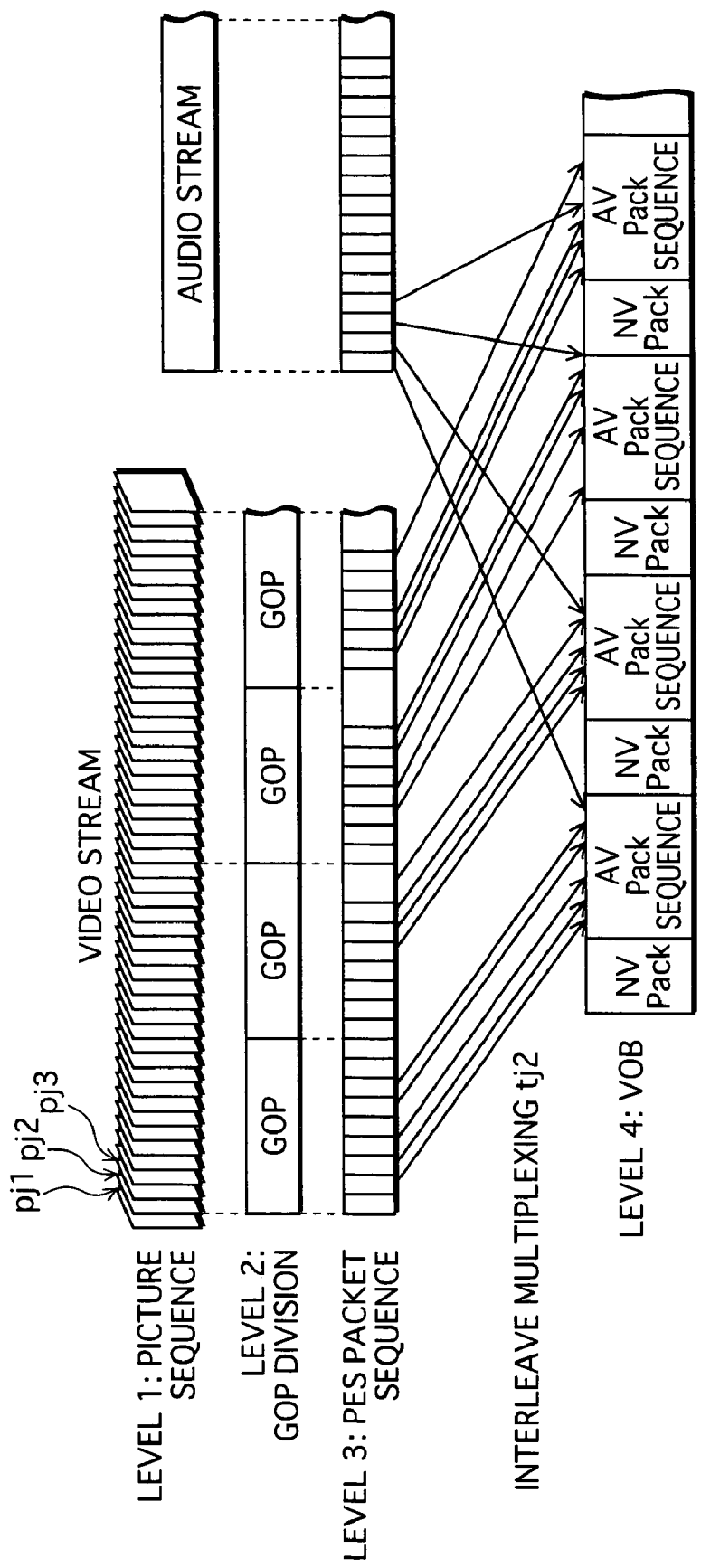
FIG. 27 shows how multiplexing is performed by the multiplexer 7.

Explanation is provided on how the multiplexer 7 multiplexes a plurality of elementary streams. FIG. 27 shows how multiplexing is performed by the multiplexer 7. In the drawing, the level 1 shows elementary streams stored in the material storage 4. The multiplexer 7 multiplexes the video and audio streams shown in the level 1 according to a Clip configuration table and obtains an AV Pack sequence.

The video stream in the level 1 and the GOPs in the level 2 are divided by the multiplexer 7 and stored into a PES (Packetized Elementary Stream) packet sequence shown in the level 3. On the other hand, the audio stream shown on the right side of the level 1 is also divided by the multiplexer 2 into a plurality of portions. The portions of audio stream are stored into a PES packet sequence shown in the level 3. The multiplexer 7 divides the PES packet sequence storing the GOPs into a plurality of portions and perform an interleave multiplexing (tj2) on the portions with the PES packets constituting the audio stream, so as to have them form an AV pack sequence shown in the level 4. Such an AV pack sequence formed in this manner will be referred to as VOBs.

Figure 28:
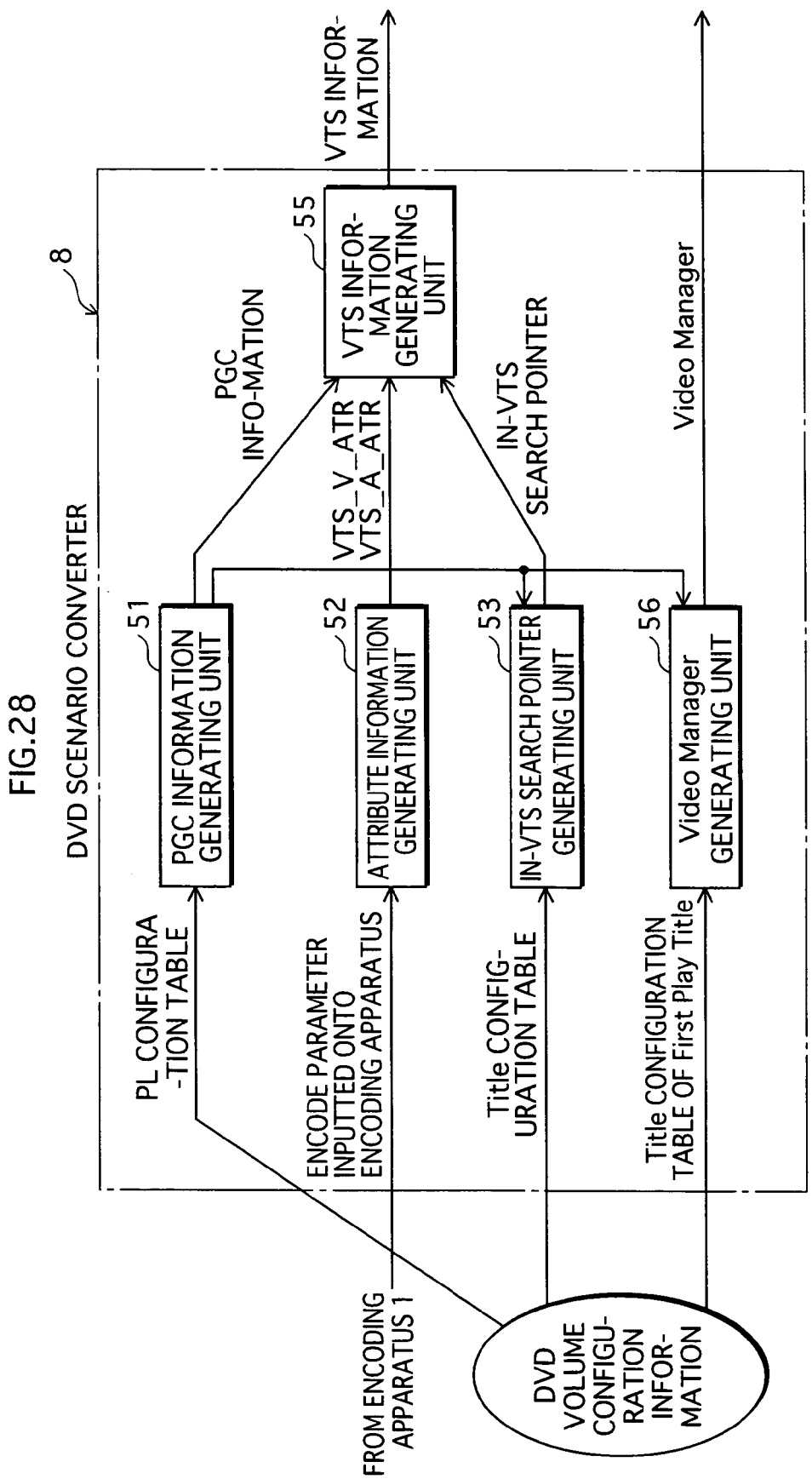
FIG. 28 shows the internal configuration of the DVD scenario converter 8 in terms of its functions.

Next, the following explains in detail the internal configuration of the DVD scenario converter 8. The DVD scenario converter 8 is realized by having a computer read and execute a program. FIG. 28 shows the internal configuration of the DVD scenario converter 8 in terms of its functions. As shown in the drawing the DVD scenario converter 8 comprises a PGC information generating unit 51, an attribute information generating unit 52, an in-VTS search pointer generating unit 53, a VTS information generating unit 55, and a video manager generating unit 56. Since it is difficult to understand the internal configuration of the DVD scenario converter 8 only from FIG. 28, the description of the configuration elements of the scenario converter 8 will refer to FIGS. 29 through 33.

Figure 29:
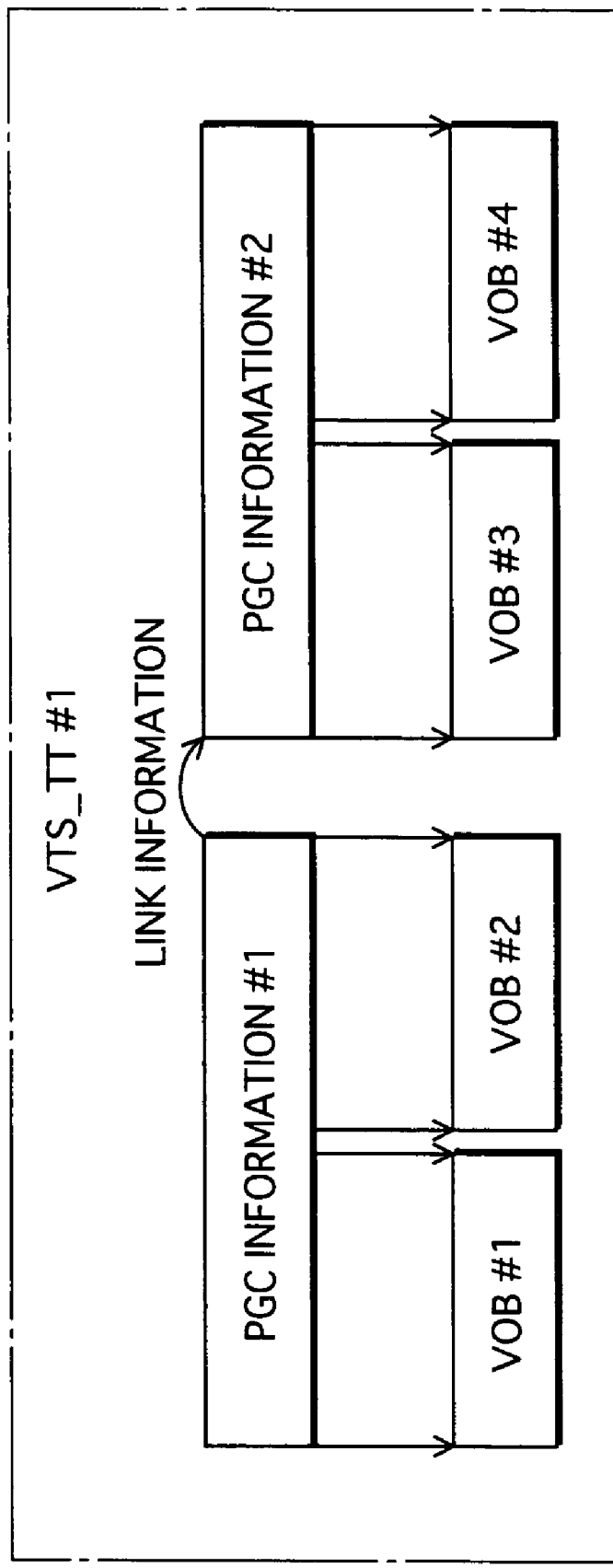
FIG. 29 shows a piece of PGC information generated based on the PlayList configuration table and the Title configuration table shown in FIGS. 6B and 6C.

The PGC information generating unit 51 assumes that the Clips written in a PlayList configuration table are in correspondence with VOBs and generates a piece of PGC generation for instructing a playback apparatus to sequentially play back the VOBs written in the PlayList configuration table. Further, the PGC information generating unit 51 assumes that the PlayLists written in a Title configuration table are in correspondence with pieces of PGC information and sets pieces of link information with the pieces of PGC information so that the pieces of PGC information written in the Title configuration table are sequentially played back. When the PGC information generating unit 51 has generated pieces of PGC information based on the PlayList configuration tables and the Title configuration tables shown in FIGS. 6B and 6C, the pieces of PGC information #1 and #2 are obtained as shown in FIG. 29. The piece of PGC information #1 is for instructing a playback apparatus to sequentially play back the VOBs #1 and #2. The piece of PGC information #2 is for instructing a playback apparatus to sequentially play back the VOBs #3 and #4. The PGC information generating unit 51 sets a piece of link information in which the piece of PGC information #2 is set as a link destination, into the piece of PGC information #1, so that the pieces of PGC information #1 and #2 are sequentially played back. As a result of such a setting, VTS_TT #1 which is made up of the pieces of PGC information #1 and #2 is obtained.

The attribute information generating unit 52 generates a piece of attribute information for each VTS_TT. Such a piece of attribute information is set in the encoding apparatus 2 or the like as an encode parameter to be used when analogue signals are digitalized. Thus, the attribute information generating unit 52 generates a piece of attribute information for each VTS_TT based on such an encode parameter.

Figure 30:
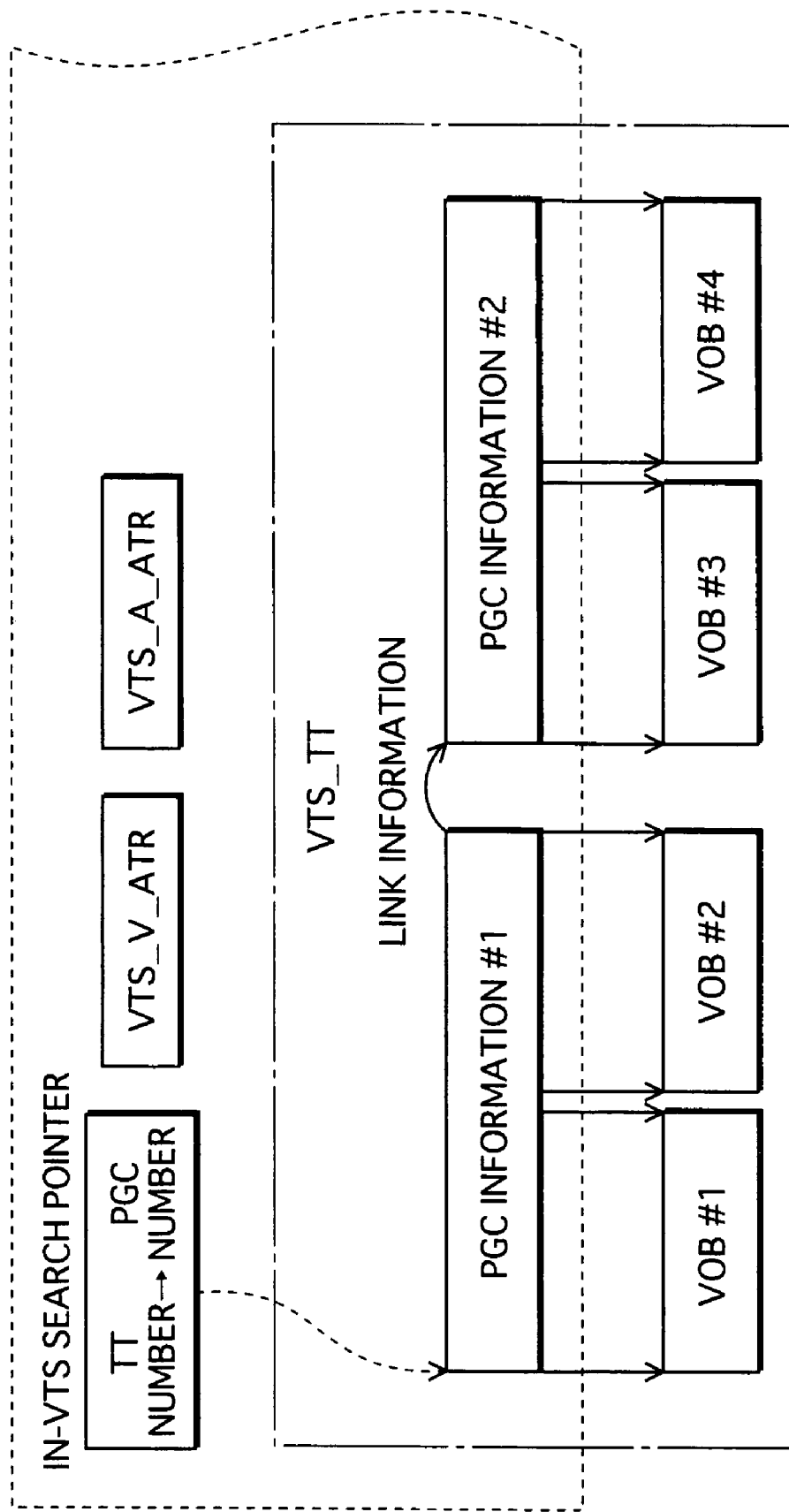
FIG. 30 shows a search pointer generated for the Title configuration table shown in FIG. 6C.

The in-VTS search pointer generating unit 53 generates a search pointer by bringing a piece of PGC information written at the head of a Title configuration table in correspondence with a Title number of the Title configuration table. As a result of the in-VTS search pointer generating unit 53 generating a search pointer for the Title configuration table shown in FIG. 6C, a search pointer shown in FIG. 30 is obtained. This search pointer shows the Title number of the VTS_TT #1 (i.e. "1") in correspondence with the PGC number of the piece of PGC information #1 (i.e. "1").

Figure 31:
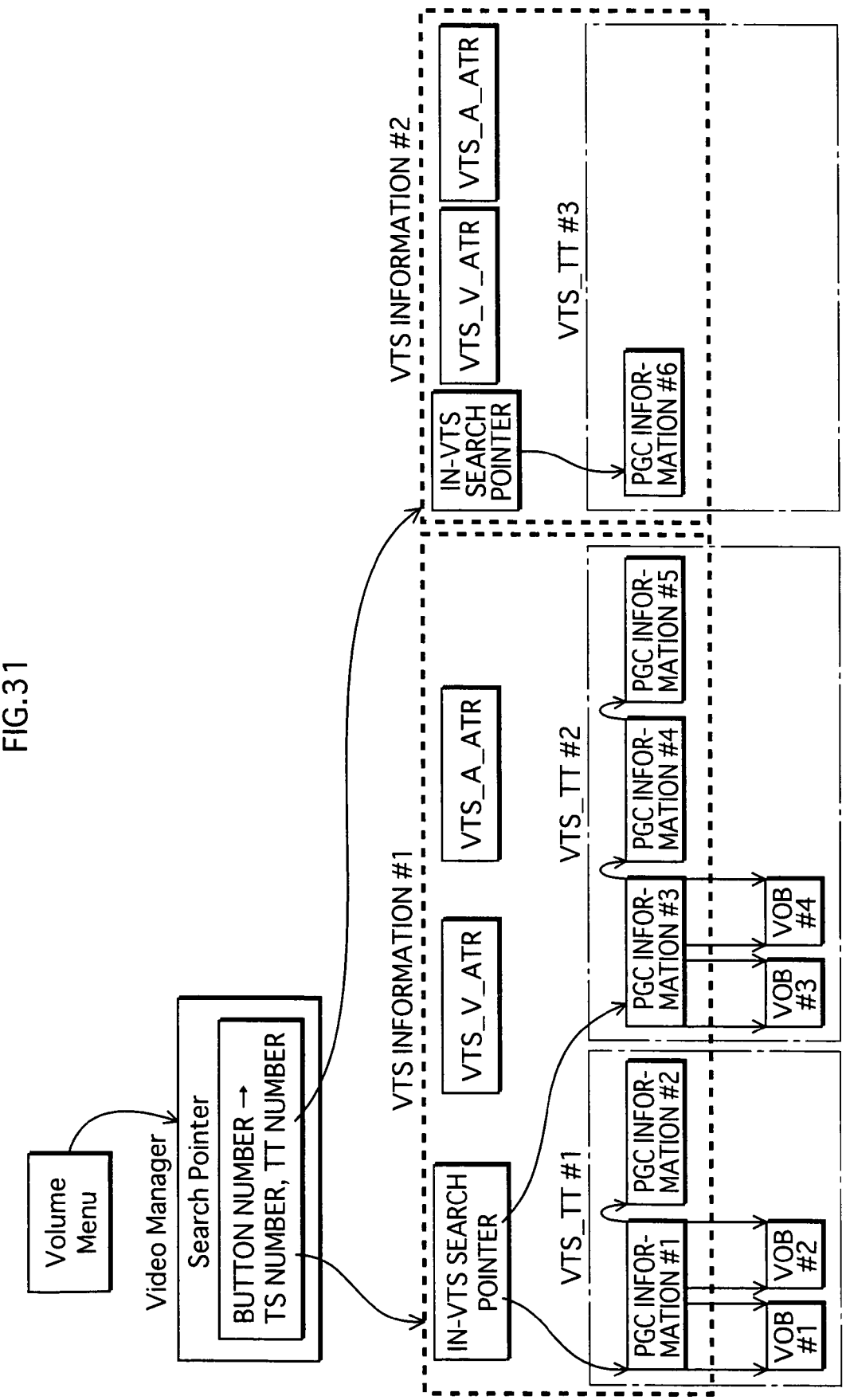
FIG. 31 shows a video manager generated by the video manager generating unit 56.

The VTS information generating unit 55 groups pieces of PGC information constituting a VTS_TT and search pointers that have an identical piece of attribute information generated by the attribute information generating unit 52, so as to obtain a piece of VTS (Video Title Set) information. By integrating the pieces of PGC information of a VTS_TT, the search pointers, and the piece of attribute information that have been grouped together, the VTS information generating unit 55 obtains pieces of VTS information for the VTSs. FIG. 31 shows pieces of VTS information that are obtained as a result of the VTS information generating 55 performing processing on a piece of DVD volume configuration information having the Title configuration tables and the PlayList configuration tables shown in FIGS. 6B and 6C. In the drawing, the dashed lines indicate Titles. The broken lines each surround a group of configuration elements to be put into a file in a DVD-Video. As a result of the PGC information generating unit 51 performing processing based on the Title configuration tables shown in FIG. 6C, VTS_TTs #1 through #3 are obtained. Further, the attribution information generating unit 52 generates pieces of attribute information for these VTS_TTs. Among the pieces of attribute information generated in this manner, in the case where the piece of attribute information for the VTS_TT #1 is identical to the piece of attribute information for the VTS_TT #2, the pieces of PGC information #1 and #2 belonging to the VTS_TT #1, the pieces of PGC information #3 and #4 belonging to the VTS_TT #2, and the search pointer generated by the in-VTS search pointer generating unit 53 are integrated together so that the piece of VTS information #1 is obtained. Here, the pieces of attribute information generated by the attribute information generating unit 52 are converted into pieces of attribute information for the VTSs (i.e. VTS_V_ATR and VTS_A_ATR). On the other hand, in the case where the piece of attribute information for the VTS_TT #3 generated based on the Title configuration table #3 is not identical to the pieces of attribute information for the VTS_TT #1 and the VTS_TT #2, the piece of PGC information #6 belonging to VTS_TT #3, the piece of attribute information, and the search pointer are integrated together so that the piece of VTS information #2 is obtained. As a result of the grouping as described above, which VTS_TT belongs to which VTS becomes apparent.

The video manager generating unit 56 generates a video manager based on a Title configuration table that is in correspondence with a FirstPlayTitle. In a Title configuration table in correspondence with a FirstPlay Title, at least one PlayList is written. In the PlayList configuration table in correspondence with the PlayList, the Clip name of a Clip constituting a menu (called a volume menu in the case of a DVD-Video) for a whole optical disc are written. The video manager generating unit 56 generates a piece of PGC information for having a VOB in correspondence with the menu clip played back and obtains a video manager that contains such a piece of PGC information. Subsequently, the video manager generating unit 56 generates a search pointer in which the button number in the volume menu, the VTS numbers to which the Titles belong, and the Title numbers are brought into correspondence with one another. On the top left of FIG. 31, a video manager generated by the video manager generating unit 56 is shown. The video manager has a search pointer, which brings the VTS numbers, the Title (TT) numbers, and the buttons in the volume menu into correspondence with one another. Accordingly, with the use of two search pointers such as the search pointer in the video manager and the search pointer in the VTS, pieces of PGC information can be introduced from the buttons within the volume menu.

Figure 32:
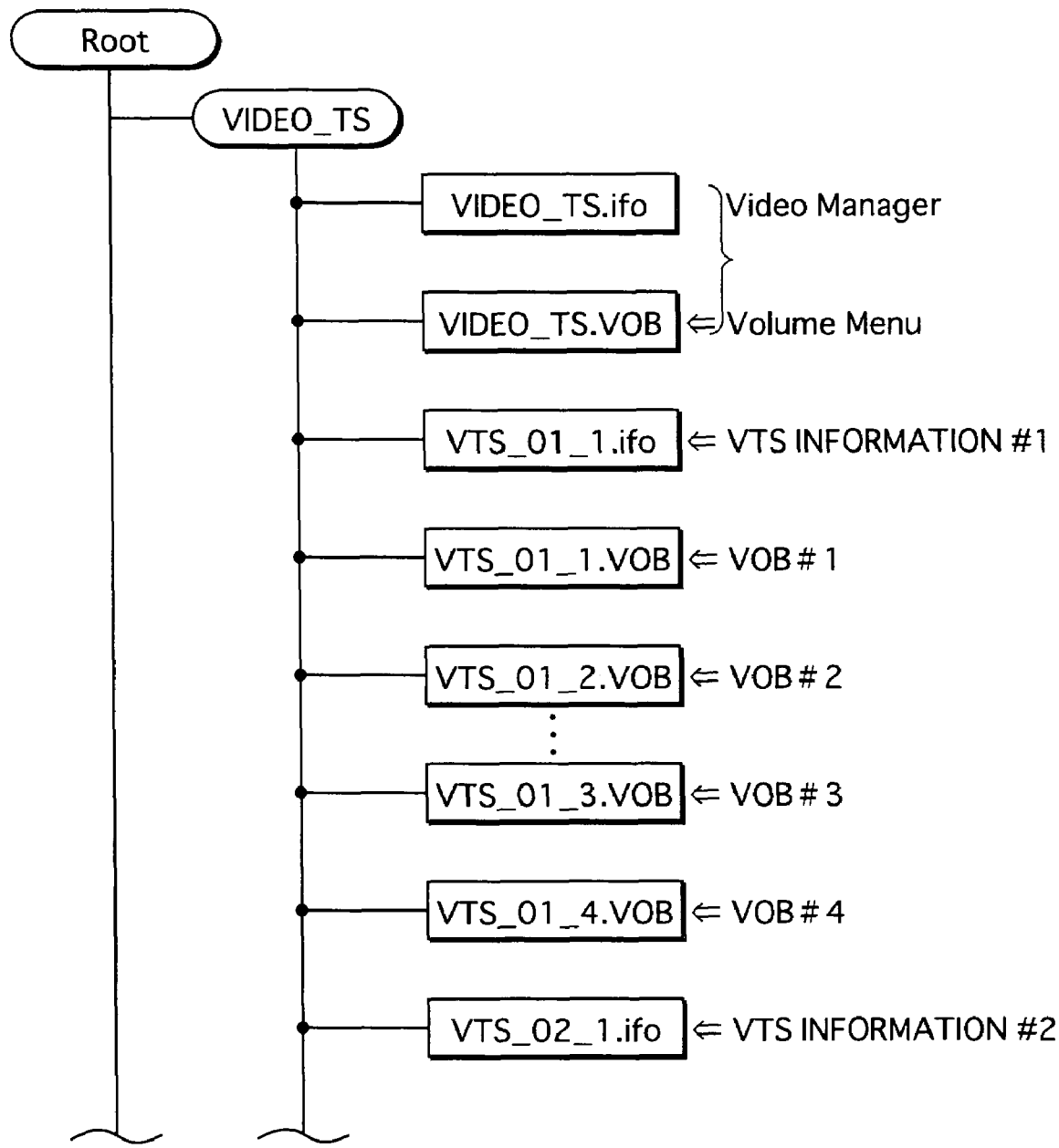
FIG. 32 shows a file system layout for a DVD-Video volume image.

By performing such a conversion on each of all the configuration elements of a piece of DVD volume configuration information, a file layout as shown in FIG. 32 is obtained.

FIG. 32 shows a file system layout for a DVD-Video volume image. In the drawing, a sub-directory called VIDEO_TS is positioned subordinate to the Root directory.

The piece of VTS information shown in FIG. 32 becomes a file named "VTS_xx_x.ifo" and is positioned in a subdirectory called VIDEO_TS. In this example, "xx" is the number of a VTS, and "x" is the number of the piece of VTS information. A VOB becomes a file named "VTS_xx_x.VOB" and is positioned in a subdirectory called VIDEO_TS. In this example, "xx" is the number of a VTS to which the VOB belongs, and "x" is the number of the VOB.

The Clip constituting the volume menu becomes a file named "VIDEO_TS.vob", while the in-video manager search pointer and the playback control information for playing back the volume menu becomes a file named "VIDEO_TS.ifo", and these files are positioned. Thus completes the description of generation of a DVD-Video volume image.

BD-ROM Volume Image

The following describes the generating process of a BD-ROM volume image.

Figure 33:
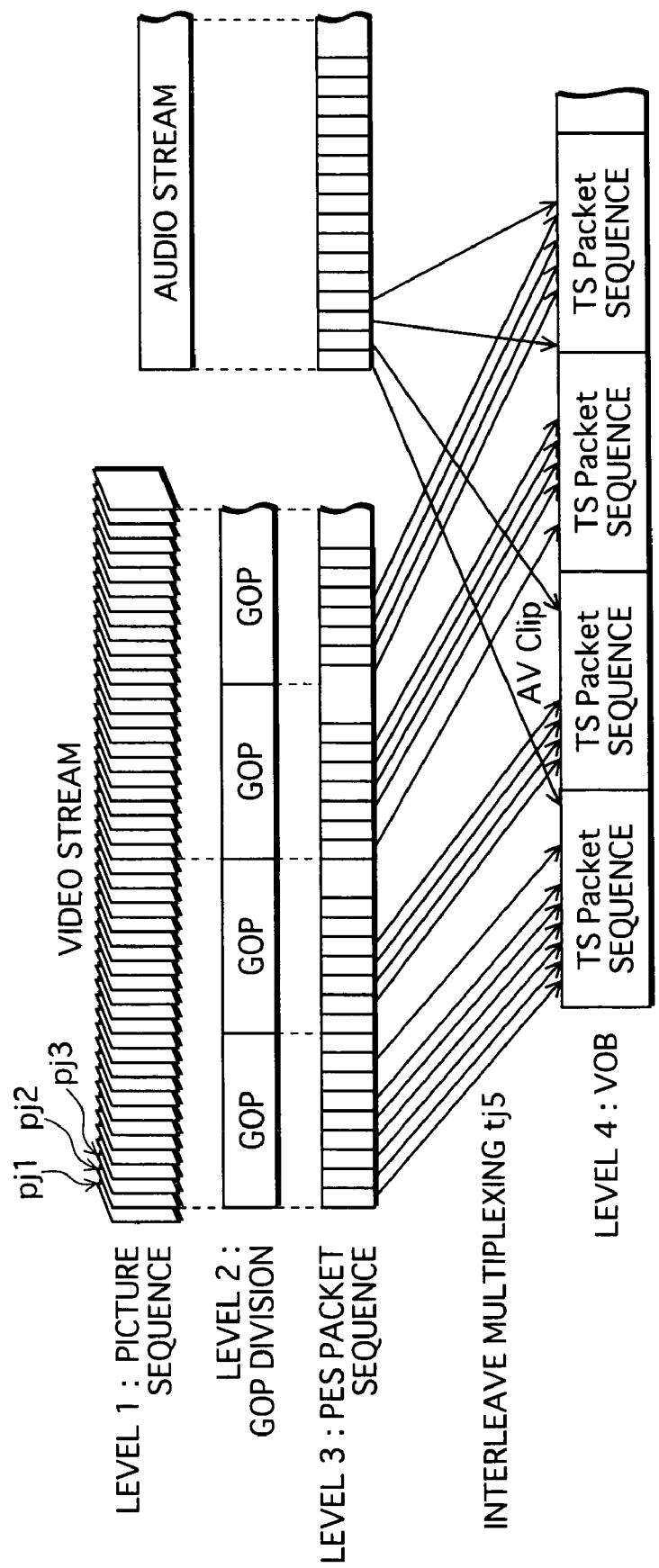
FIG. 33 shows generation process of a TS packet sequence performed by the multiplexer 10.

Explanation is provided on how a plurality of elementary streams are multiplexed by the multiplexer 10. FIG. 33 shows the generation process of a TS packet sequence performed by the multiplexer 10. In the present drawing, the levels 1 through 3 are the same as those in FIG. 27 and show a picture sequence, GOP division and a PES packet sequence, respectively. In the level 4, the multiplexer 10 multiplexes (tj 5 in the drawing) the PES packet sequence storing the GOP sequence with the PES packet sequence storing an audio stream so as to obtain a TS packet sequence. Such a digital stream in an MPEG2-TS format generated through the multiplexing process described above is called an AV Clip.

Figure 34:
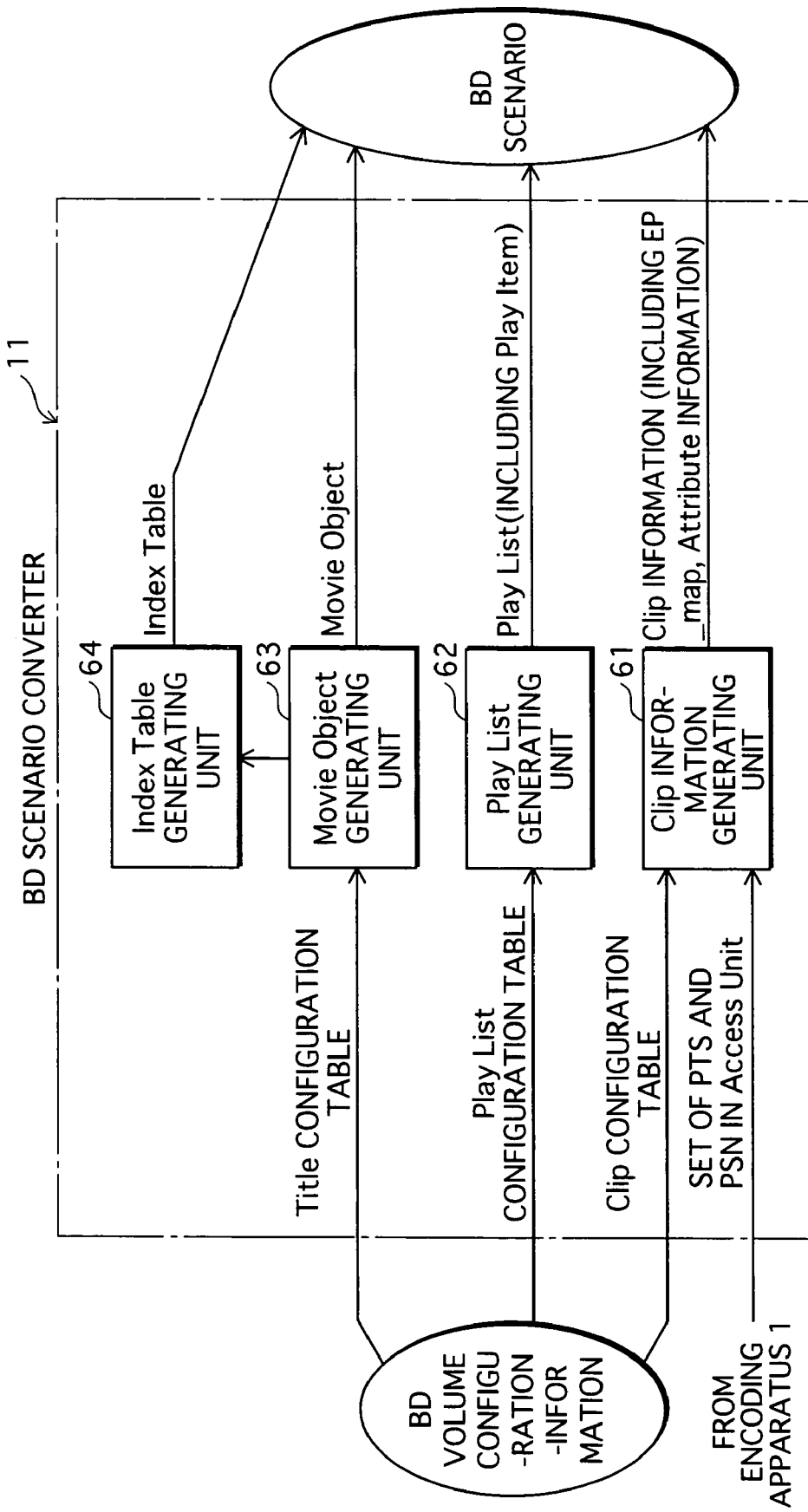
FIG. 34 shows the internal configuration of the scenario converter 8.

FIG. 34 shows the internal configuration of the BD scenario converter 11. As shown in the drawing, the BD scenario converter 11 comprises a Clip information generating unit 61, a PlayList generating unit 62, a movie object generating unit 63, and an index table generating unit 64. Since it is difficult to understand the BD scenario converter 8 only from FIG. 33, the description of the configuration elements of the scenario converter 8 will refer to FIGS. 35 through 36.

The Clip information generating unit 61 generates pieces of Clip information for AV Clips based on the Clip configuration tables in a piece of BD volume configuration information, pieces of attribute information for elementary streams outputted from the input apparatus 1, and PTSs (Presentation Time Stamps) and PSNs (Packet Serial Numbers) of the GOPs in the video stream.

The PlayList generating unit 62 assumes that the Clips written in a PlayList configuration table are in correspondence with the AV Clips and generates a piece of PlayList information for instructing a playback apparatus to play back the AV clips written in the PlayList configuration table.

Figure 35:
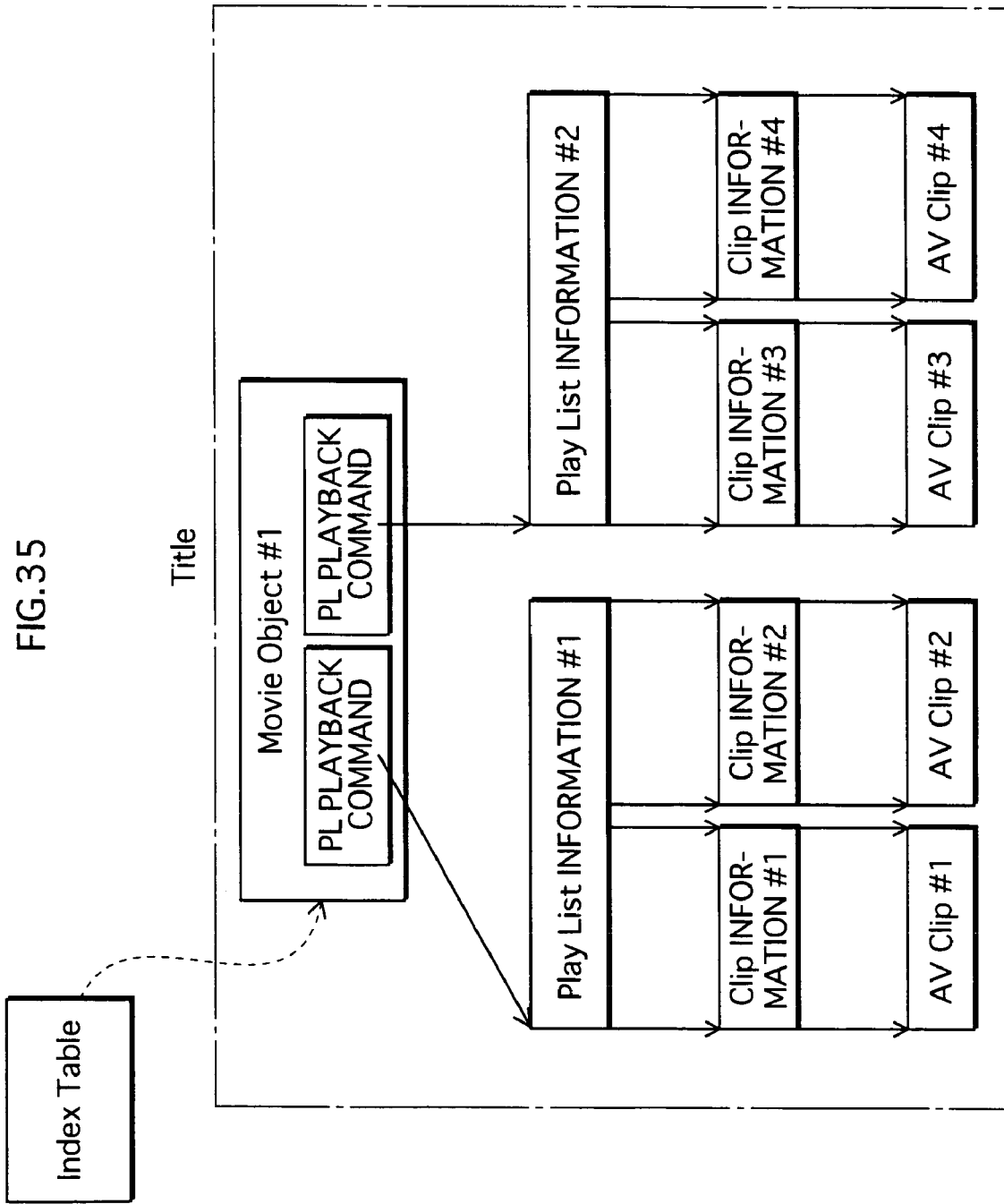
FIG. 35 shows a piece of Clip information and a movie object generated based on the Clip configuration table and the PL configuration table shown in FIGS. 6B and 6C.

The movie object generating unit 63 assumes that PlayList numbers written in a Title configuration table are in correspondence with the PlayLists and obtains a movie object (which includes a plurality of PlayList playback commands) for having a plurality of PlayLists belonging to a Title sequentially played back. By repeatedly performing such a processing on each of all the Title configuration tables, a plurality of movie objects are obtained. The plurality of movie objects obtained in this manner are converted into a file named "MovieObject.bdmv". FIG. 35 shows a piece of Clip information and a movie object generated based on the Clip configuration table and the PL information shown in FIGS. 6B and 6C. The PlayList 1 configuration table shown in FIG. 6B is in correspondence with the PlayList #1 and the Clip names such as Clip #1 and Clip #2 are written. Likewise, the PlayList2 configuration table shown in FIG. 6B is in correspondence with the PlayList #2 and the Clip #3 and the Clip #4 are written. As a result of the PlayList generating unit 62 generating pieces of PL information based on these PlayList Configuration tables, the piece of PlayList information #1 for sequentially instructing playback of the AV Clip #1 and the AV Clip #2 and the piece of PlayList information #2 for sequentially instructing playback of the AV Clip #3 and the AV Clip #4 are generated.

Figure 36:
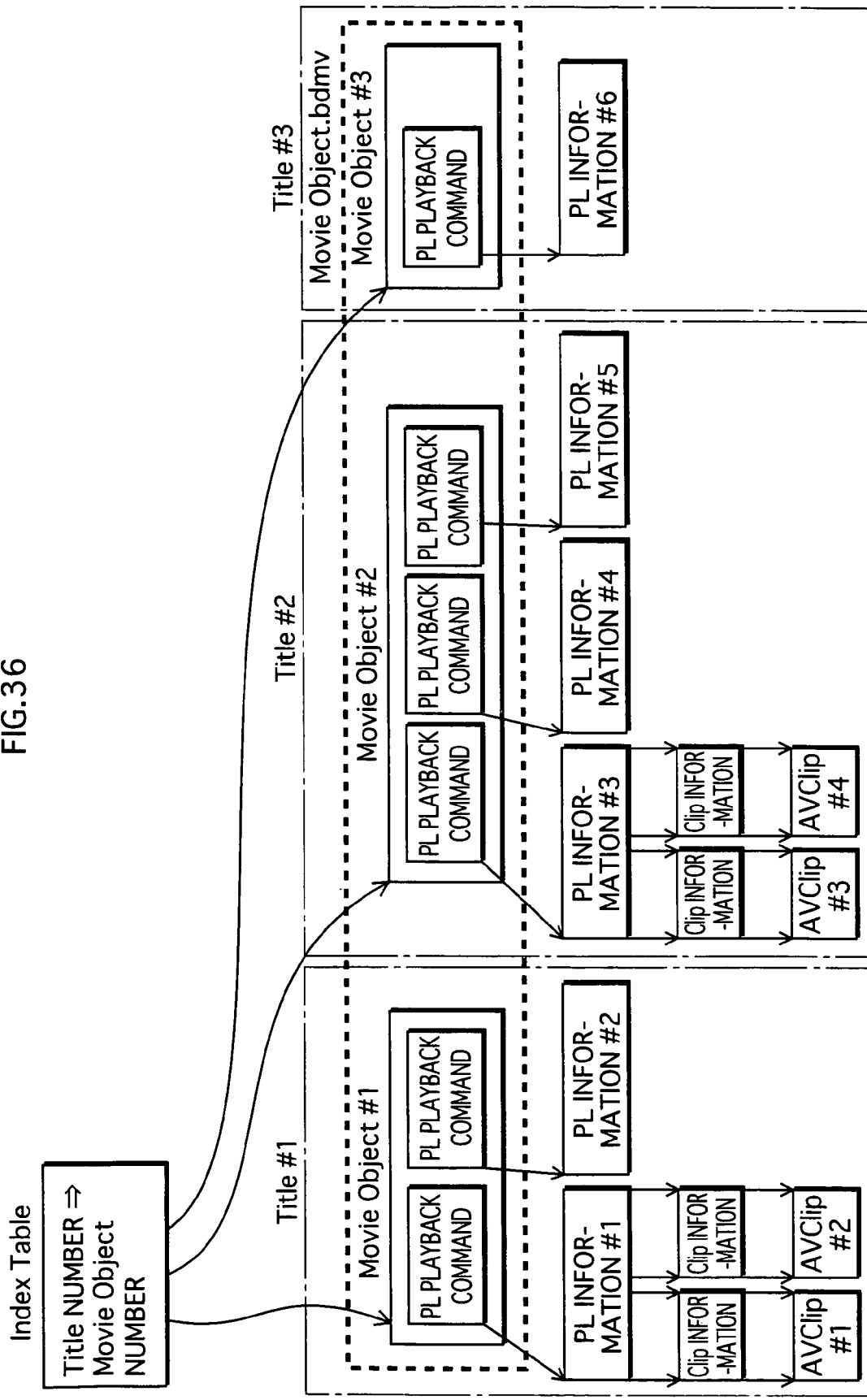
FIG. 36 shows Movie Objects #1, #2, and #3 generated for the Title configuration tables #1, #2, and #3 shown in FIG. 6C.

In the Title configuration table, since the PL numbers of the PlayList #1 and the PlayList #2 are written, the movie object generating unit 63 generates the Movie Object #1 that contains playback commands for the pieces of PlayList information #1 and #2. When such a processing is performed on each of the Title configuration tables #1, #2, and #3, the Movie Objects #1, #2, and #3 shown in FIG. 36 are obtained. The dashed lines in the drawing indicate Titles. The broken lines each surround a group of configuration elements to be put into a file in a BD-ROM.

By grouping a plurality of movie objects obtained in this manner, namely the Movie Objects #1, #2, and #3, "MovieObject.bdmv" is obtained. In a Title configuration table for the FirstPlay Title, a PlayList number is written. The piece of PlayList information in correspondence with the PlayList number is written so that an AV Clip constituting a menu (called a top menu in the case of a BD-ROM) for a whole optical disc is played back. The movie object generating unit 63 generates a movie object for having a top menu played back via this PlayList.

The index table generating unit 64 generates an index table in which Title numbers of the Titles are brought into correspondence with the movie object numbers of the movie objects constituting the Titles. In such an index table, a movie object for playing back a top menu is written at the head. The reason for this is because the top menu needs to be played back at first when a BD-ROM is mounted. A BD-ROM volume image is obtained by converting the Clip information, the PL information, the movie objects, and the index tables generated in this manner into files respectively.

Figure 37:
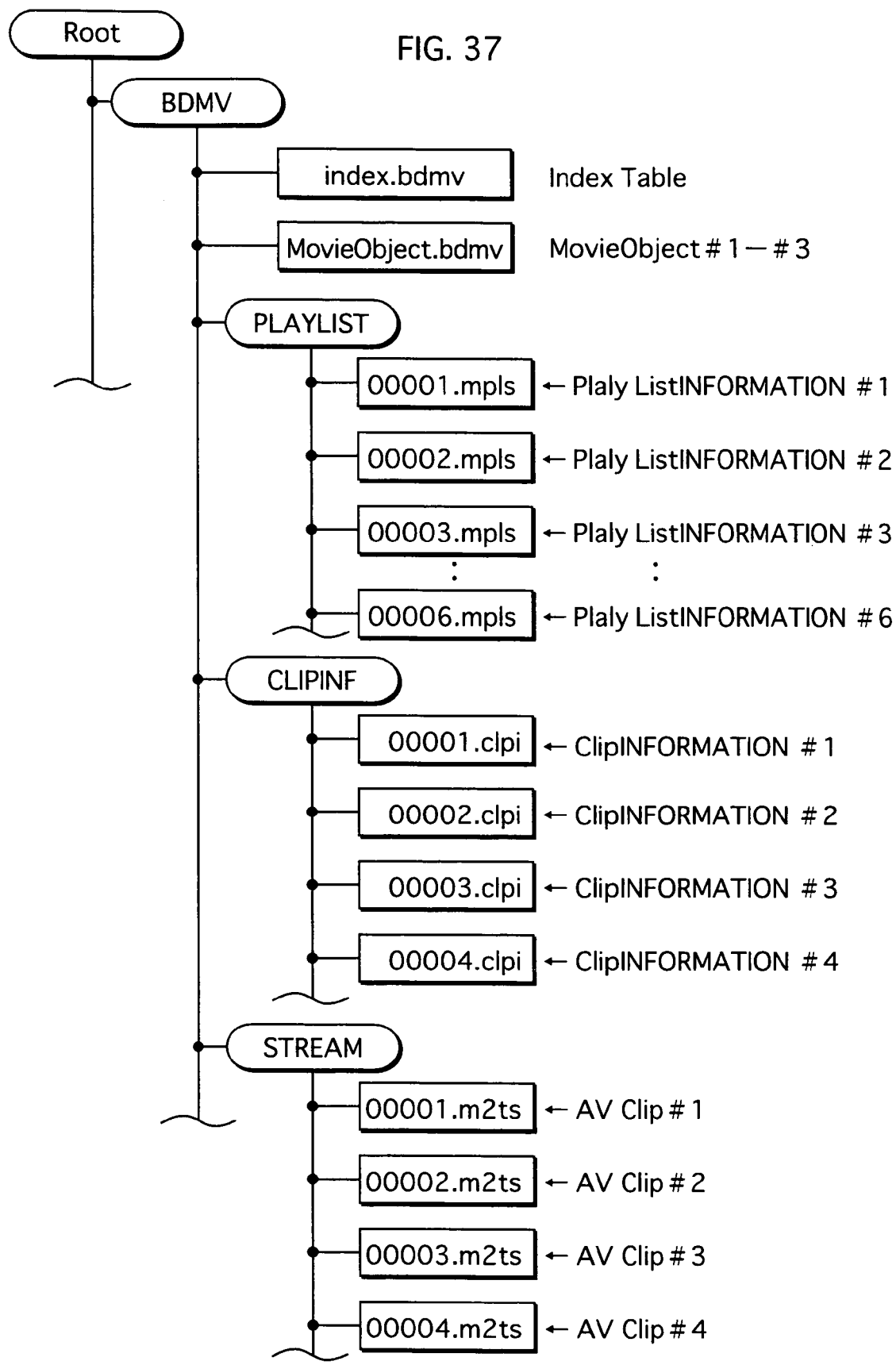
FIG. 37 shows a BD-ROM volume image expressed according to a file system layout.

FIG. 37 shows a BD-ROM volume image expressed according to a file system layout. In the drawing, a subdirectory called BDMV is positioned subordinate to the Root directory. Being subordinate to the BDMV directory are a PlayList directory, a CLIPINF directory, and a STREAM directory.

A piece of Clip information is positioned in the CLIPINF directory as a file named "xxxxx.clpi". In this example "x" is the number of the piece of Clip information. An AV Clip is positioned in the STREAM directory as a file named "xxxxx.m2ts". In this example, "x" is the number of the AV Clip. A PlayList is positioned in the PLAYLIST directory as a file named "yyyyy.mpls". In this example, "y" is the number of the PlayList. An information element constituting an index table is recorded in the BDMV directory as a-file named "index.bdmv".

As described above, according to the present embodiment, whether or not normal playback has been confirmed is set for each of the configuration elements of a piece of volume configuration information, such as Clips, PlayLists, and Titles; therefore, when such a piece of volume configuration information is copied and used as an initial version of a piece of volume configuration information for a BD-ROM, it is possible to fine out at a glance which configuration elements have confirmed to have a normal playback. Due to this arrangement, it is possible to save work for the configuration elements that are in common between the DVD-Video and the BD-ROM and have been confirmed to have a normal playback. Because of the omission of such work, intricacy level of the work is lowered. Accordingly, it is possible to improve working efficiency with the aforementioned re-use of data.

The Second Embodiment

The second embodiment is related to an improvement in the case where a piece of information for realizing subtitle playback exists in a Clip. Subtitle playback is realized by a piece of run-length data. Such a piece of run-length data is a piece of compression data obtained by run-length encoding a menu in which a plurality of buttons are arranged.

In a DVD-video, such a piece of run-length data is multiplexed onto a VOB as a sub- image stream including a plurality of PES packets. FIG. 38 shows the process in which a sub-image stream is multiplexed. The meanings of the levels 1 through 4 are the same as those in FIG. 27, except that an elementary stream is newly added in the level 6. The sub-image stream shown as the elementary stream is for forming a subtitle. As shown in the level 5, such a sub-image stream is put into PES packets to become AV Packs, and then they are multiplexed onto VOBs.

On the other hand, in a BD-ROM, a piece of run-length data is treated as a presentation graphics stream made up of a plurality of PES packets. Such a presentation graphics stream constituting a subtitle is multiplexed onto an AV Clip along with the video stream and the audio stream.

FIG. 39 shows the process in which the presentation graphics stream is multiplexed. The meanings of the levels 1 through 4 are the same as those in FIG. 33, except that an elementary stream is newly added in the level 6. The sub-image stream shown as the elementary stream is for displaying a subtitle. As shown in the level 5, such a sub-image stream is put into PES packets to become TS Packs, and then they are multiplexed onto AV Clips.

In the both cases of a DVD-Video and a BD-ROM, a piece of run-length data is multiplexed onto a stream itself. Since being multiplexed onto a stream itself, such pieces of run-length data are stored, like other elementary streams, into the HD stream directory and the SD stream directory within the material storage 4.

As described in the first embodiment, the player simulator 36 reads a plurality of elementary streams to be multiplexed from the material storage 4, and have them played back on the client apparatuses 21 through 23 and the client apparatuses 25 through 27. In such a case, the player simulator 36 also realizes display of a subtitle. With this arrangement, the user is able to confirm whether or not the subtitle is displayed properly.

Synchronization of subtitle display is defined by time stamps in PES packets; therefore, the editing application 37 adjusts the synchronization by reading a sub-image stream or a presentation graphics stream from the material storage 4 and rewriting such time stamps. The sub-image stream or the presentation graphics stream after the adjustment is made is written back into the material storage 4.

When normal synchronized playback has been confirmed as a result of this correction process, on a condition that the aforementioned three conditions are satisfied, an operation is received from the user for setting the verification status menu to be in a confirmed state. As a result, the confirmation flag of the Clip configuration table is set to be "=1". The version 0.x of the piece of DVD volume configuration information having a confirmation flag set to be "=1", which has been generated in the aforementioned manner, is re-used as the version 0.1 of a piece of BD volume configuration information.

For configuration elements that are in common between a DVD-Video and a BD-ROM and contain subtitle display and also have been confirmed to have a normal playback in a DVD-Video authoring process, it is possible to save all the types of work such as editing on Clip configuration tables and checking for normal playback. Thus, the BD-ROM authoring process progresses quickly.

As described above, according to the present embodiment, in the case where a piece of run-length data for realizing subtitle display is multiplexed onto a Clip, the confirmation flag is set to be "1" on a condition that a subtitle is displayed with proper synchronization. Thus, for subtitle display of which normal playback has been confirmed during a DVD-Video authoring process, it is possible to save the work for confirming normal playback during a BD-ROM authoring process.

The Third Embodiment

The third embodiment is related to an improvement in the case where a piece of information for realizing interactive playback exists in a stream. Interactive playback is realized by a piece of interactive control information and a piece of run-length data. Such a piece of run-length data is a piece of compression data obtained by run-length encoding a menu in which a plurality of buttons are arranged.

In a DVD-video, such a piece of run-length data is treated as a sub-image stream like a subtitle and is multiplexed onto a VOB. A piece of interactive control information is stored into an AV pack (called a navi pack) for managing GOPs in a video stream.

FIG. 40 shows the process in which a sub-image stream and a piece of interactive control information are multiplexed. The meanings of the levels 1 through 5 are the same as those in FIG. 39. A part of what is in the elementary stream is modified, and also the level 7 is newly added. The sub-stream shown as the elementary stream is for drawing a menu, not only a subtitle. As shown in the level 5, the sub-image stream constituting a subtitle and a menu in this manner is put into PES packets to become AV Packs, and then they are multiplexed onto VOBs. On the other hand, the piece of interactive control information shown in the level 7 is put into PES packets to be stored into NV Packs.

In a BD-ROM, a piece of run-length data and a piece of interactive control information are integrated and treated as an elementary stream called an interactive graphics stream. An interactive graphics stream is multiplexed onto an AV Clip, along with a presentation graphics stream constituting a subtitle.

FIG. 41 shows the process in which a sub-image stream and a piece of interactive control information are multiplexed. The meanings of the levels 1 through 5 in the drawing are the same as those in FIG. 39, except that the level 7 is newly added. In the interactive graphics stream shown in the level 7, a piece of run-length data for drawing a menu and a piece of interactive control information are integrated. Such an interactive graphics stream integrated this way is, as shown in the level 5, put into PES packets to become TS packets, and then they are multiplexed onto an AV Clip.

In the both cases of a DVD-Video and a BD-ROM, a piece of status control information is multiplexed onto a stream itself. Since being multiplexed onto a stream itself, such pieces of interactive control information and run-length data are stored, like other elementary streams, into the HD stream directory and the SD stream directory within the material storage 4.

As described in the first embodiment, the client apparatuses 21 through 23 and the client apparatuses 25 through 27 read a plurality of elementary streams to be multiplexed from the material storage 4, and have them played back on the client apparatuses 21 through 23 and the client apparatuses 25 through 27. In such a case, the client apparatuses 21 through 23 and the client apparatuses 25 through 27 realize an interactive playback processing. With this arrangement, the user is able to confirm whether or not the interactive control information is written properly.

A piece of interactive control information is made up of a drawing position of a button, a drawing time, and a command to be executed by a playback apparatus when a button selection is confirmed. Since a piece of interactive control information is a set of pieces of data and commands, if an error is found in a piece of interactive control information during the aforementioned confirmation process for normal playback, the editing application 37 activates an editor function and rewrites the commands and pieces of data according to a user operation so as to make corrections in the piece of interactive control information.

For example, when an operation is performed on the menu to confirm normal playback, in the case where an improper branch playback is performed, it is assumed that description of a branch destination in the piece of interactive control information has a problem, and the piece of interactive control information is read from the material storage 4 so that a branching command described therein is corrected on a client apparatus. Subsequently, the edited piece of interactive control information is written back into the material storage 4.

When normal playback of the interactive processing has been confirmed as a result of this correction process, on a condition that the aforementioned three conditions are satisfied, an operation is received from the user for setting the verification status menu to be in a confirmed state. As a result, the confirmation flag of the Clip configuration table is set to be "=1". The version 0.x of the piece of DVD volume configuration information having a confirmation flag set to be "=1", which has been generated in the aforementioned manner, is re-used as the version 0.1 of a piece of BD volume configuration information.

For configuration elements that are in common between a DVD-Video and a BD-ROM and contain an interactive element and also have been confirmed to have a normal playback in a DVD-Video authoring process, it is possible to save all the types of work such as editing on Clip configuration tables and checking for normal playback. Thus, the BD-ROM authoring process progresses quickly.

As described above, according to the present embodiment, in the case where a piece of interactive control information for realizing interactive playback is multiplexed onto a stream itself, the confirmation flag is set to be "1", on a condition that description in the piece of interactive control information such as the branching destination is correct. Thus, for such a piece of interactive control information of which normal playback has been confirmed during a DVD-Video authoring process, it is possible to save the work for confirming normal playback during a BD-ROM authoring process.

The Fourth Embodiment

The fourth embodiment is related to an improvement in the case where a playback apparatus is instructed to perform some kind of control procedure before and after a stream playback. In order for the user to input such control procedure, the editing application 37 activates an editor function for inputting texts during the editing of a Title configuration table so that an input of a command sequence is received for realizing such control procedure. The editing application 37 writes the command sequence having been inputted this way into before and after a PlayList name in the Title configuration table. FIG. 42 shows examples of Title configuration tables in which commands are described. When a command sequence is written in this manner, the PGC information generating unit 51 within the scenario converter 8 sets the command sequence into a piece of PGC information as a pre-processing command and a post-processing command.

Further, the movie object generating unit 63 within the scenario converter 11 writes such a command sequence into the inside of a movie object. The positions of writing are before and after a PlayList playback command.

As a result of the writing described above, it is possible to have a playback apparatus execute some kind of control procedure before and after a VOB. Also, it is possible to have a playback apparatus execute some kind of control procedure before and after a playback of an AV Clip.

Confirmation of whether or not such control procedure can be executed properly is made in the following manner:

As described in the first embodiment, the client apparatuses 21 through 23 and the client apparatuses 25 through 27 read a plurality of elementary streams to be multiplexed from the material storage 4 according to a Title configuration table, and have them played back on the client apparatuses 21 through 23 and the client apparatuses 25 through 27. In such a case, when performing a PlayList playback of a PlayList written in each of the Title configuration tables, the player simulator 36 executes the control procedure before and after the PlayList is played back. As a result of such execution, it is possible to confirm on the client apparatuses 21 through 23, whether or not the control procedure is proper or not.

If an error is found in the control procedure, the editing application 37 in each of the client apparatuses 21 through 23 and the client apparatuses 25 through 27 activates an editor function and rewrites the description of the commands in the Title configuration table according to a user operation. Accordingly, it is possible to make corrections in the control procedure to be executed before and after a PlayList is played back.

When normal execution of the control procedure has been confirmed as a result of this correction process, on a condition that other conditions are satisfied, an operation is received from the user for setting the verification status menu to be in a confirmed state. As a result, the confirmation flag of the Title configuration table is set to be "=1". The version 0.x of the piece of DVD volume configuration information having a confirmation flag set to be "=1", which has been generated in the aforementioned manner, is re-used as the version 0.1 of a piece of BD volume configuration information.

For configuration elements that are in common between a DVD-Video and a BD-ROM and control procedure exists before and after the playback thereof and also have been confirmed to have a normal playback in a DVD-Video authoring process, it is possible to save all the types of work such as editing on Title configuration tables and checking for normal playback. Thus, the BD-ROM authoring process progresses quickly.

As described above, according to the present embodiment, it is possible to have description in a Title configuration table so that some kind of playback is performed before a VOB or an AV Clip is played back; therefore, it is possible to expand the range of expression.

Supplementary Information

So far, description has been provided for each of the embodiments; however, it has merely presented examples of systems that are expected to have the best effects in the present situation. The present invention may be modified and embodied within a range that does not deviate from the gist of the invention. Examples of modified embodiments include the following listed under (A), (B), (C), and so on.

(A) The information processing that is performed by a program and is shown in the flow charts specifically use hardware resources such as a CPU and a memory; therefore, such a program forms an invention in its own right. Although the first through third embodiments show embodiments that relate to the implementation of computer programs pertaining to the present invention in an incorporated form in the generation apparatuses, the computer programs shown in the first through third embodiments may be implemented in their own right, separate from the encoding apparatuses. The implementation of the computer programs in there own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of store front displays, catalogue solicitation, pamphlet distribution, and so forth.

Different examples of (5) providing the programs publicly via bi-directional electronic communications circuits include the case where a program provider transmits the programs to a user and allows the user to use the programs (program down load services) and where the programs remain with a program provider and only the functions of the programs are provided for a user via an electronic communications circuits (function-providing ASP services).

(B) Consider that the element of "time" relating to the steps executed in time-series in the flowcharts is a required item for specifying the invention. If this is the case, then the processing procedures shown by the flowcharts can be understood as disclosing the usage configurations of the authoring method. These flowcharts themselves are embodiments of the usage configurations of the authoring method pertaining to the present invention. Execution of the processing in the flowcharts so as to achieve the original objects of the present invention and to enact the actions and effects by performing the processing of the steps in time-series is, needless to say, an implementation of the authoring method pertaining to the present invention.

(C) It has been described that the confirmation flags for verification are manually set according to the results of verification by a person who has verified digital streams; however, it is acceptable to have an arrangement wherein a verification tool being operably connected to a playback apparatus performs verification on volume configuration information and in the case where the data is judged to have no errors, a confirmation flag is automatically set according to the judgment result.

(D) It is acceptable to have an arrangement wherein normal playback of Clips are confirmed by activating a simulator/emulator that is provided independently of the client apparatuses 21 through 23 and the client apparatuses 25 through 27, instead of using a built-in simulator provided in each of the client apparatuses 21 through 23 and the client apparatuses 25 through 27. Further, it is acceptable to have an arrangement wherein offset values for removing unsynchronization are received from the simulator/emulator so that the values are reflected in scenario information.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An authoring system comprising:
a generating unit copying an unfinished piece of first volume configuration information and to perform an editing processing on the copy so as to obtain a piece of second volume configuration information for a second optical disc, wherein
each volume configuration information has at least two layers including a clip layer and an elementary stream layer,
the copy includes status information indicating, for clips included in the clip layer thereof, whether or not the clip has been confirmed by a user,
the generating unit performs status management processing and the editing processing,
in the editing processing, editing an unconfirmed clip based on a user operation is allowed, but editing a confirmed clip is not allowed, and
in the status management processing, a clip m included in the clip layer has been confirmed only when all of one or more elementary streams constituting the clip m have been confirmed.

2. The authoring system of claim 1, wherein
a mode for displaying the confirmed clip is different from a mode for displaying the unconfirmed configuration element clip, and
the editing processing is performed based on a user operation conducted on the displayed clips.

3. The authoring system of claim 1, wherein
each clip is obtained by multiplexing a plurality of elementary streams included in the elementary stream layer,
the editing processing includes to select the plurality of elementary streams to be multiplexed to obtain each clip, to determine an order in which the plurality of elementary streams are to be multiplexed, and to synchronize the plurality of elementary streams, and
each clip is confirmed when all of the following conditions are satisfied: (i) a set of elementary streams to be multiplexed to obtain a digital stream is proper, (ii) the order in which the plurality of elementary streams are multiplexed is proper, and (iii) playback of the plurality of elementary streams is synchronized.

4. The authoring system of claim 3, wherein
a playlist layer is provided above the clip layer,
the generating unit performs the editing processing on playlists included in the playlist layer by selecting the clips to be played back and determining an order in which the clips are to be played back, and
status information for each playlist is set to indicate as "confirmed" when both of the following conditions are satisfied: (i) the status information for each clip is set to indicate as "confirmed" and (ii) the order in which the clips are arranged is proper.

5. The authoring system of claim 4, wherein
a title layer is provided above the playlist layer,
the generating unit performs the editing processing on titles included in the title layer by determining an order in which the playlists are to be arranged, and
status information for each title is set to indicate as "confirmed" when both of the following conditions are satisfied: (i) the status information for each playlist is set to indicate as "confirmed" and (ii) the order in which the playlists are arranged is proper.

6. The authoring system of claim 1, wherein
each clip is obtained by multiplexing a plurality of elementary streams included in the elementary stream layer,
one of the plurality of elementary streams contains interactive control information for realizing interactive playback control, and
the one of the plurality of elementary streams is confirmed when a condition is satisfied that the interactive playback control is properly conducted.

7. The authoring system of claim 1, comprising a server apparatus and two or more client apparatuses, wherein
the piece of first volume configuration information and the piece of second volume configuration information are stored in the server apparatus, and
the generating unit is included in one of the two or more client apparatuses that is different from another one of the two or more client apparatuses that generates the piece of first volume configuration information.

8. The authoring system of claim 7, wherein
each clip is obtained by multiplexing a plurality of elementary streams included in the elementary stream layer,
the server apparatus further stores therein the plurality of elementary streams, and
each of the two or more client apparatuses receives an operation related to the confirmation of the clips after playing back the plurality of elementary streams stored in the server apparatus.

9. The authoring system of claim 1 further including a source of images, having a different characteristic from images used to provide the unfinished piece of first volume configuration information, connected to the generating unit.

10. The authoring system of claim 9 wherein the source of images are HD images and the images used to provide the unfinished piece of first volume configuration are SD images.

11. The authoring system of claim 10 wherein the generating unit rewrites file paths in a clip configuration table to specify HD images instead of SD images in the first volume configuration information.

12. A computer-readable recording medium having recorded thereon a program for having a computer execute processing of copying an unfinished piece of first volume configuration information and performing an editing processing on the copy so as to obtain a piece of second volume configuration information for an optical disc, wherein
each volume configuration information has at least two layers including a clip layer and an elementary stream layer,
the copy includes status information indicating, for each of clips included in the clip layer thereof, whether or not the clip has been confirmed by a user,
the processing includes status management processing and the editing processing,
in the editing processing, editing an unconfirmed clip based on a user operation is allowed, but editing a confirmed clip is not allowed, and
in the status management processing, a clip m included in the clip layer has been confirmed only when all of one or more elementary streams constituting the clip m have been confirmed.

13. An authoring method comprising:

a step of copying an unfinished piece of first volume configuration information and performing an editing processing on the copy so as to obtain a piece of second volume configuration information for an optical disc, wherein each volume configuration information has at least two layers including a clip layer and an elementary stream layer, the copy includes status information indicating, for each of clips included in the clip layer thereof, whether or not the clip has been confirmed by a user, the step performs status management processing and the editing processing, in the editing processing, editing an unconfirmed clip based on a user operation is allowed, but editing a confirmed clip is not allowed, and in the status management processing, a clip m included in the clip layer has been confirmed only when all of one or more elementary streams constituting the clip m have been confirmed.

* * * * *